United States Patent
Matlin et al.

(10) Patent No.: US 11,083,299 B2
(45) Date of Patent: *Aug. 10, 2021

(54) CHAIR WITH ERGONOMIC MOTION FEATURES

(71) Applicant: FELLOWES, INC., Itasca, IL (US)

(72) Inventors: Tai Hoon K. Matlin, Round Lake Beach, IL (US); James Waring, Libertyville, IL (US); Shawn Applegate, Wood Dale, IL (US); Steven James Barnaby, Jr., Hanover Park, IL (US); Peter Maletich, Chicago, IL (US); John Fellowes, Wheaton, IL (US)

(73) Assignee: FELLOWES, INC., Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/794,384

(22) Filed: Feb. 19, 2020

(65) Prior Publication Data

US 2020/0178690 A1 Jun. 11, 2020

Related U.S. Application Data

(63) Continuation of application No. 15/179,115, filed on Jun. 10, 2016, now Pat. No. 10,667,612.

(Continued)

(51) Int. Cl.
*A47C 3/025* (2006.01)
*A47C 1/032* (2006.01)
(Continued)

(52) U.S. Cl.
CPC .............. *A47C 7/02* (2013.01); *A47C 3/0255* (2013.01); *A47C 3/0257* (2013.01); *A47C 3/18* (2013.01); *A47C 3/20* (2013.01); *A47C 7/006* (2013.01); *A47C 7/14* (2013.01); *A47C 7/38* (2013.01); *A47C 7/40* (2013.01); *A47C 7/46* (2013.01); *A47C 7/462* (2013.01); *A47C 7/54* (2013.01); *A47C 9/002* (2013.01); *A47C 31/126* (2013.01)

(58) Field of Classification Search
CPC ....... B60N 2/10; A47C 9/002; A47C 1/03294; A47C 3/0255; A47C 3/0257
See application file for complete search history.

(56) References Cited

U.S. PATENT DOCUMENTS 806,043 A 11/1905 Acker
1,428,039 A 9/1922 Kratz
(Continued)

OTHER PUBLICATIONS

Office Action dated Jun. 28, 2020 in Chinese Application 201680042669.4.

(Continued)

*Primary Examiner* — Timothy J Brindley
(74) *Attorney, Agent, or Firm* — Pillsbury Winthrop Shaw Pittman LLP

(57) ABSTRACT

A chair includes a seat pan member, a movement support frame, and at least two movement support members operatively connected to the seat pan member and the movement support frame. The at least two movement support members are configured to support the seat pan member in a floating manner for dynamic movement with respect to the movement support frame in at least one degree of freedom in a horizontal seating plane.

9 Claims, 44 Drawing Sheets

Related U.S. Application Data

(60) Provisional application No. 62/173,388, filed on Jun. 10, 2015.

(51) Int. Cl.
| | |
|---|---|
| *A47C 7/02* | (2006.01) |
| *A47C 3/18* | (2006.01) |
| *A47C 3/20* | (2006.01) |
| *A47C 7/00* | (2006.01) |
| *A47C 7/38* | (2006.01) |
| *A47C 7/46* | (2006.01) |
| *A47C 7/40* | (2006.01) |
| *A47C 7/54* | (2006.01) |
| *A47C 7/14* | (2006.01) |
| *A47C 9/00* | (2006.01) |
| *A47C 31/12* | (2006.01) |

(56) References Cited

U.S. PATENT DOCUMENTS

| | | | |
|---|---|---|---|
| 1,566,044 A | 12/1925 | Sisbower et al. | |
| 1,845,142 A | 2/1932 | Friesner | |
| 1,858,989 A | 2/1932 | Friesner | |
| 2,227,717 A | 1/1941 | Jones | |
| 2,284,352 A * | 5/1942 | Zank | B60N 2/544 |
| | | | 248/565 |
| 2,634,793 A | 4/1953 | Petersen | |
| 3,765,674 A | 10/1973 | Siler | |
| 4,095,770 A | 6/1978 | Long | |
| 5,588,704 A | 12/1996 | Harza | |
| 5,590,930 A | 1/1997 | Glockl | |
| 5,876,311 A | 3/1999 | Coates et al. | |
| 6,056,362 A | 5/2000 | Haye | |
| 6,068,280 A | 5/2000 | Torres | |
| 6,257,663 B1 | 7/2001 | Swierczewski | |
| 6,273,389 B1 | 8/2001 | Carlgren | |
| 6,457,765 B1 | 10/2002 | Bergquist et al. | |
| 6,599,198 B2 | 7/2003 | Ettenhofer | |
| 7,506,910 B2 * | 3/2009 | Leitner | B60N 2/0232 |
| | | | 296/65.01 |
| 7,520,469 B2 | 4/2009 | Baumann | |
| 7,666,126 B2 | 2/2010 | Rempe | |
| 7,938,489 B2 | 5/2011 | Nazari | |
| 8,061,767 B2 | 11/2011 | Kunzler et al. | |
| D670,096 S | 11/2012 | Grcic | |
| 8,308,240 B1 | 11/2012 | Chou et al. | |
| 8,414,072 B2 | 4/2013 | Phillips | |
| 8,641,140 B2 | 2/2014 | Swierczewski | |
| 8,662,585 B2 | 3/2014 | Garvis et al. | |
| 9,265,349 B1 | 2/2016 | Jensen | |
| 2002/0135214 A1 * | 9/2002 | Ursel | B60N 2/1885 |
| | | | 297/330 |
| 2004/0116195 A1 | 6/2004 | Lee | |
| 2006/0079378 A1 | 4/2006 | Ader | |
| 2007/0035164 A1 | 2/2007 | North | |
| 2007/0169270 A1 | 7/2007 | Chai | |
| 2009/0108615 A1 | 4/2009 | Akiya et al. | |
| 2009/0261641 A1 | 10/2009 | Dickie | |
| 2010/0141003 A1 | 6/2010 | Combs | |
| 2010/0264711 A1 | 10/2010 | Nazari | |
| 2011/0275939 A1 | 11/2011 | Walsh et al. | |
| 2012/0080916 A1 | 4/2012 | Stringer | |
| 2015/0335136 A1 | 11/2015 | Wehner | |
| 2017/0332790 A1 | 11/2017 | Chen | |
| 2019/0001844 A1 | 1/2019 | Williams et al. | |

OTHER PUBLICATIONS

International Search Report and Written Opinion dated Dec. 1, 2016 in International Application PCT/US2016/036898.
Written Opinion dated Jun. 26, 2017 in International Application PCT/US2016/036898.
International Preliminary Report on Patentability dated Oct. 17, 2017 in International Application PCT/US2016/036898.
Chairish, Modern Wooding Hanging Chair, date: unknown, retrieved on Apr. 19, 2019, https://www.chairish.com/product/722353/modern-wooden-hanging-chair.
Pierre Jeanneret, Armchair, date: unknown, retrieved on Apr. 19, 2019, https://www.pinterest.com/pin/516577019749640464/.
Office Action dated Nov. 2, 2018 in EP Application 16730217.3.
Office Action dated Mar. 1, 2021 in Chinese Application 201680042669.4.

* cited by examiner

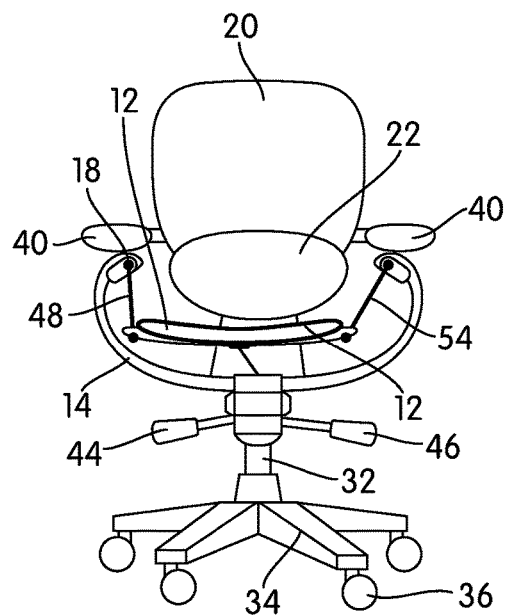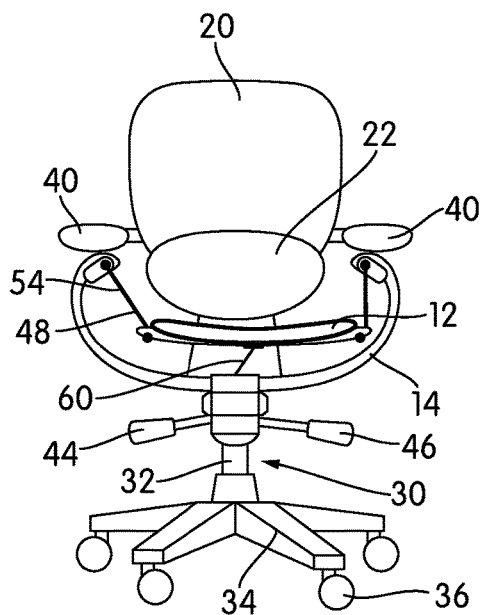
FIG. 3A  FIG. 3B
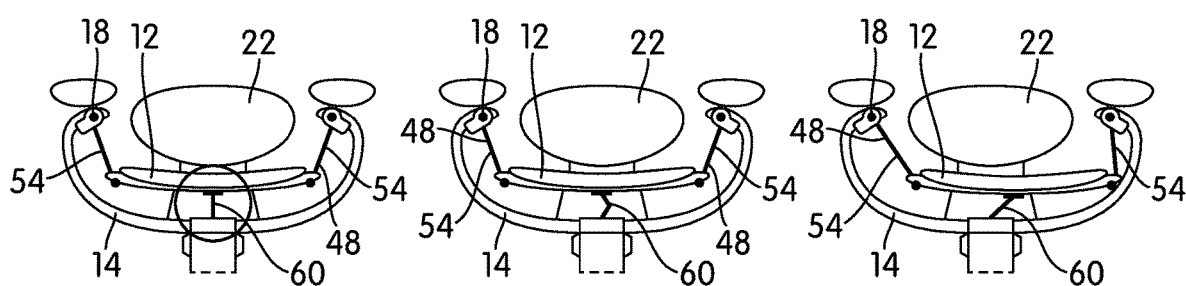
FIG. 3C  FIG. 3D  FIG. 3E

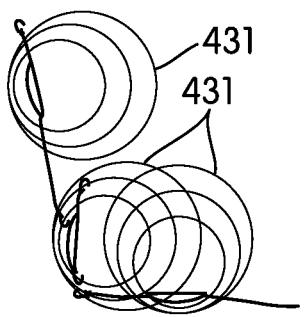
FIG. 33
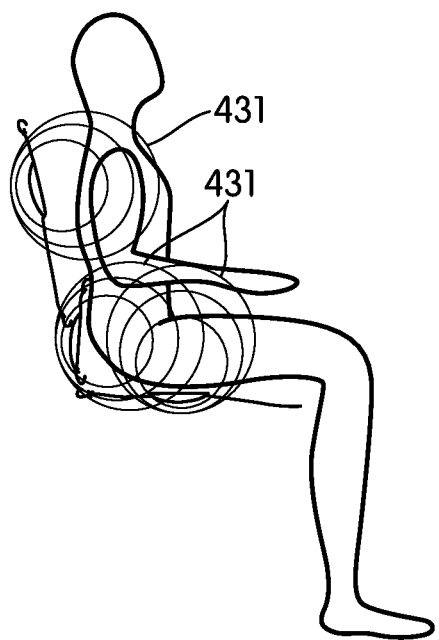 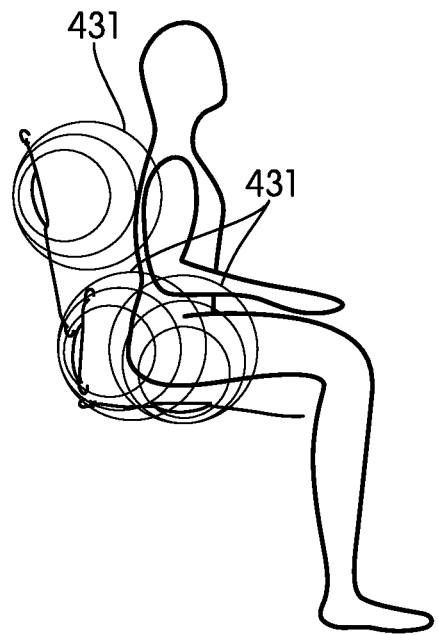
FIG. 34  FIG. 35

CHAIR WITH ERGONOMIC MOTION FEATURES

CROSS-REFERENCE TO RELATED APPLICATIONS

The present application is a continuation of U.S. patent application Ser. No. 15/179,115 filed Jun. 10, 2016, which relies on the benefit under 35 U.S.C. § 119(e) of U.S. Provisional Patent Application No. 62/173,388, filed on Jun. 10, 2015, which are incorporated herein by reference in their entireties.

BACKGROUND

Field

The present patent application relates to chairs. In particular, the present patent application relates to chairs having ergonomic motion features.

Description of Related Art

Chairs are generally designed to support a user in two locations, for example, in the seat pan area and along the back. Some chairs are designed to provide support to the user in the lumbar region as well. The seat back (including the lumbar support) and the seat pan are the components of the chair that come in contact with the user's body when the user is seated in the chair.

Simple padded seating, contoured padded seating and engineered breathable mesh seating have also been developed to provide comfort and support to the user. Some of the chairs also include a plethora of adjustments that allows the user to adjust the seat to an optimal posture position. For example, ergonomic chairs can be adjusted into an optimal position for each user.

Also, chairs are generally designed based on decades-long "ergonomic" theories. These theories usually attempted to accommodate the user in stagnate (i.e., static) correct posture positions. Recently, the concept of sitting too long in a stationary position, no matter how correct the posture position may be, has been considered to be unhealthy.

Further, there has also been an interest in non-traditional ergonomic seating within the workplace environment. These products are usually based on seating that is not chair based. For example, the non-traditional ergonomic seating may include stools that pivot off a base, or are shaped like mushroom heads or saddles. Each of the non-traditional ergonomic seating is based on some sort of observation of freedom of movement versus the stationary classic ergonomic design. Due to their unusual design or the additional problems that these type of seating devices may create, they have not been widely adapted.

SUMMARY

In one embodiment of the present patent application, a chair is provided. The chair includes a seat pan member; a movement support frame; and at least two movement support members operatively connected to the seat pan member and the movement support frame, the at least two movement support members are configured to support the seat pan member in a floating manner for dynamic movement with respect to the movement support frame in at least one degree of freedom in a horizontal seating plane.

In another embodiment of the present patent application, a chair is provided. The chair includes a seat base member, a seat back member, a seat base support member and a suspension assembly. The suspension assembly is operatively connected to the seat base member and the seat base support member and is configured to support the seat base member in a suspended manner for dynamic movement with respect to the seat base support member in at least one degree of freedom in a horizontal seating plane.

In yet another embodiment of the present patent application, a chair is provided. The chair includes a seat pan member, a seat back member having a lumbar support member, a lumbar support assembly and an actuator. The lumbar support assembly is operatively connected to the lumbar support member and configured for moving the lumbar support member, with respect to the seat pan member and the seat back member, between a first position and a second position. When the lumbar support member is in the second position, the lumbar support member is positioned forwardly, in a direction toward the seated user's lower back, relative to the seat back member so as to enable the user to be seated forwardly on the seat pan member while being engaged with the lumbar support member. The actuator is configured to operate the lumbar support assembly for movement of the lumbar support member between the first position and the second position.

In yet another embodiment of the present patent application, a chair is provided. The chair includes a seat pan member, and an ergonomic position sensor arrangement operatively connected to the seat pan member. The sensor arrangement is configured to sense the position of a user seated on the seat pan member for outputting data to determine how the user is sitting in comparison to a predetermined sitting position.

In yet another embodiment of the present patent application, a chair is provided. The chair includes a seat pan member, an ergonomic position sensor arrangement operatively connected to the seat pan member, and a display device with a processor. The sensor arrangement is configured to sense the position of a user seated on the seat pan member for outputting data. The processor is configured to receive the data from the sensor arrangement, compare the received data to a predetermined target sitting position, and display an indication of the comparison to the user.

Other aspects, features, and advantages of the present patent application will become apparent from the following detailed description, the accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which

FIGS. 3A and 3B show front elevational views of the chair when the seat pan or seat base member of the chair is in a left side position and in a right side position, respectively, in accordance with an embodiment of the present patent application;

FIGS. 3C and 3D show partial, up-close front elevational views of the chair when the seat base member is in a center position in accordance with an embodiment of the present patent application;

FIG. 3E shows a partial, up-close front elevational view of the chair when the seat base member is in in the right side position in accordance with an embodiment of the present patent application;

FIG. 15 shows the lumbar support member in the first position and FIG. 16 shows the lumbar support member in the second position in accordance with an embodiment of the present patent application;

FIGS. 33-35 show left side elevational views of the chair with the ergonomic position sensing arrangement and the sensor fields of the sensor systems in accordance with an embodiment of the present patent application;

DETAILED DESCRIPTION OF THE DRAWINGS

The present patent application provides a chair 10 with ergonomic motion features. For example, the chair 10 includes a suspended seat pan 12 allowing for a multidirectional movement of the seat pan 12. The configuration of the seat pan 12 provides a multitude of optimal positions allowing the user to switch to a secondary primary sitting position or to be encouraged to move, transitioning through ever changing sitting positons (e.g., FIGS. 3A, 3B, 4A, 4B, 5A, 5B, 6A and 6B). This encouragement of dynamic movement allows the user not to be stagnant when seated, while still be properly supported by the chair 10. The chair 10 may also include a moveable lumbar support member 22 that moves forward when actuated (either manually or automatically) allowing the user to sit in a more forwardly position on the seat pan 12. Research has shown that the forwardly seated positon is beneficial as this forwardly seated position allows the user to sit in a more alert posture and in a feet flat on the floor position. The moveable lumbar support member 22 provides support to the lower back of the user when the user is in this forwardly seated position.

Figure 1:
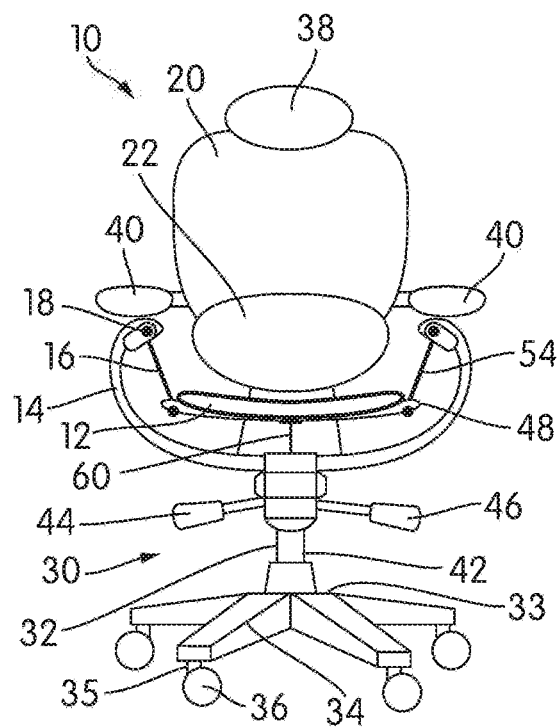
FIG. 1 shows a front elevational view of a chair with a suspended seat pan allowing for an omnidirectional movement of the seat pan in accordance with an embodiment of the present patent application.
Figure 2:
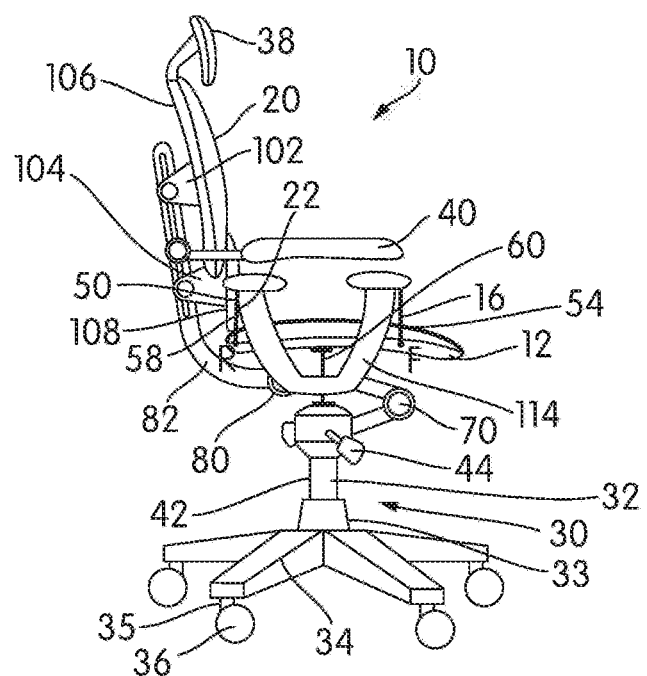
FIG. 2 shows a left side elevational view of the chair of FIG. 1.

FIGS. 1 and 2 show the chair 10 that includes the seat base member or the seat pan 12, a seat base support member 14, a suspension assembly 16 and an actuator 18. The present patent application relates to sitting products, for example, chairs, office chairs and or ergonomic chairs.

The chair 10 may include a seat back member 20 for supporting the back of the user while seated in the chair 10. The seat back member 20 may be moveable (pivotable or tiltable) between a normal, upright position and a plurality of rearwardly (with respect to the seat base support member 14 or a base assembly 30) tilted positions. Each of the plurality of rearwardly tilted positions may have a different degree of tilt of the seat back member 20. The user, in accordance with his/her own comfort requirement(s), may select the degree of tilt of the seat back member 20. The chair 10 may include a lock mechanism that may releasably lock the seat back member 20 in either the normal, upright position or one of the rearwardly, tilted positions. The seat back member 20 may include a lumbar support member 22 for supporting the lumbar area of the user while seated in the chair 10. In one embodiment, the seat back member 20 and/or lumbar support member 22 are optional.

The chair 10 may include the base assembly 30 that includes an upright, support column member 32 and a plurality of base members 34 extending radially from a lower portion 33 of the upright support column member 32. In the illustrated embodiment, the base assembly 30 includes five base members 34 (i.e., legs). However, the number of base members 34 can vary as long as the number of base members is sufficient to provide stability to the chair 10. Each of the plurality of base members 34 has a caster wheel 36 positioned at its free end 35 thereof so as to facilitate the movement of the chair 10 along a surface (e.g., floor or ground). The configuration and design of the base assembly 30 is not limiting, and any design to stably support the chair on the surface may be used. In one embodiment, the caster wheels 36 are optional.

The chair 10 may optionally include headrest 38. In one embodiment, the headrest 38 may be positioned above the seat back member 20. The headrest 38 may be adjustable in both its angle and its height. For example, the headrest 38 may be configured to be moved forward, rearward, at an angle, upward and/or downward to support the user's head (when the user is seated in the chair 10). The chair 10 may optionally include a pair of armrests 40. The armrests 40 are positioned on sides of the chair 10. The armrests 40 may be adjustable in their height so that the height of the armrests 40 is adjusted to support the user's arms. In one embodiment, the armrest 40 may be stationary. In another embodiment, the armrests 40 may be movable or pivotable between a horizontal, use (armrest) position (as shown in FIGS. 1 and 2) and a vertical, stored position (i.e., flush with the seat back member 20).

In one embodiment, the headrest 38 and the armrests 40 may be cushioned (with varying firmness and contours) to provide increased comfort to the user's head, neck and the arms, respectively. The headrest 38 and armrests 40 may be ergonomically designed to provide comfort and support to the user's neck, head and arms, respectively. The headrest 38 and the armrest 40 may include simple padded material, contoured padded material and engineered breathable mesh material to further provide comfort and support to the user's neck, head and the arms, respectively.

The chair 10 may include a height adjustment mechanism 42 configured for adjusting the height of the seat base support member 14 from the floor. In one embodiment, the height adjustment mechanism 42 may include a hydraulic mechanism, pneumatic mechanism, pressurized gas mechanism or mechanical mechanism (e.g., screw shaft assembly) for adjusting the vertical height of the seat base member 13 from the floor. In the illustrated embodiment, the height adjustment mechanism 42 includes a pneumatic cylinder assembly (i.e., gas charged piston). In one embodiment, the adjustment of the height of the seat base support member 14 from the floor also adjusts the height of the seat base member 12 from the floor.

In one embodiment, the chair 10 may include a tilt adjustment mechanism 70 configured for adjusting the tilt of the seat base support member 14 with respect to the base assembly 30. In one embodiment, the tilt adjustment mechanism 70 is a rotational tilt mechanism that uses an adjustable torsional spring for adjusting the tilt of the seat pan or base member 12.

In the illustrated embodiment, the height adjustment mechanism 42 includes a height adjustment lever or button 44 for adjusting the height of the seat base support member 14 from the floor. In one embodiment, the chair 10 may include one or more tilt adjustment levers or buttons 46 for adjusting the tilt of the seat back member 20 and/or the seat base member 12. The adjustment button(s) or lever(s) may be easily actuated by the user seated in the chair 10 in order to operate the height adjustment mechanism 42 and/or the tilt adjustment mechanism 70.

Figure 12:
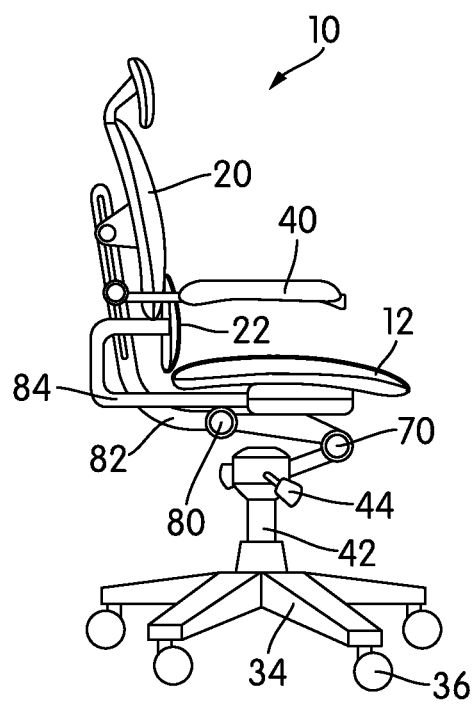
FIG. 12 shows a left side elevational view of the chair of FIG. 11.

The chair may include a back recline spring 80 (as clearly shown in FIG. 12). In one embodiment, the back recline spring 80 may be operatively connected between the seat back member 20 and the adjustment mechanism 42. In one embodiment, the back recline spring 80 may be configured to provide resistance to the reclining (tiltable) movement of the seat back member 20. In one embodiment, the seat back member 20 may be connected to a support frame member 82. In one embodiment, the support frame member 82 may have a hollow tubular cross-section. In one embodiment, the support frame member 82 extends at least partially along (behind) the seat back member 20 and at least partially (under) the seat base member 12. In one embodiment, the support frame member 82 may be operatively connected to the pneumatic cylinder 42.

In one embodiment, the height of the seat back member 20 and/or the lumbar support member 22 with respect to the seat base member 12 may be adjusted vertically along the support frame member 82. For example, carriages or similar mechanisms 102 and 104 may be positioned on rear surfaces 106 and 108 of the seat back member 20 and the lumbar support member 22, respectively. The carriages or similar mechanisms 102 and 104 are configured to slide up and down the support frame member 82 to adjust the height of the seat back member 20 and the lumbar support member 22, respectively.

The seat base member 12 may be a substantially rigid structural member configured to support the weight of the user seated in the chair 10. The seat base member 12 is constructed to support thighs and bottom of the user while seated in the chair 10.

Figure 9:
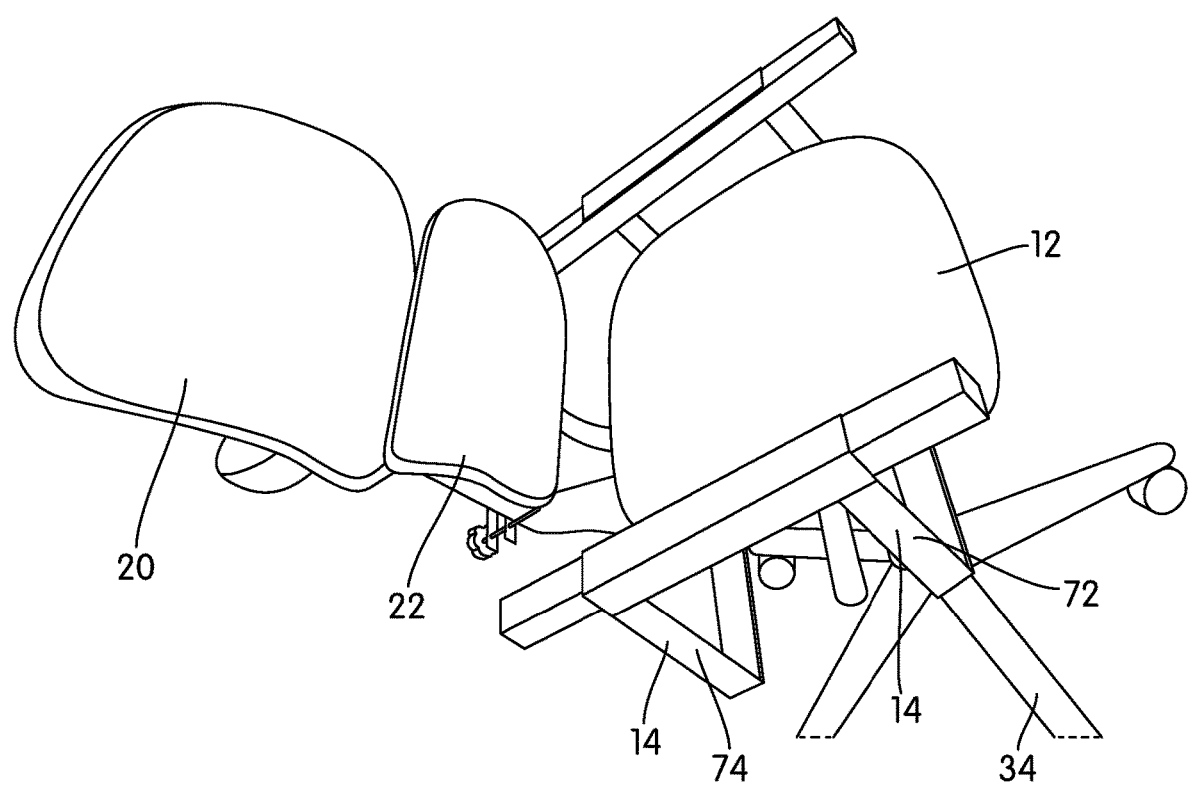
FIG. 9 shows a perspective view of an exemplary chair, with some portions of the chair removed for sake of clarity, in accordance with an embodiment of the present patent application.
Figure 10:
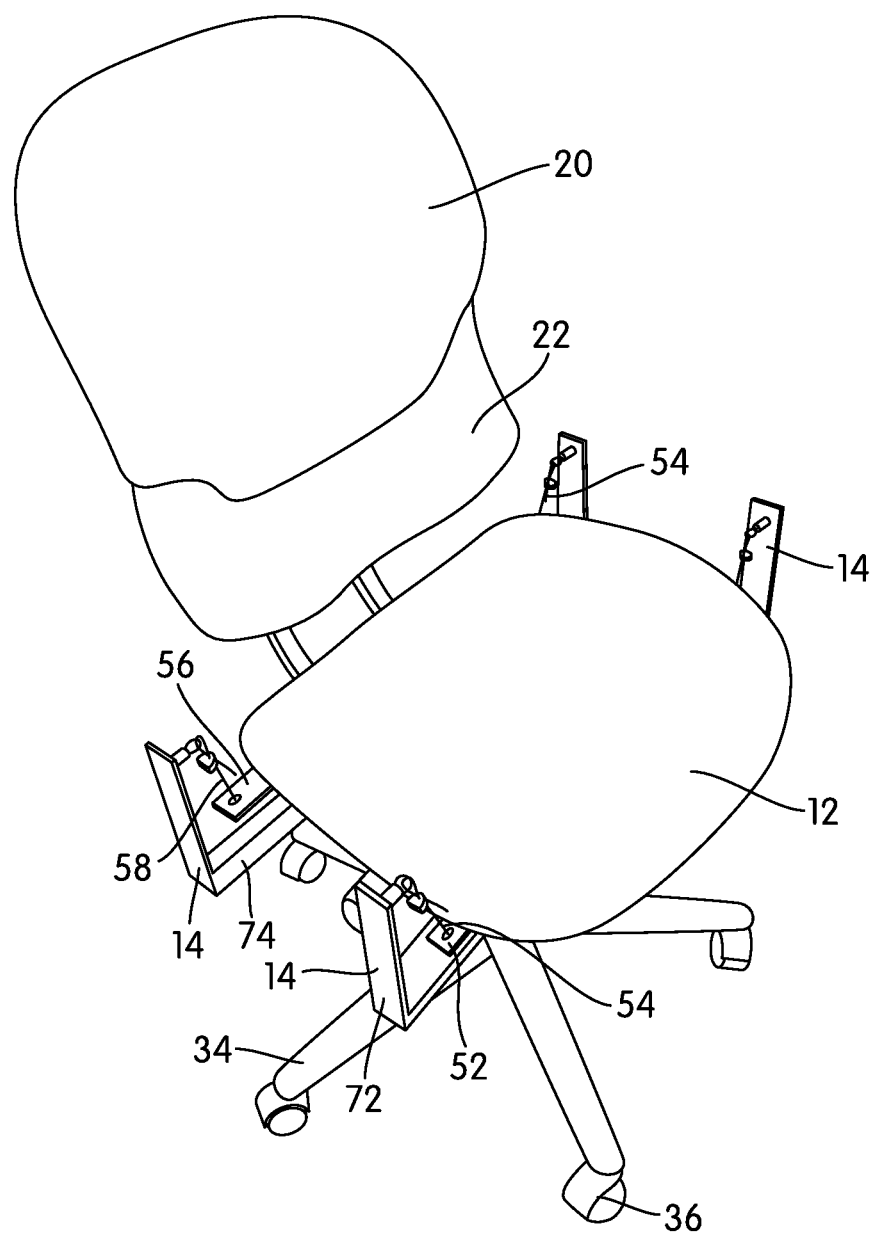
FIG. 10 shows a perspective view of another exemplary chair, with some portions of the chair removed for sake of clarity, in accordance with an embodiment of the present patent application.

In one embodiment, the seat base member 12 and the seat back member 20 (along with the lumbar support member 22) may include simple padded material or contoured padded material as shown in the exemplary chair of FIG. 10. In another embodiment, each of the seat base member 12 and the seat back member 20 (along with the lumbar support member 22) may include a peripheral frame member and engineered (contour forming) breathable mesh (e.g., elastomeric) material as shown in the exemplary chair of FIG. 9.

In one embodiment, the vertical height of the seat base support member 14 from the floor and the tilt angle of the seat base support member 14 with respect to the base assembly 30 may be adjusted by the user. The seat base support member 14 may also be configured to be rotatable with respect to the base assembly 30 to allow the user to turn/revolve while seated in the chair 10.

Figure 7:
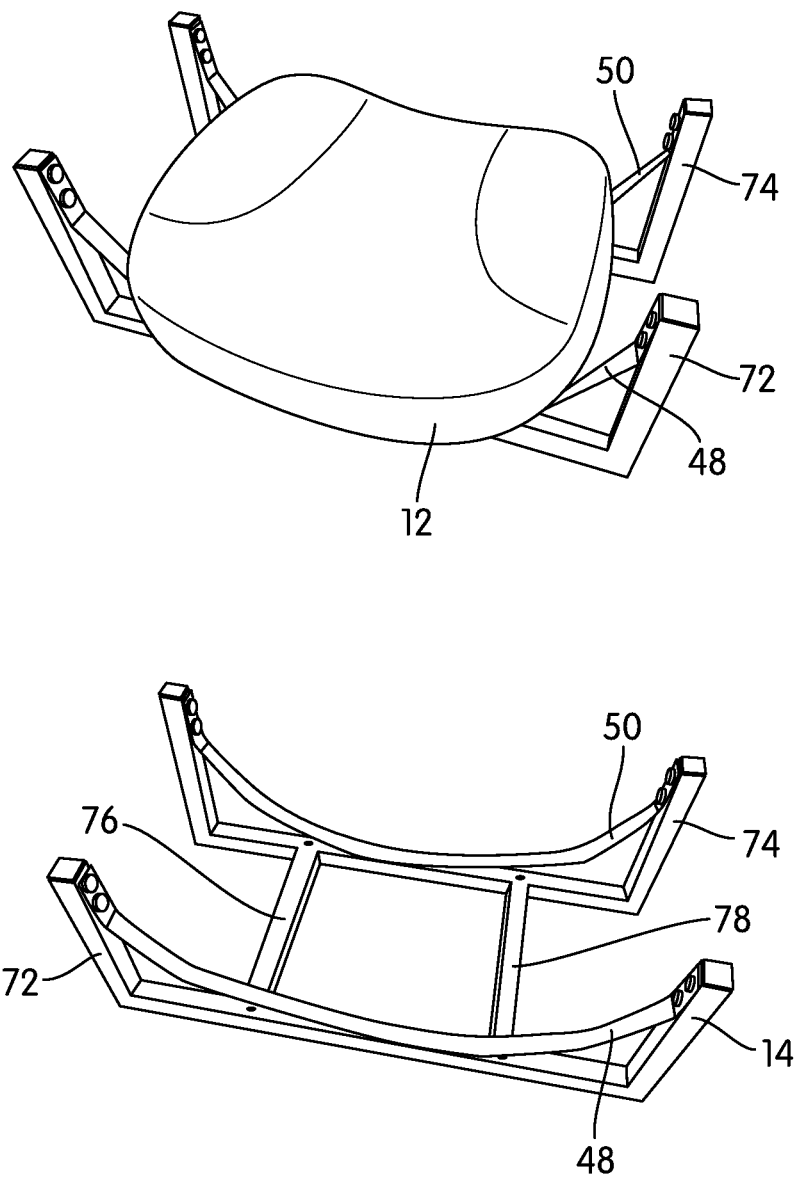
FIG. 7 shows perspective views of portions of a suspension assembly and the seat base member being attached to the portions of the suspension assembly in accordance with an embodiment of the present patent application.

Referring to FIG. 7 (lower), in one embodiment, the seat base support member 14 may be part of the suspension assembly and may be referred to as the suspension frame member. In one embodiment, the seat base support member 14 may include two generally U-shaped members 72 and 74 that are connected to each other by two transverse members 76 and 78. In one embodiment, the two transverse members 76 and 78 are optional as shown in the exemplary suspension assembly of FIG. 8. In one embodiment, as shown in FIG. 7, the two generally U-shaped members 72 and 74 and the two transverse members 76 and 78 of the seat base support member 14 are configured to support the seat base member 12 thereon. In one embodiment, the seat base support member 14 may be positioned on the base assembly 30.

The suspension assembly 16 is operatively connected to the seat base member 12 and the seat base support member 14. Referring to FIGS. 7-10, the suspension assembly 16 includes a first suspension member 48, a second suspension member 50, and an optional movement limiter assembly 60. The seat base member 12 is constructed and arranged to be suspended by the first suspension member 48, the second suspension member 50 and the movement limiter assembly 60. In one embodiment, the movement limiter assembly 60 is a centering device that biases the seat base member to the center (or a center position).

In one embodiment, the first suspension member 48 may include two suspension members that are interconnected to act as one suspension member. In one embodiment, the second suspension member 50 may include two suspension members that are interconnected to act as one suspension member. For example, the two suspension members of the first suspension member 48 and the two suspension members of the second suspension member 50 are configured to function as four separate suspension members. In one embodiment, the four suspension members may be in the form of cables attached or connected to the seat pan frame 14.

In one embodiment, the second suspension member 50 may be attached to the frame member 74. In one embodiment, the frame member 74 may be optionally attached to the seat back member 20. For example, when the frame member 74 is attached to seat back member 20, the frame member 74 may be configured to have an open U shaped configuration so as to have nearly or substantially flat configuration. In one embodiment, the frame member 74 may be completely eliminated from the chair 10 and the second suspension member 50 may be directly suspended to the seat back member 20 (e.g., using simple hardware).

Referring to FIGS. 10A-10G, the suspension assembly 16 may also include a drive system 500 that is operatively connected to the actuator 18, the first suspension member 48, and the second suspension member 50 such that actuation of the actuator 18, by the user, operates the drive system 500 to control the first suspension member 48 and the second suspension member 50. In one embodiment, the drive system 500 may include a spring and pulley system.

In one embodiment, as shown in FIGS. 10A-10G, the drive system 500 includes a pulley or cam 502, a spring 504, and a ratchet assembly 506. The spring 504 may be a torsion spring that is configured to dampen the movement of the cam or pulley 502. In one embodiment, the spring 504 is optional.

Figure 10A:
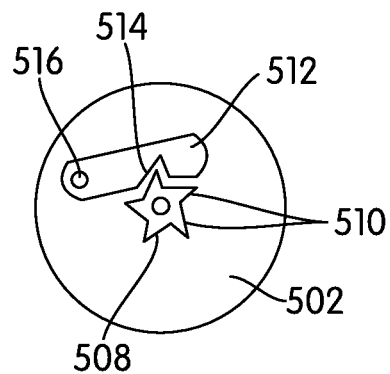
FIGS. 10A-10C show views of an exemplary lock or ratchet assembly that is used to control the length of suspension members that suspend the seat base member of the chair in accordance with an embodiment of the present patent application.

The ratchet assembly 506 may be configured to lock the length of the cable or the suspension members 48 or 50 at a desired position until released. For example, referring to FIGS. 10A-C, the ratchet assembly 506 may include a ratchet wheel 508 and a locking pawl 512. The ratchet wheel 508 is configured to be rotatable with and attached to the pulley 502, and includes ratchet teeth 510. The locking pawl 512 includes a lock surface 514 and a pivot point 516 on which the locking pawl 512 pivots for engagement with the ratchet wheel 508. The lock surface 514 is adapted for engagement with a ratchet tooth 510 of the ratchet wheel 508. FIG. 10A shows the lock surface 514 of the locking pawl 512 being engaged with the ratchet tooth 510 of the ratchet wheel 508 so as to prevent or inhibit rotation of the ratchet wheel 508 and the pulley 502. In this position, the ratchet assembly 506 is configured to lock the length of the cable or the suspension members 48 or 50 at a desired position.

Figure 10B:
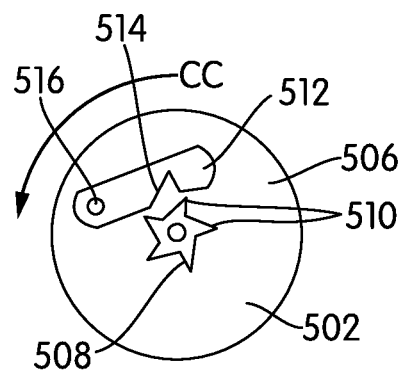
Figure 10C:
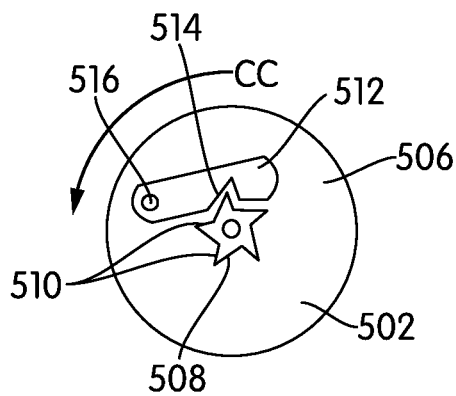
Figure 10D:
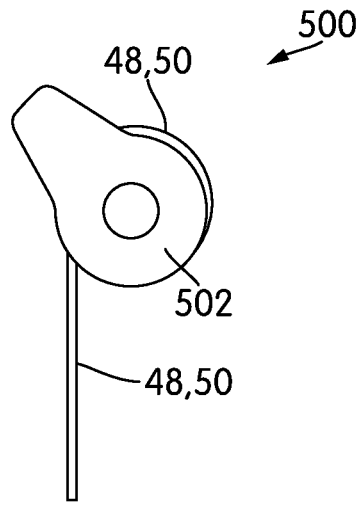
FIGS. 10D-10G show views of an exemplary drive assembly that is used to lengthen or shorten the suspension members of the chair in accordance with an embodiment of the present patent application.

When the suspended seat base member 12 is moved by the user, the suspension members 48 or 50 on which the seat base member 12 is suspended are lengthened (or shortened) by rotating the pulley 502 on which the suspension members 48 or 50 are wound. That is, the suspension members 48 or 50 are wound up around the pulley 502 and the pulley 502 is rotated when the suspension members 48 or 50 are pulled. Rotation of the pulley 502 causes rotation of the ratchet wheel 508 attached thereto. This movement causes the pawl 512 to pivot away from the ratchet wheel 508, disengage the locking pawl 512 from the ratchet teeth 510, and allow the pulley 502 (and the ratchet wheel 508 attached thereto) to rotate freely in the direction of an arrow CC. FIG. 10B shows the ratchet assembly 506 during the free rotation of the pulley 502 (and the ratchet wheel 508 attached thereto). Once the desired position of the seat base member 12 is achieved (and there is no further lengthening of the cables and/or rotation of the pulley 502), the pawl 512 is configured to pivot back into engagement with the ratchet teeth 510 so as to prevent or inhibit rotation of the ratchet wheel 508 and the pulley 502 as shown in FIG. 10C.

Figure 10E:
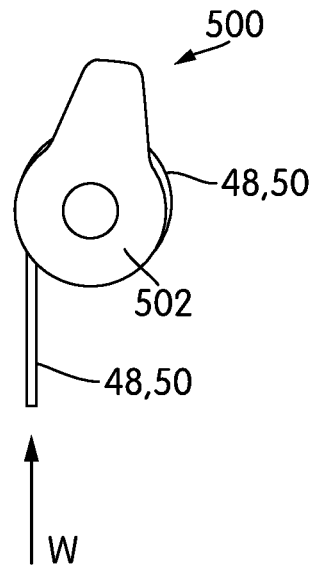
Figure 10F:
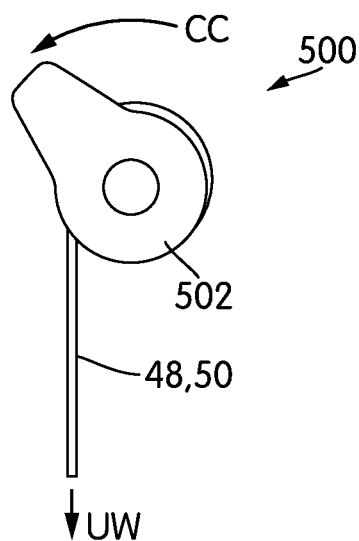
Figure 10G:
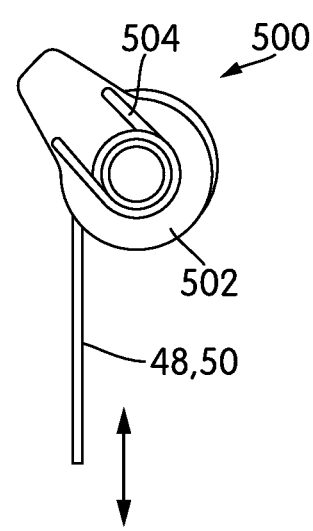

Referring to FIGS. 10D-10G, rotating the cam or pulley 502 is configured to lengthen or shorten the cable or suspension members 48 or 50 that suspend the seat base member 12. FIG. 10E shows winding direction as shown by an arrow W in which the cable or suspension members 48 or 50 are wound for removing the slack therefrom. FIG. 10F shows unwinding direction as shown by an arrow UW in which the cable or suspension members 48 or 50 are unwound to allow for the adjustment of the seat base member 12.

The actuator 18 may include user input devices such as dials, joysticks, slides, switches, and/or buttons. The actuator 18 may be a mechanical actuator or an electro-mechanical actuator. The actuator may be a manual adjustment performed by a user seated in the chair 10. In one embodiment, a single actuator may be configured to control both the first suspension member 48 and the second suspension member 50. In another embodiment, a plurality of actuators may be used, where each is configured to control each side of the each of the first suspension member 48 and the second suspension member 50.

Figure 8:
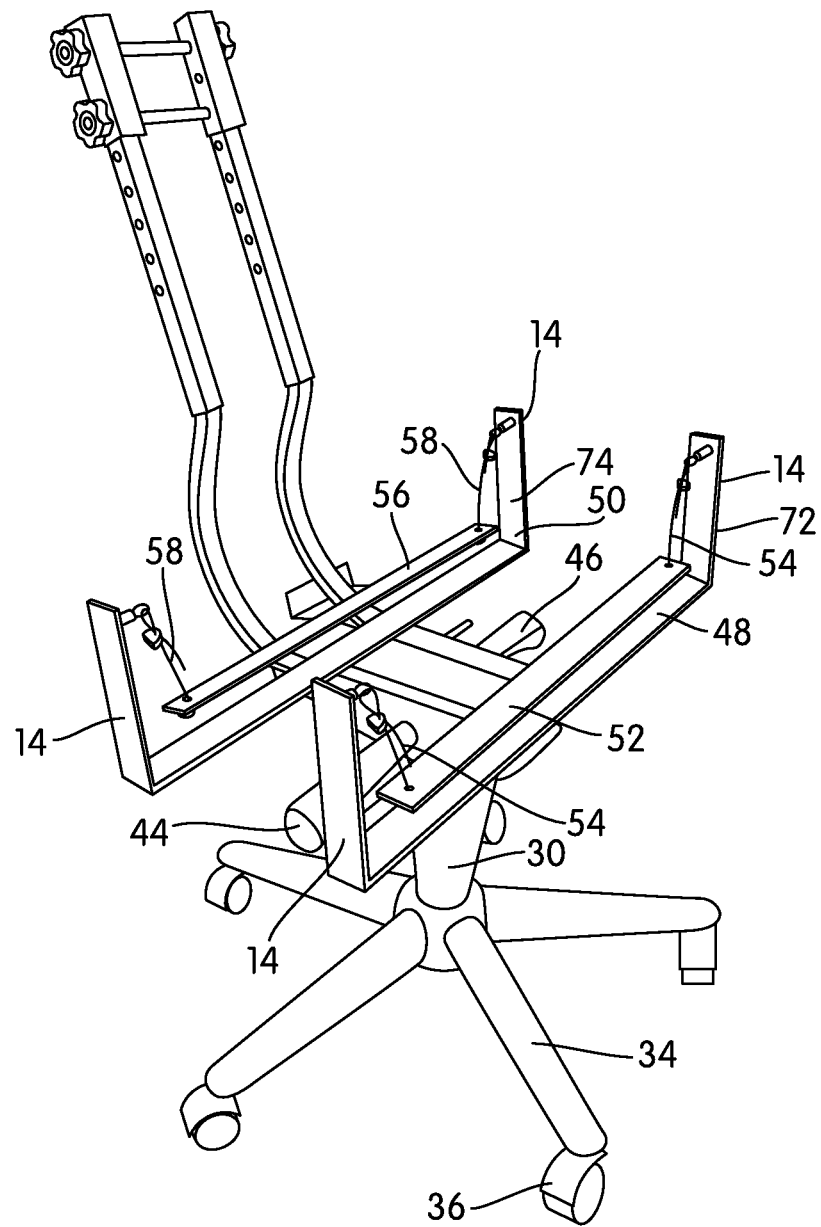
FIG. 8 shows a perspective view of the chair, with some portions of the chair removed for sake of clarity, in accordance with an embodiment of the present patent application.

Referring FIGS. 7-10, the first suspension member 48 is disposed at a forward position F of the chair 10 and the second suspension member 50 is disposed at a rearward position R of the chair 10. In one embodiment, as shown in FIG. 8, the first suspension member 48 may include a first suspension base member 52 and two cable or linkage members 54 positioned at the ends of the first suspension base member 52. In one embodiment, the first suspension base member 52 may optionally be eliminated if the two linkage members 54 are directly attached to the seat pan frame 14. Similarly, the second suspension member 50 may include a second suspension base member 56 and two cable or linkage members 58 positioned at the ends of the second suspension base member 56. In one embodiment, the second suspension base member 56 may optionally be eliminated if the two linkage members 58 are directly attached to the seat pan frame 14. One end of each of the linkage or cable members is connected to the drive system 500 and the other end of the linkage or cable members is connected to the respective suspension base members. The suspension base members may be constructed to support the seat base member 12 thereon.

The movement limiter assembly 60 may be an adjustable self-centering mechanism. In one embodiment, the movement limiter assembly 60 may be multidirectional movement limiter assembly. In one embodiment, the movement limiter assembly 60 may be operatively connected to the actuator 18 such that, when the actuator 18 is actuated by user, the movement limiter assembly 60 may be tightened or loosened to control the movement of the seat base member 12.

The movement limiter assembly 60 may be configured to allow the seat base member 12 to move from a near no movement position/condition (as shown in FIGS. 3C and 3D) to a more free uncontrolled motion and there between (as shown in FIGS. 3A, 3B, 4A, and 4B).

In one embodiment, the optional movement limiter assembly 60 may be connected or assembled to the seat base member 12. The movement limiter assembly 60 may be configured to enable the user to tighten or loosen the limiter assembly 60 so as to control the movement of the seat base member 12. For example, by tightening the movement limiter assembly 60, the range of the movement of the seat base member 12 may be reduced or return force to center may be increased. In one embodiment, the seat base member 12 may move freely with no resistance except when the movement limiter assembly 60 is engaged. In one embodiment, the movement limiter assembly 60 is configured to provide some resistance such that more force is needed to move the seat base member 12 off its center position.

Figure 10H:
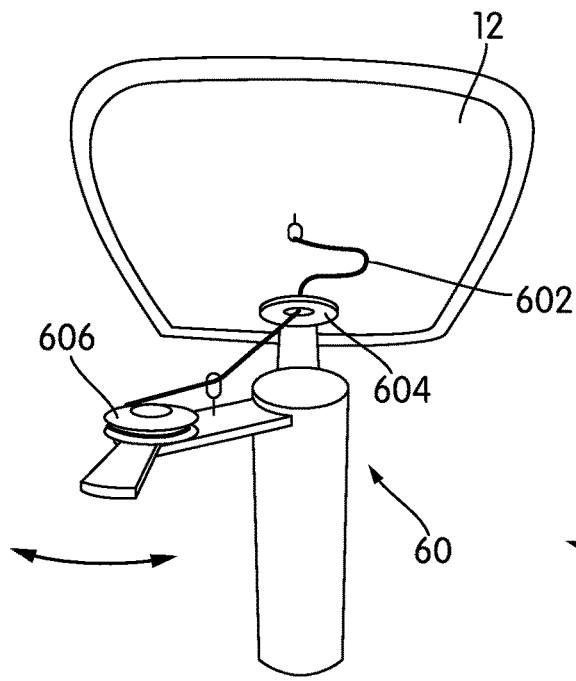
FIGS. 10H-10J show views of an exemplary movement limiter assembly that is used to control the movement of the seat base member of the chair in accordance with an embodiment of the present patent application.
Figure 10I:
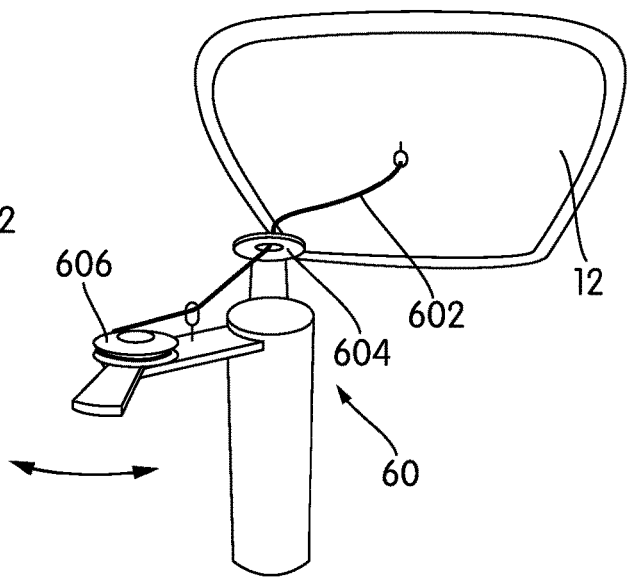
Figure 10J:
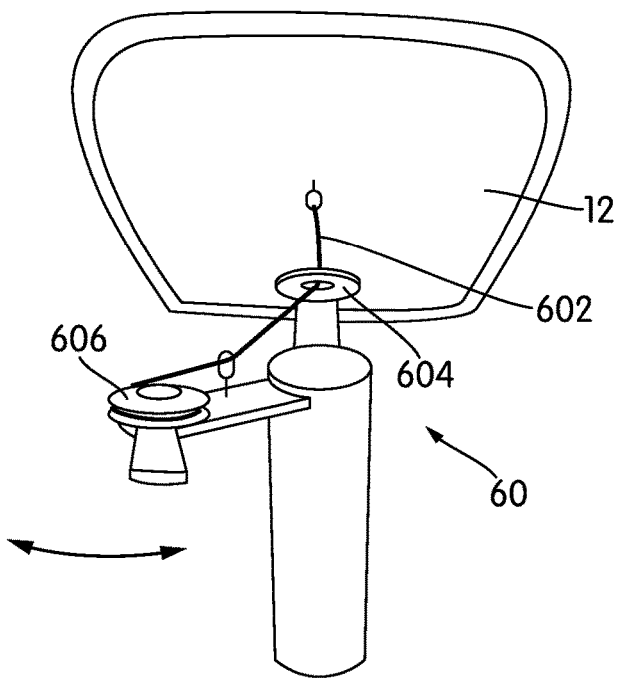
Figure 10K:
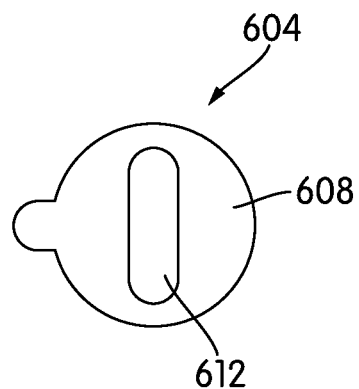
FIGS. 10K-10N show views of disks with elongated openings that are used in the movement limiter assembly and their various configurations, respectively in accordance with an embodiment of the present patent application.
Figure 10L:
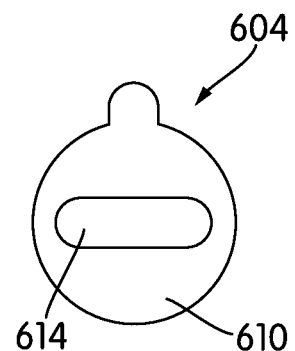

FIGS. 10H-10J show views of an exemplary movement limiter assembly 60 that is used to control the movement of the seat base member 12. In one embodiment, the movement limiter assembly 60 may include a cable 602 attached to the base of the seat base member 12 at one end and is guided through an eyelet 604 to a spool or reel 606. In one embodiment, the cable 602 is a flexible, elastomeric member that is attached to the spool 606 (with or without a torsion spring) at its other end. The spool 606 is configured to rotate and shorten the length of the cable 604 limiting the allowed movement of the seat base member 12 in all directions. In one embodiment, the spool 606 may have a torsion spring as to dampen the shock of reaching the limit of the allowed movement of the seat base member 12. FIGS. 10H and 10I show the cable 602 having some slack to provide the movement of the seat base member 12. FIG. 10J shows the cable 602 being tightened to provide limited or no movement of the seat base member 12.

Figure 10M:
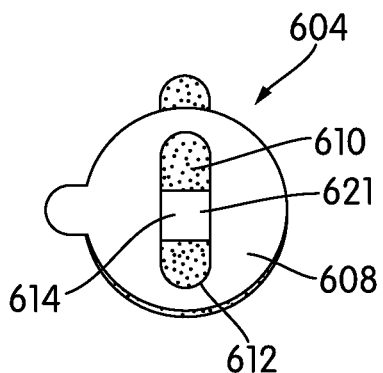
Figure 10N:
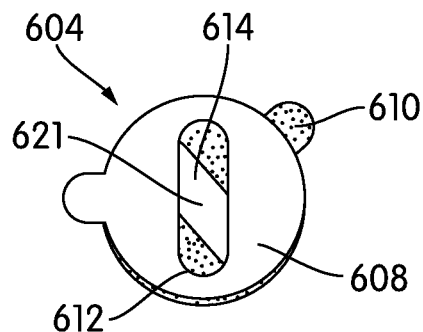

In one embodiment, the eyelet 604 may have a shaped configuration that is configured to be adjusted to limit movement (forward and back, or right and left) of the seat base member 12. For example, as shown in FIGS. 10K-10N, the eyelet 604 may include disks 608, 610 with elongated openings 612, 614. That is, the eyelet 604 may be constructed from the stacked disk shapes 608, 610 that rotate around the elongated center openings 612, 614 allowing the cable 602 to move in a limited or free arrangement depending on the orientation of the elongated openings 612, 614. The openings 612, 614 are oriented to create a controlling aperture 621 to limit the movement of the cable 602. FIGS. 10M and 10N show two different orientations of the elongated openings 612, 614 that provide two different controlling apertures 621 to limit the movement of the cable 602.

In one embodiment, the movement limiter assembly 60 may be configured to restrict the movement of the seat base member 12 to a forward and back movement or a side to side movement. In one embodiment, the movement limiter assembly 60 may be configured to lock the seat base member 12 in place (e.g., depending on the how the user engages the movement limiters). In one embodiment, the movement limiter assembly 60 may be configured to limit the movement of the seat base member 12 in a forward to back or a side to side direction.

As shown in FIG. 3C, the movement limiter assembly 60 is in a first configuration to support the seat base member 12 in its near no movement position/condition. When the actuator 18 is actuated by user, the movement limiter assembly 60 may be operated to move from this first configuration (FIG. 3C) to a second configuration as shown in FIGS. 3A, 3B, 3E, and 4A-4D. FIG. 3D shows the movement limiter assembly 60 in an intermediate position between its first configuration and its second configuration.

The actuator 18 may be configured to operate the suspension assembly 16 for translational or linear movement of the seat base member 12 with respect to the seat base support member 14 along three mutually perpendicular axes (i.e., X, Y, and Z axes) and/or rotational movement the seat base member 12 with respect to the seat base support member 14 along the same three mutually perpendicular axes (i.e., X, Y, and Z axes). That is, the actuator 18 may be configured to operate the suspension assembly 16 for providing movement of the seat base member 12 with respect to the seat base support member 14 in at least three degrees of freedom.

The translational movement or displacement generally refers to linear movement or displacement along these three mutually perpendicular X, Y and Z axes. For example, the translational movement along the X axis generally refers to a forward and backward movement in a horizontal seating plane. The translational movement along the Y axis generally refers to a left to right side movement in the horizontal seating plane. The translational movement along the Z axis generally refers to an up and down movement perpendicular to the horizontal seating plane.

The rotational movement or displacement generally refers to rotation about these same three mutually perpendicular X, Y and Z axes. The rotation about the three mutually perpendicular X, Y and Z axes is generally referred to as yaw (Z-axis), pitch (Y-axis) and roll (X-axis). For example, the rotational movement about the X axis generally refers to a left or right side tilting movement. The rotational movement about the Y axis generally refers to a forward or (rearward) backward tilting movement. The rotational movement about the Z axis generally refers to a left or right turning movement.

In one embodiment, the seat base member 12 may have at least three degrees of freedom. The degree of freedom generally refers to the freedom of movement of the seat base member 12 in the three-dimensional space. In one embodiment, the at least three degrees of freedom may include three translational movements of the seat base member 12 along these three mutually perpendicular X, Y and Z axes. In one embodiment, the at least three degrees of freedom include a forward and backward movement of the seat base member 12 on the X-axis, an up and down movement of the seat base member 12 on the Z-axis, and a side to side (left to right) movement of the seat base member 12 on the Y-axis. In another embodiment, the at least three degrees of freedom may include two translational movements of the seat base member 12 along two of the three mutually perpendicular X, Y and Z axes (i.e., the X and Y axes) and one rotation movement of the seat base member 12 about one of the same three mutually perpendicular X, Y and Z axes (i.e., the Z-axis).

In one embodiment, the seat base member 12 may have at least four degrees of freedom. In one embodiment, the at least four degrees of freedom may include two translational movements of the seat base member 12 along two of the three mutually perpendicular X, Y and Z axes and two rotational movements of the seat base member 12 about two of the same three mutually perpendicular X, Y and Z axes. In another embodiment, the at least four degrees of freedom may include three translational movements of the seat base member 12 along the three mutually perpendicular X, Y and Z axes and one rotational movement of the seat base member 12 about one of the same three mutually perpendicular X, Y and Z axes. In another embodiment, the at least four degrees of freedom may include three rotational movements of the seat base member about the three mutually perpendicular X, Y and Z axes and one translational movement of the seat base member 12 along one of the same three mutually perpendicular X, Y and Z axes.

In one embodiment, the seat base member 12 may have at least five degrees of freedom. In one embodiment, the at least five degrees of freedom may include two translational movements of the seat base member 12 along two of the three mutually perpendicular X, Y and Z axes and three rotational movements of the seat base member 12 about three of the same three mutually perpendicular X, Y and Z axes. In another embodiment, the at least five degrees of freedom may include three translational movements of the seat base member 12 along the three mutually perpendicular X, Y and Z axes and two rotational movements of the seat base member 12 about two of the same three mutually perpendicular X, Y and Z axes.

In one embodiment, the seat base member 12 may have six degrees of freedom. In one embodiment, the at least six degrees of freedom may include three translational movements of the seat base member 12 along the three mutually perpendicular X, Y and Z axes and three rotational movements of the seat base member 12 about three of the same three mutually perpendicular X, Y and Z axes.

In one embodiment, the seat base member 12 may have five degrees of freedom (including three rotational movements of the seat base member about three mutually perpendicular X, Y and Z axes and two translational movements of the seat base member along the mutually perpendicular X and Y axes) provided by the suspension assembly and may have vertical adjustment provided by the cylinder. In one embodiment, the seat base member 12 may have four degrees of freedom (including two rotational movements of the seat base member about the two mutually perpendicular X and Y axes and two translational movements of the seat base member 12 along the two mutually perpendicular X and Y axes) provided by the suspension assembly and may have vertical adjustment provided by the cylinder.

Figure 4A:
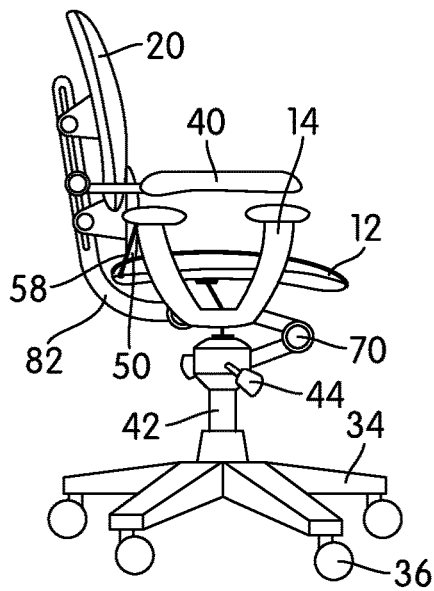
FIGS. 4A and 4E show left side elevational views of the chair when the seat base member is in a rearward position and FIGS. 4B and 4F show left side elevational views of the chair when the seat base member is in in a forward position in accordance with an embodiment of the present patent application.
Figure 4B:
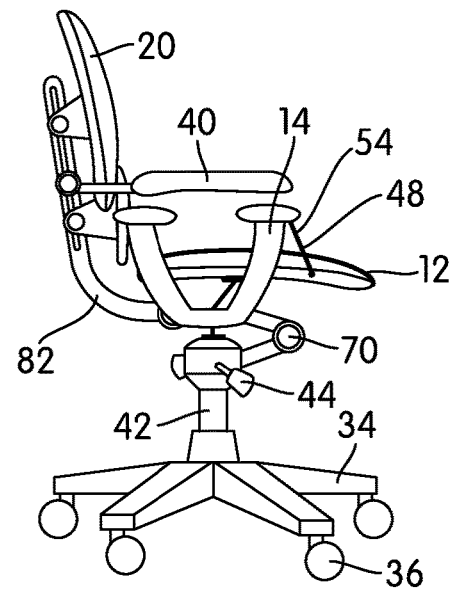
Figure 4C:
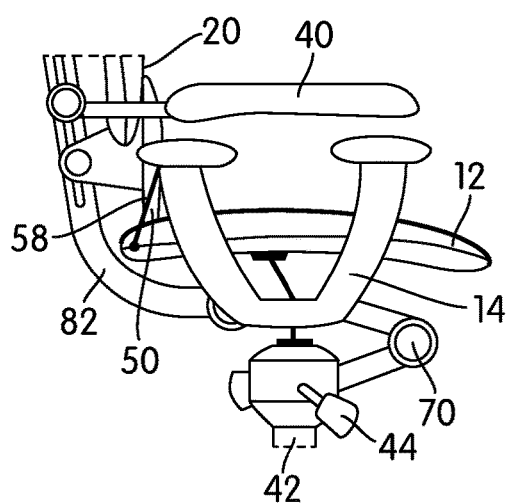
FIGS. 4C and 4D show partial, up-close left side elevational views of the chair when the seat base member is in the rearward position and in the forward position, respectively, in accordance with an embodiment of the present patent application.
Figure 4D:
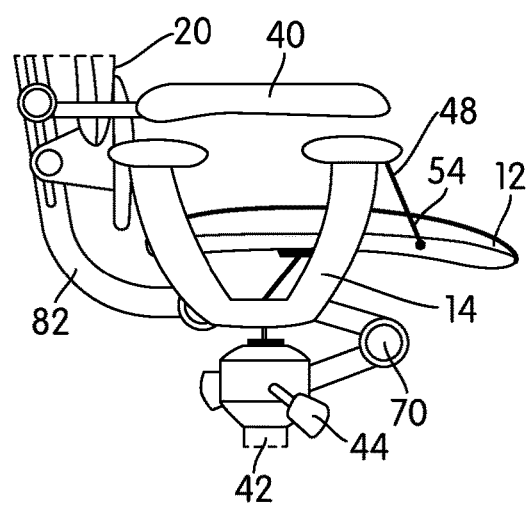
Figure 4E:
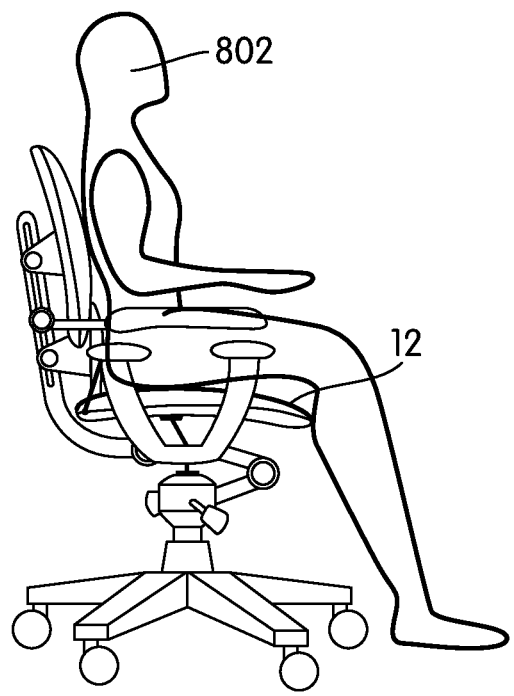
Figure 4F:
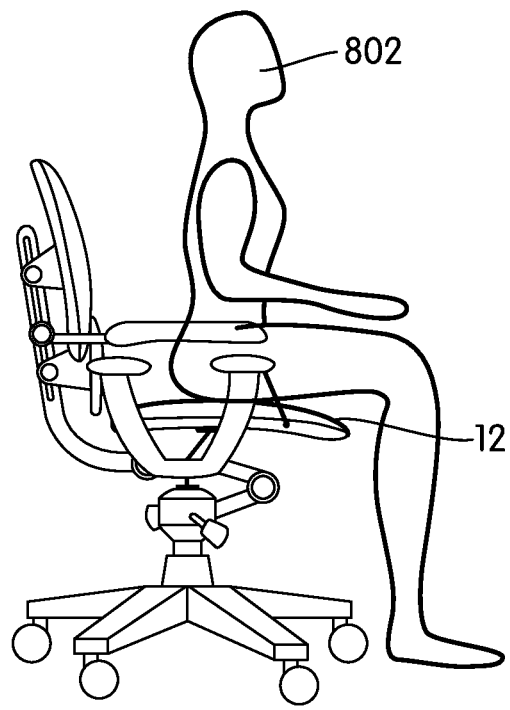

In one embodiment, when the actuator 18 is actuated by user, the movement limiter assembly 60 may be operated to control the movement of the seat base member 12 with respect to the seat back support member 14. For example, the movement limiter assembly 60 may be configured to allow the seat base member 12 move to a rearward position as shown in FIGS. 4A, 4C and 4E and to a forward position as shown in FIGS. 4B, 4D and 4F. The suspended seat pan 12 allows a user or person 802 to rock forward to a more alert and active positon or moving positon. The ability of the seat base member/pan 12 to move dynamically allows the user to vary his/her body positioning in the chair 10 dynamically, as opposed to a chair with a static fixed position for the seat pan. The movement limiter assembly 60 may be configured to allow the seat base member 12 move to a left side position as shown in FIG. 3A and to a right side position as shown in FIGS. 3B and 3E. As shown in FIGS. 3A, 3B, 3E, and 4A-4D, the movement limiter assembly 60 may be in its extended (angular and flexible) configuration when the movement limiter assembly 60 is supporting the seat base member 12 in one of the forward, rearward, left or right side positions. The movement limiter assembly 60 may be configured to lock the seat base member 12 in place in one of the positioned described above.

When the user actuates the actuator 18, the actuator 18 may operate the drive system 500 of the suspension assembly to either tighten or loosen the cable or linkage members of the suspension assembly. In one embodiment, tightening the cable or linkage members may also be referred to as shortening of the cable or linkage members and loosening the cable or linkage members may also be referred to as the lengthening of the cable or linkage members.

Figure 6A:
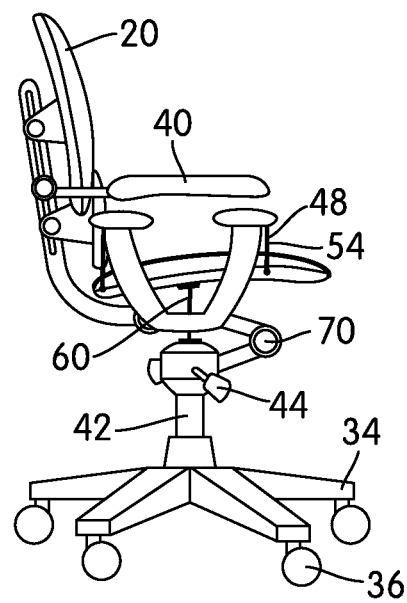
FIGS. 6A and 6B show left side elevational views of the chair when the seat base member is in front to back tilted or angled (downwardly at the back/rear side and downwardly at the front side, respectively) positions in accordance with an embodiment of the present patent application.
Figure 6B:
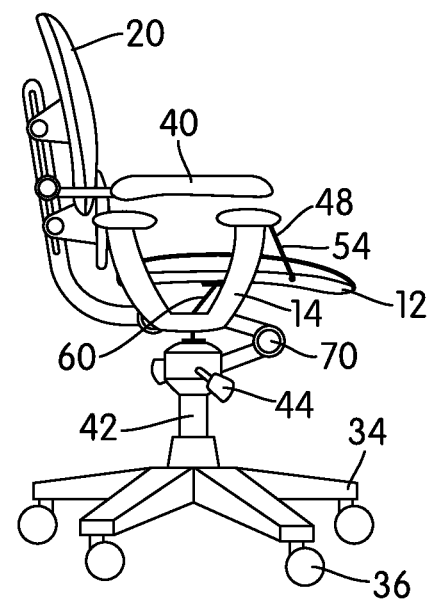

When the drive system 500 of the suspension assembly tightens both the cable or linkage members of the second suspension member 50 and loosens both the cable or linkage members of the first suspension member 48, the seat base member 12 is moved to a forward tilt position as shown in FIG. 6B. When the drive system 500 maintains both the cable or linkage members of the second suspension member 50 unchanged or the same and loosens both the cable or linkage members of the first suspension member 48, the seat base member 12 is moved to the forward tilt position as shown in FIG. 6B. When the drive system 500 tightens the cable or linkage members of the second suspension member 50 and maintains both the cable or linkage members of the first suspension member 48 unchanged or the same, the seat base member 12 is moved to the forward tilt position as shown in FIG. 6B.

When the drive system 500 tightens both the cable or linkage members of the first suspension member 48 and loosens both the cable or linkage members of the second suspension member 50, the seat base member 12 is moved to a rearward tilt position as shown in FIG. 6A. When the drive system 500 maintains both the cable or linkage members of the first suspension member 48 unchanged or the same and loosens both the cable or linkage members of the second suspension member 50, the seat base member 12 is moved to the rearward tilt position as shown in FIG. 6A. When the drive system 500 tightens both the cable or linkage members of the first suspension member 48 and maintains both the cable or linkage members of the second suspension member 50 unchanged or the same, the seat base member 12 is moved to a rearward tilt position as shown in FIG. 6A.

Figure 5A:
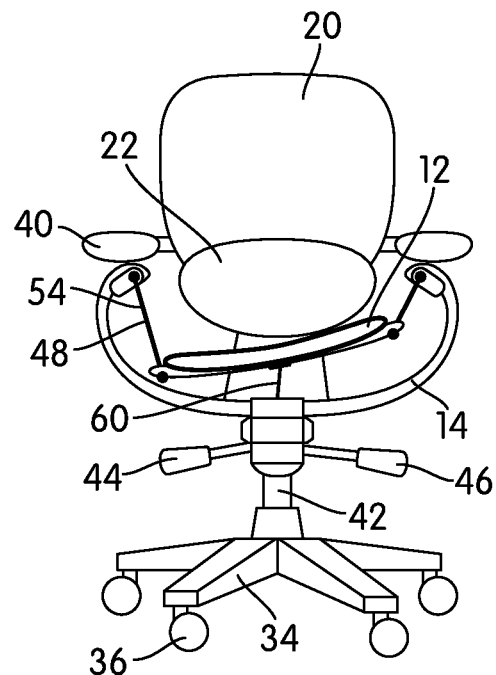
FIGS. 5A and 5B show front elevational views of the chair when the seat base member is in side tilted or angled (downwardly at the left side and downwardly at the right side, respectively) positions in accordance with an embodiment of the present patent application.

When the drive system 500 tightens the right side cable or linkage members of the second suspension member 50 and the first suspension member 48 and loosens the left side cable or linkage members of the second suspension member 50 and the first suspension member 48, the seat base member 12 is moved to a left side tilt position as shown in FIG. 5A. When the drive system 500 maintains the right side cable or linkage members of the second suspension member 50 and the first suspension member 48 unchanged or the same and loosens the left side cable or linkage members of the second suspension member 50 and the first suspension member 48, the seat base member 12 is moved to the left side tilt position as shown in FIG. 5A. When the drive system 500 tightens the right side cable or linkage members of the second suspension member 50 and the first suspension member 48 and maintains the left side cable or linkage members of the second suspension member 50 and the first suspension member 48 unchanged or the same, the seat base member 12 is moved to the left side tilt position as shown in FIG. 5A.

Figure 5B:
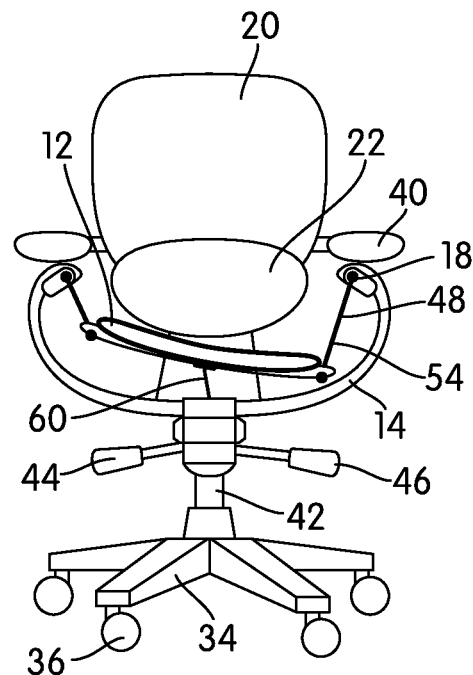

When the drive system 500 tightens the left side cable or linkage members of the second suspension member 50 and the first suspension member 48 and loosens the right side cable or linkage members of the second suspension member 50 and the first suspension member 48, the seat base member 12 is moved to a right side tilt position as shown in FIG. 5B. When the drive system 500 maintains the left side cable or linkage members of the second suspension member 50 and the first suspension member 48 unchanged or the same and loosens the right side cable or linkage members of the second suspension member 50 and the first suspension member 48, the seat base member 12 is moved to the right side tilt position as shown in FIG. 5B. When the drive system 500 tightens the left side cable or linkage members of the second suspension member 50 and the first suspension member 48 and maintains the right side cable or linkage members of the second suspension member 50 and the first suspension member 48 unchanged or the same, the seat base member 12 is moved to the right side tilt position as shown in FIG. 5B. The actuator 18 and the drive system 500 are optional and need not be included in all the embodiments of the present patent application.

In one embodiment, the lumbar support member 22 is operatively connected to the seat base member 12 so as to move the lumbar support member 22 along with the seat base member 12. That is, the lumbar support portion 22 may be configured to be moved with the suspended multidirectional seat base member 12 if desired. In another embodiment, the lumbar support member 22 is not operatively connected to the seat base member 12 so that the lumbar support member 22 does not move along with the seat base member 12.

Figure 10P:
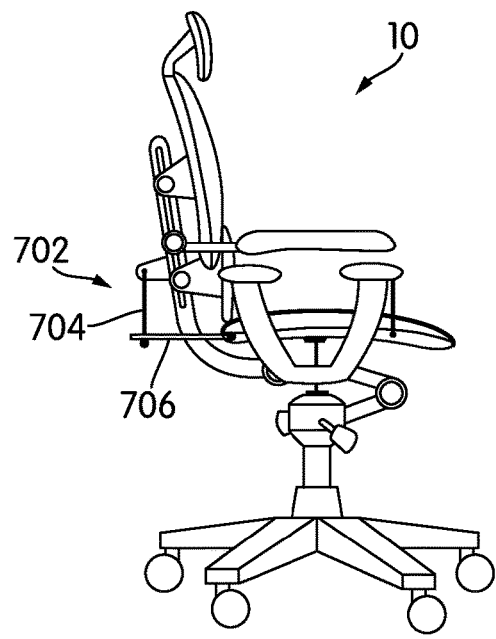
FIG. 10P shows a left side elevational view of the chair with an interaction element that links the seat base member to the seat back member or support frame member in accordance with an embodiment of the present patent application.

In one embodiment, the multidirectional seat base member 12 may be connected to the seat back member 20 so the seat base member 12 moves as the seat back member 20 is reclined backwards. For example, the chair 10 may include an interaction element 702 as shown in FIG. 10P to link the multidirectional seat base member 12 to the seat back member 20 or support frame member 82. In one embodiment, the interaction element 702 may include members 704 and 706 that may act together as a single member. In one embodiment, the members 704 and 706 may be in the form of a flexible member or a cable. In another embodiment, the multidirectional seat base member 12 may be not connected to the seat back member 20.

The chair 10 may include a controlling and adjustment mechanism that may be configured to regulate the return of the seat base member 12 to its normal, centered position (as shown in FIGS. 3C and 3D). In one embodiment, the controlling and adjustment mechanism may be configured to regulate the suspension assembly for front to back (pitch), and lateral (roll) positioning. In one embodiment, the controlling and adjustment mechanism may be configured to receive a signal from the actuator 18 when it is actuated by the user. In response to the signal, the controlling and adjustment mechanism may be configured to operate the suspension assembly to move the seat base member 12.

Figure 10Q:
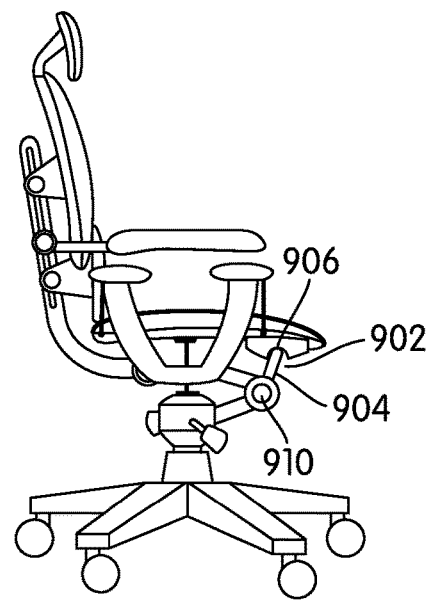
FIGS. 10Q and 10R show left side elevational views of the chair with an exemplary seat base member locking mechanism in a locked and an unlocked configuration, respectively, in accordance with an embodiment of the present patent application.
Figure 10R:
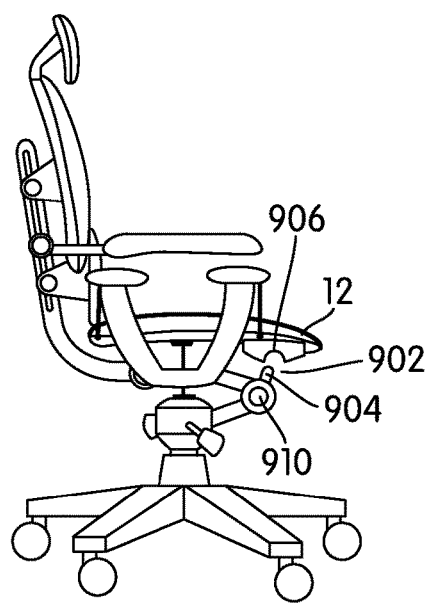

FIGS. 10Q and 10R show views of a seat base member locking mechanism 902 in a locked and an unlocked configuration, respectively. When in the locked configuration, the seat base member 12 does not move, is locked and does not provide any movement. When in the unlocked configuration, the seat base member 12 provides free uncontrolled movement of the seat base member 12 in all directions (except when the movement limiter assembly 60 is engaged).

In one embodiment, the seat base member locking mechanism 902 includes a lock member 904 and a lock surface 906. The lock member 904 may be spring biased and may be in the form of a pin member. The lock surface 906 may be disposed on the seat base member 12 and may be in the form of a notch, a slot or an opening. When the seat base member locking mechanism 902 is in the unlocked configuration, a force against the lock member 904 causes the lock member 904 to retract and compress the spring. When the (compression) force is released (by actuation of a button 910 by a user), the (expansion) force of the spring causes the lock member 604 to be pushed outwardly to engage with the lock surface 906 so as to lock the seat base member 12 in the locked configuration.

Figure 10S:
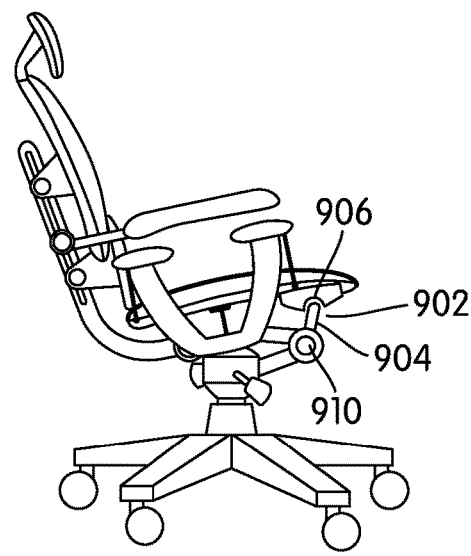
FIG. 10S shows a left side elevational view of the chair with the exemplary seat base member locking mechanism in the locked configuration when the user is seated in a reclined position in accordance with an embodiment of the present patent application.

FIG. 10S shows a view of the seat base member locking mechanism 902 in the locked configuration when the user is seated in a reclined position (when the user's back is engaged with the seat back member). When the user is seated in a forward position without engaging his/her back to the seat back member, a full seat pan movement is provided by the seat base member 12 in the unlocked configuration.

It is contemplated that, in one embodiment, the seat back member 20 and/or the lumbar support 22 may be completely eliminated from the chair 10 to provide the user with a more challenging, advanced or athletic seating experience. In such an embodiment, the user is provided with a seating arrangement with a free moving seat pan 12 and without seat back or armrests. For example, the seating arrangement may include a stool type seat.

In one embodiment, the chair 10 may provide a configuration where the user may raise the armrests 40 of the chair 10 up or the user may move the armrests 40 down or away. In another embodiment, the armrests 40 may be completely eliminated from the chair 10.

Figure 11:
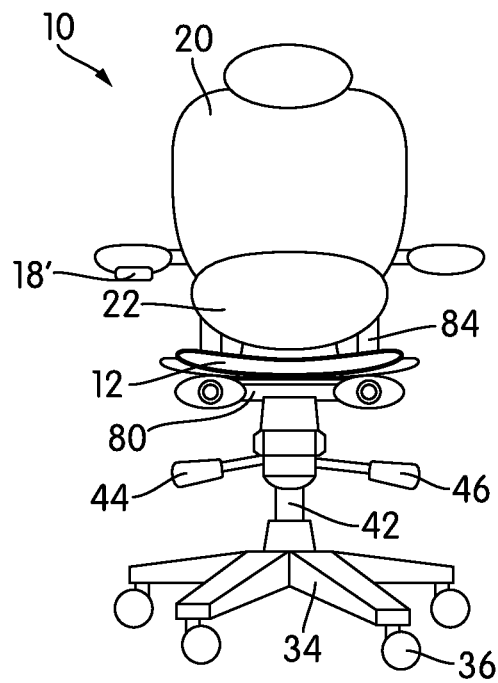
FIG. 11 shows a front elevational view of a chair with a moveable lumbar support member in accordance with an embodiment of the present patent application.
Figure 13A:
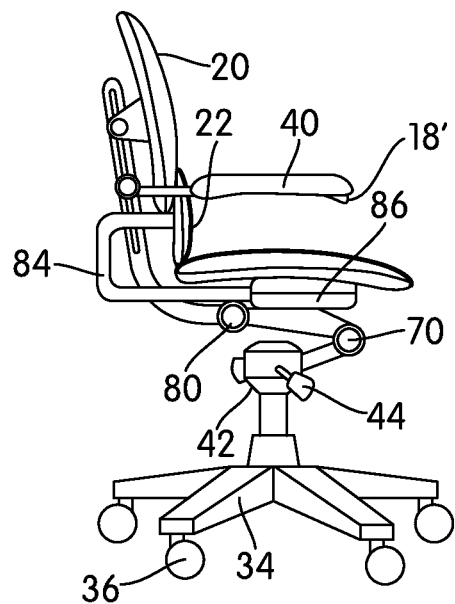
FIGS. 13A and 13D show left side elevational views of the chair, wherein the lumbar support member is in a first position.
Figure 13B:
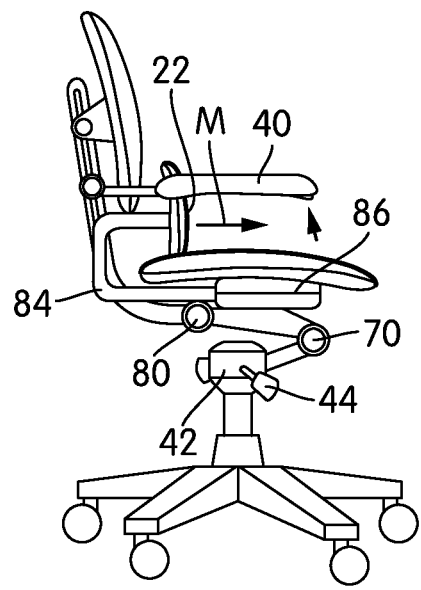
FIG. 13B shows a left side elevational view of the chair, wherein the lumbar support member is in an intermediate position.
Figure 13C:
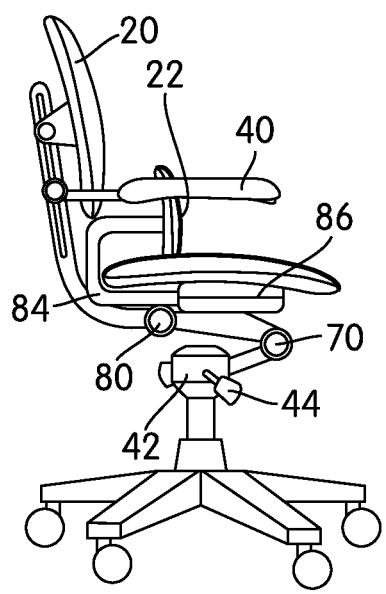
FIGS. 13C and 13E show left side elevational views of the chair, wherein the lumbar support member is in a second position in accordance with an embodiment of the present patent application.
Figure 13D:
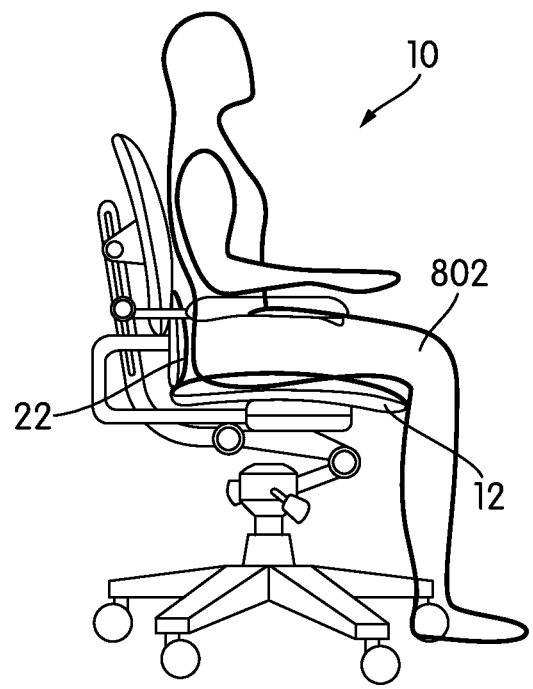
Figure 13E:
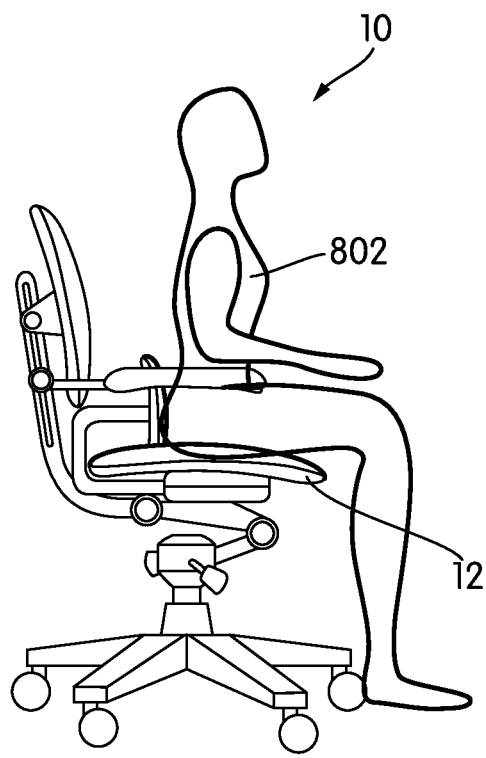

Referring to FIGS. 11 and 12, the chair 10 may include a lumbar support assembly 24 that is operatively connected to the lumbar support member 22 and configured for moving the lumbar support member 22, with respect to the seat base member 12 and the seat back member 20, between a first position (as shown in FIG. 12) and a second position (as shown in FIGS. 13C and 13E). That is, when actuated (manually and automatically), the lumbar support assembly 24 is configured to move the lumbar support member 22 forward allowing the user to sit in a more forwardly position on the seat base member 12 while being supported by the lumbar support member 22.

When the lumbar support member 22 is in the second position, the lumbar support member 22 is positioned forwardly, in a direction toward the seated user's lower back, relative to the seat back member 20 so as to enable the user 802 to be seated forwardly on the seat base member 12 as shown in FIG. 13E. The actuator 18' may be configured to operate the lumbar support assembly 24 for movement of the lumbar support member 22 between the first position and the second position.

In one embodiment, as shown in FIGS. 11, 12, 13A and 13D, the first position is an initial position of the lumbar support member 22 when the user 802 is seated normally (with user's back supported by the seat back member 20) on the seat base member 12. In one embodiment, the second position is a position of the lumbar support member 22 when the user 802 is seated forwardly on the seat base member 12. The forward or the second position may be set (saved in a memory device of the chair 10) as to allow the user 802 to repeatedly obtain the most preferred position. The forward or second positon allows the user 802 to sit in more alert position and in a feet flat on the floor position. In one embodiment, as shown in FIG. 13B, the lumbar support member 22 may be configured to move in the direction of the arrow M from the first position to the second position.

In one embodiment, the lumbar support member 22 may have an intermediate position between the first and the second positions. In one embodiment, the lumbar support member 22 may have a plurality of intermediate positions between the first and the second positions. In one embodiment, the seat base member 12 is first adjusted and locked in the desired position. The lumbar support member 22 may then be moved or adjusted to meet the user 802 wherever the user 802 decides to sit upon the seat base member 12.

The lumbar support assembly 24 may include pneumatic, spring or motorized actuation device 86. In the illustrated embodiment, the lumbar support assembly 24 includes a pneumatic actuation device 86. In one embodiment, the lumbar support assembly 24 may also include a lumbar support frame member 84. In one embodiment, the lumbar support frame member 84 may have a hollow tubular cross-sectional configuration. The lumbar support frame member 84 may be operatively connected to the actuation device 86 and to the lumbar support member 22 such that, when the user 802 actuates the actuator 18', the actuator 18' operates the pneumatic actuation device 86 to move the lumbar support member 22, via the lumbar support frame member 84, between its first and second positions.

Figure 17:
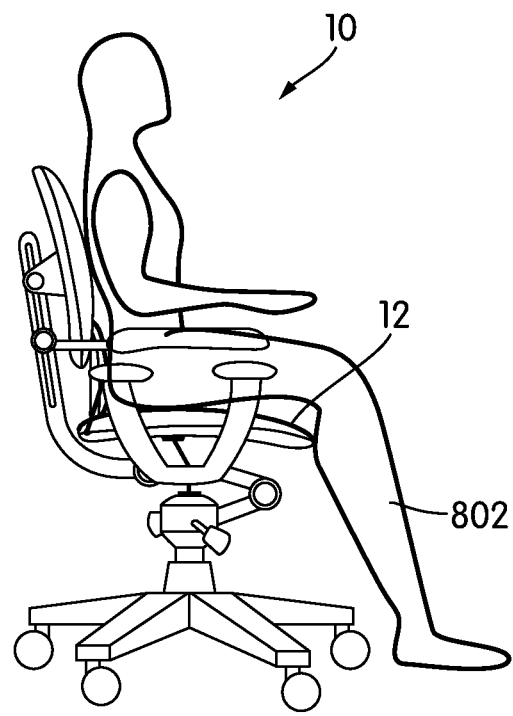
FIGS. 17 and 18 show left side elevational views of the chair when the seat base member is in a rearward position and in a forward position, respectively, and the lumbar support member is moving along with the seat base member in accordance with an embodiment of the present patent application.
Figure 18:
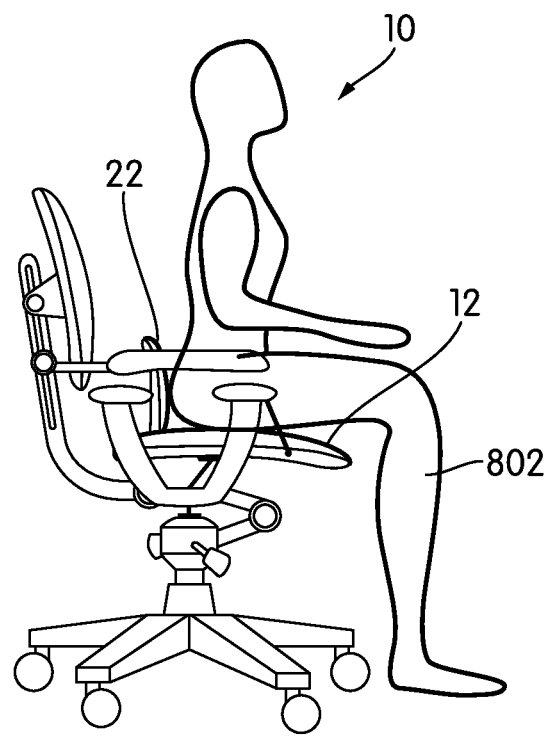
Figure 19:
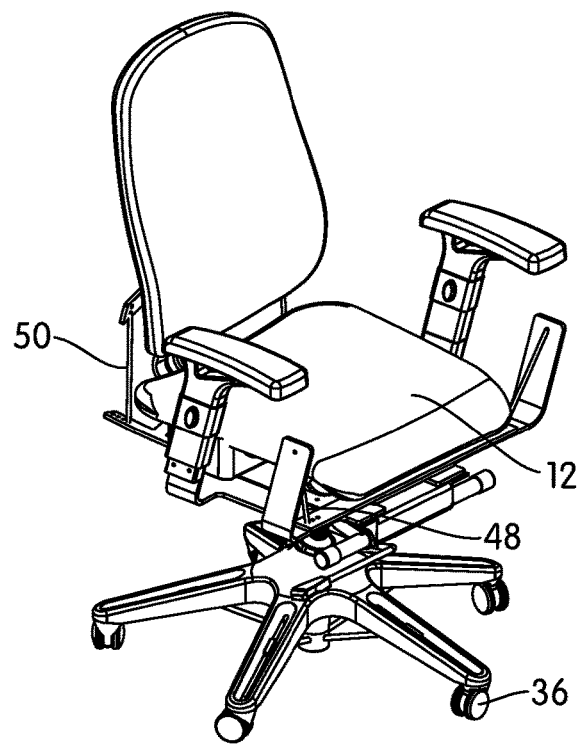
FIGS. 19, 20, 21, and 22 show a perspective view, a rear elevational view, a left side elevational view, and a front elevational view of an exemplary chair in accordance with another embodiment of the present patent application.
Figure 20:
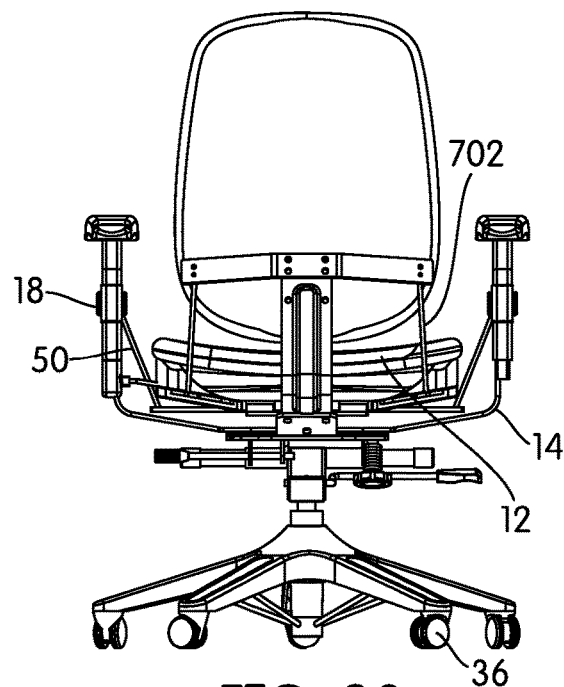
Figure 21:
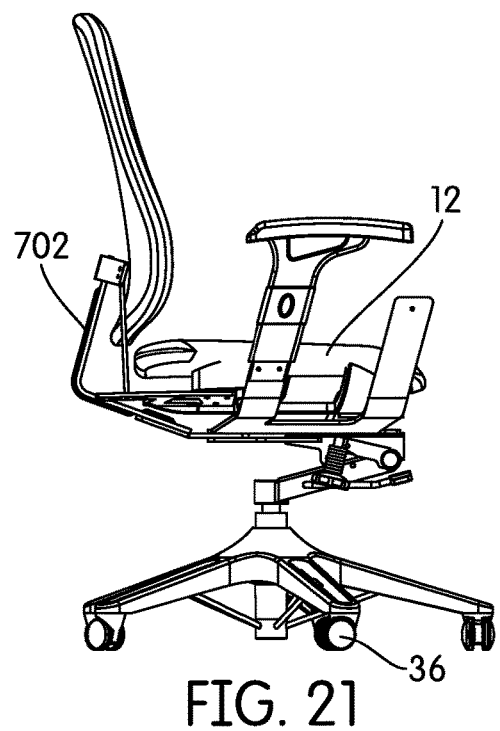
Figure 22:
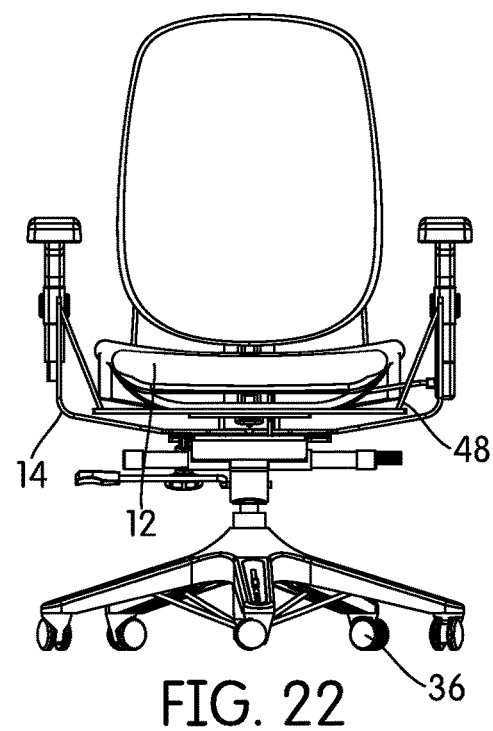
Figure 23:
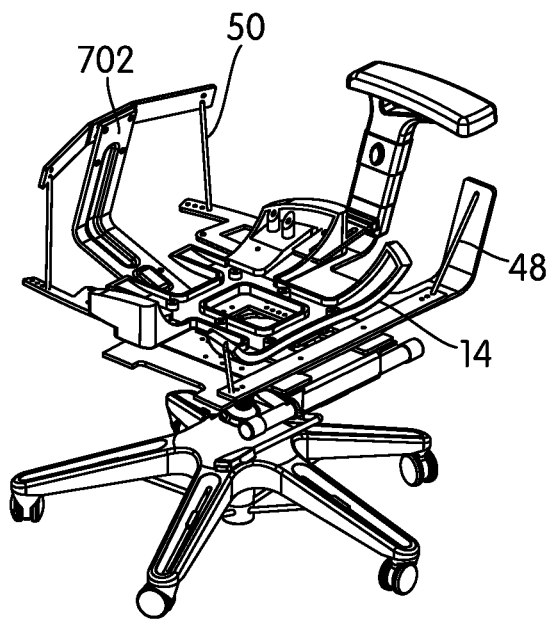
FIGS. 23, 24, 25, and 26 show a perspective view, a rear elevational view, a left side elevational view, and a front elevational view of the chair, with some portions of the chair removed for sake of clarity, in accordance with another embodiment of the present patent application.
Figure 24:
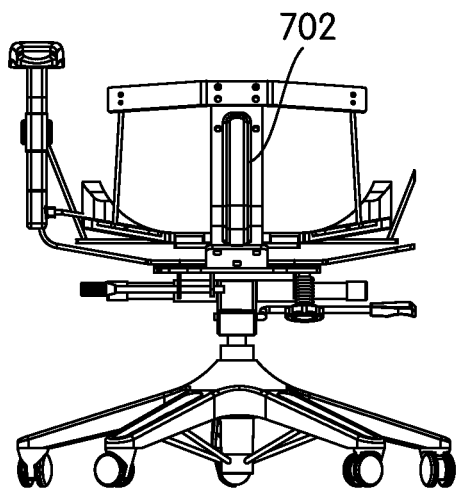
Figure 25:
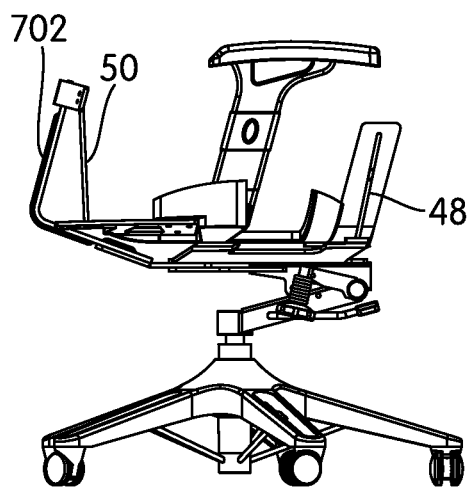
Figure 26:
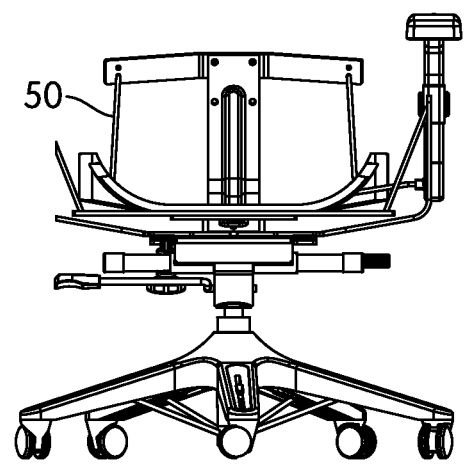
Figure 27:
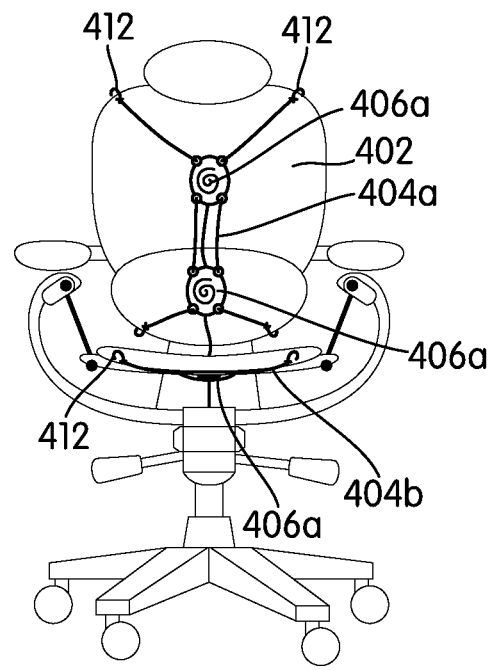
FIGS. 27 and 28 show a front elevational view and a left side elevational view of the chair with an ergonomic position sensing arrangement in accordance with an embodiment of the present patent application.

FIGS. 17 and 18 show left side elevational views of the chair 10 when the seat base member 12 is in a rearward position and in a forward position, respectively, and the lumbar support member 22 is moving along with the seat base member 12. This configuration allows the user 802 to rock forward to a more alert and active position or moving position.

Figure 14A:
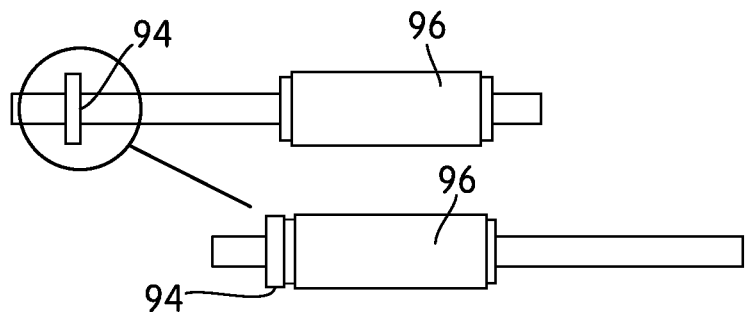
FIGS. 14A-C show views of a system configured to move the lumbar support member between the first position and the second position in accordance with an embodiment of the present patent application.
Figure 14B:
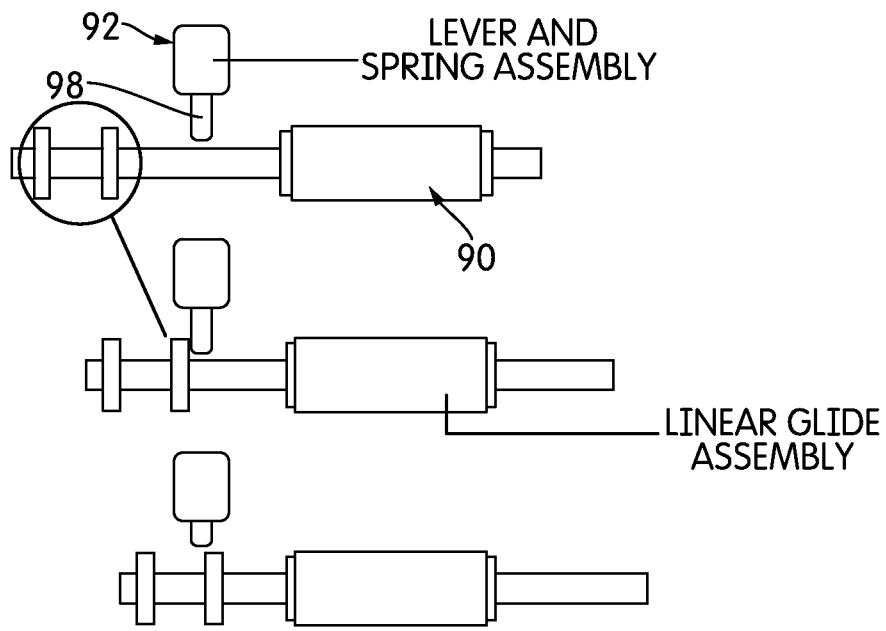
Figure 14C:
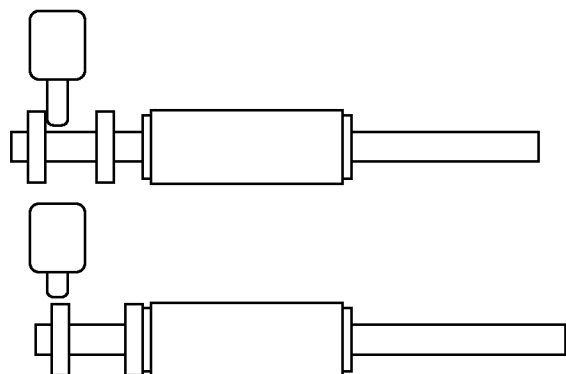
Figure 15:
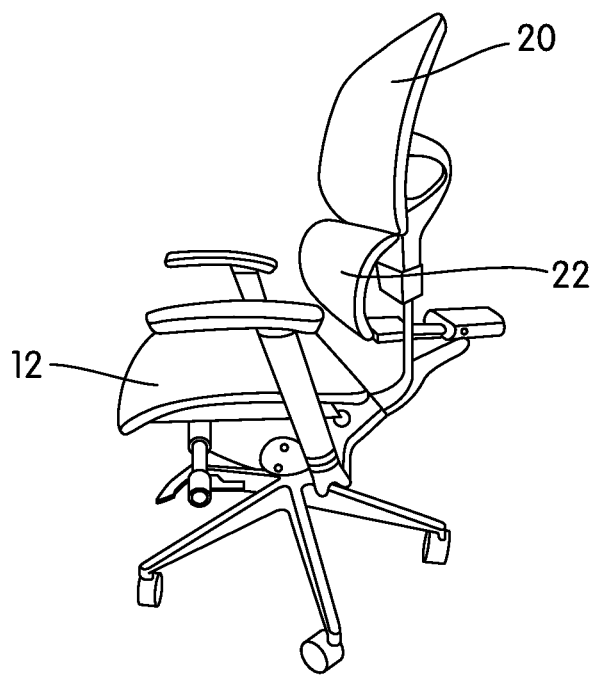
FIGS. 15 and 16 show perspective views of an exemplary chair with the moveable lumbar support member, where
Figure 16:
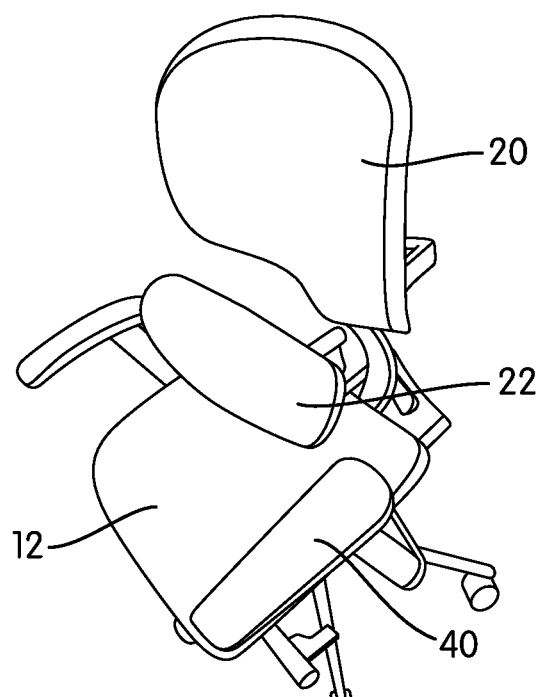

Referring to FIGS. 14A-C, the chair 10 may include a linear guide assembly 90 that includes a collet 94 and a linear glide member 96. The collet may be adapted to be carried by the linear glide member for movement between a first and a second position relative to the linear glide member. In one embodiment, the travel limit adjustable collet is shown in FIGS. 14A-C.

FIG. 14A shows the collet 94 stopping the linear glide member 96 at a given position. FIG. 14B shows a lever and spring assembly 92 that allows a pin member 98 to retract allowing the linear glide member 96 to move to the second position. FIG. 14C shows the lever and spring assembly 92 that allows the pin member 98 to retract allowing the linear glide member 96 to move to the third position.

The chair 10 also includes the memory device that allows the user to decide where their optimal (lumbar support member) position is relative to the seat base member 12. Once the user is at their optimal (lumbar support member) position and force of engagement, the user presses a lever (by mechanical, pneumatic or electro mechanical means) to engage a set stop.

In one embodiment, travel limit and range of engagement may be adjusted and defined by the user. Once the lumbar support member 24 is in the user preferred or desired (lumbar support member) position, the collet may be locked onto the linear glide member so that the unit, when activated returns to the same location. The final and potentially several positions may be set depending on the number of collets used and by adding a mechanical (e.g., lever and spring actuation assembly 92) or electromechanical (e.g., solenoid) actuated assembly.

In one embodiment, a spring tension and/or air piston force may be adjusted so the lumbar support member 24 may be engaged to press gently (adjustable force) on the user's lower back if desired (i.e., no locked position).

FIGS. 19, 20, 21, and 22 show a perspective view, a rear elevational view, a left side elevational view, and a front elevational view of an exemplary chair and FIGS. 23, 24, 25, and 26 show a perspective view, a rear elevational view, a left side elevational view, and a front elevational view of the chair, with some portions of the chair removed for sake of clarity, in accordance with another embodiment of the present patent application. Components of the chair depicted in FIGS. 19-26 may be similar to corresponding component of the chair depicted in FIGS. 1-10S, and as such, are labeled identically to those components of the chair 10.

FIGS. 27-30 show various views of the chair 10 with an ergonomic position sensor or sensing arrangement 402. In one embodiment, the chair 10 may include an embedded (i.e., built into the chair) ergonomic position sensing arrangement. In one embodiment, the ergonomic position sensing arrangement 402 is embedded into the underside frame structure of the chair. In another embodiment, the chair may include a separately attached (i.e., added to the chair later on (retrofitted)) ergonomic position sensing arrangement. In one embodiment, the ergonomic position sensing arrangement 402 is configured to be retrofitted to the chair's frame. For example, the sensor array may be an optional element that can be applied to any office chair. The retrofitted ergonomic position sensing arrangement 402 is configured to project the sensor zones through the chair and create a sensing field. The sensor array is configured to sense through the farbic material of the seat back member and/or the seat pan/base member 12 of the chair 10.

In one embodiment, the ergonomic position sensing arrangement 402 may include capacitance sensor systems 404a and 404b. Each of the capacitance sensor systems 404a and 404b include one or more capacitance sensor 406a and one or more attachment straps 410 that are configured to attach the respective capacitance sensor(s) 406a to portions of the chair 10. The attachment straps 410 may include one or more attachment portions 412 (e.g., end hooks) adapted to enable the attachment of the capacitance sensors 406a to the chair. In one embodiment, the attachment straps or members 410 may be elastomeric straps or members. In another embodiment, hook and loop type fastening arrangements (e.g., Velcro®) may be used to attach the respective capacitance sensor(s) 406a to portions of the chair 10.

The sensors due to their sensing nature of creating sensing fields, such as capacitive fields, are configured to sense each other to detect not just the presence of a user or their sitting position, but also the movement of the user's body and/or their engagement and active use of the dynamic movements when seated in the chair.

The capacitance sensor system 404b and its associated capacitance sensor(s) 406a are attached to the seat base member 12 via the attachment straps 410 and attachment portions 412 so as to sense the position of the user on the seat base member 12. The capacitance sensor system 404a and its associated capacitance sensor(s) 406a are attached to the seat back member via the attachment straps 410 and attachment portions 412 so as to sense the position of the user's back on the seat back member.

Figure 28:
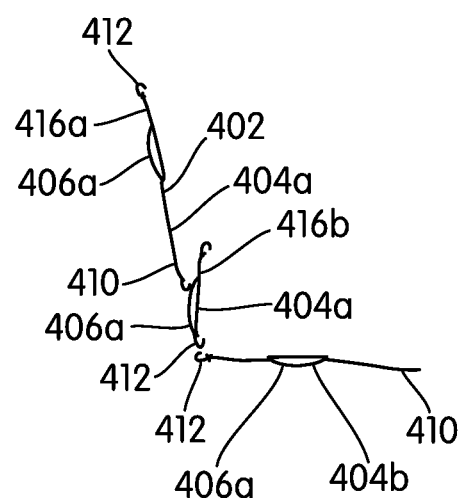
Figure 29:
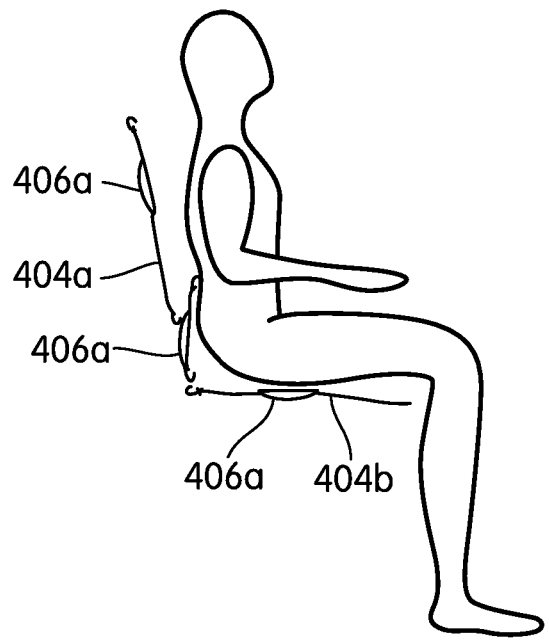
FIGS. 29 and 30 show left side elevational views of the chair with the ergonomic position sensing arrangement in accordance with an embodiment of the present patent application.
Figure 30:
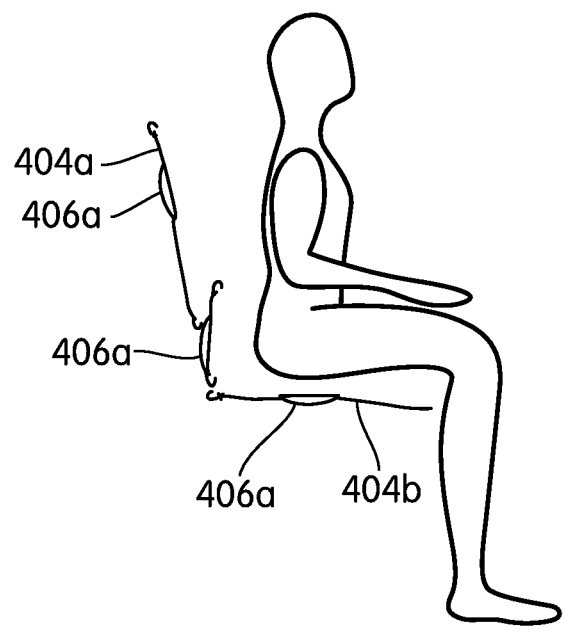
Figure 31:
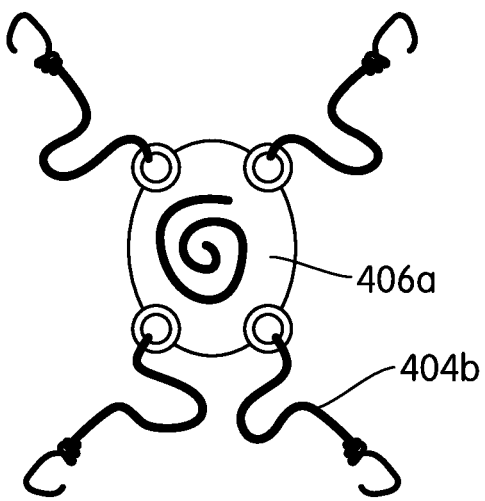
FIGS. 31 and 32 show sensor systems used with the ergonomic position sensing arrangement in accordance with an embodiment of the present patent application.

In one embodiment, as shown in FIGS. 27-30, the capacitance sensor system 404a may include two capacitance sensors, one for sensing the lumbar area of the user and the other for sensing the upper back area of the user. In another embodiment, as shown in FIG. 30, the capacitance sensor system 404a may include three capacitance sensors, the first one for sensing the lumbar area of the user, the second one for sensing the upper back area of the user, and the third one for sensing the head area of the user. In yet another embodiment, the number of capacitance sensors in the capacitance sensor system may vary.

Figure 32:
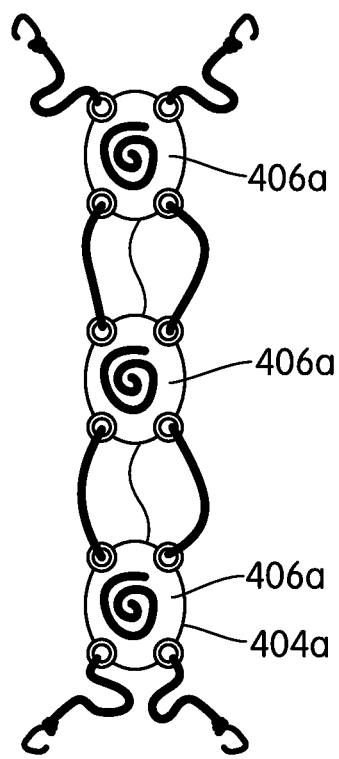

In one embodiment, as shown in FIGS. 28-30, the capacitance sensor system 404a may include two separate capacitance sensor sub-systems 416a, 416b that are connected to each other. Each capacitance sensor sub-system 416a, 416b may include one or more capacitance sensor(s) 406a, the attachment straps 410 and the attachment portions 412. In another embodiment, as shown in FIG. 32, the capacitance sensor system 404a may include a single system having one or more capacitance sensor(s) 406a, the attachment straps 410 and the attachment portions 412

In one embodiment, the capacitence field of the capacitance sensor systems 404a and 404b is configured to travel a given distance through the seat and back cushion or mesh of the chair 10. FIGS. 33-35 show left side elevational views of the chair 10 with the ergonomic position sensing system 402 and its sensor fields 431. The sensing field determines if the user is sitting in the chair and how the user is sitting in the chair.

The sensor arrangement (or array) may be configured to sense the presence of the user, their sitting positon(s) and/or their weight distribution. The sensor arrangement may also be configured to continuously sense the movement of the user so as to determine whether the user is sitting in a correct (or optimal) position and/or moving between the various sitting positions correctly.

In one embodiment, the signal from the sensor arrangement may be transmitted wirelessly (e.g., via a Bluetooth low energy module) or in a wired manner to a receiver module of a controller. In response to the received signal, the controller is configured to provide an indication to the user about their users sitting "health". In one embodiment, the indication is a visual indication. The controller may be configured to provide various color indications to the user based on the user's sitting postures. The colors may change slowly allowing the user to constantly observe (e.g., in a non-intrusive display or form) their current ergonomic health. For example, the controller may be configured to provide a purple or green color indication for a good, healthy sitting posture, a yellow or orange color indication for moving to another sitting posture (or take a break from the current sitting posture) and a red color indication for an unhealthy, wrong sitting posture and for the user to get up and move around.

Figure 36:
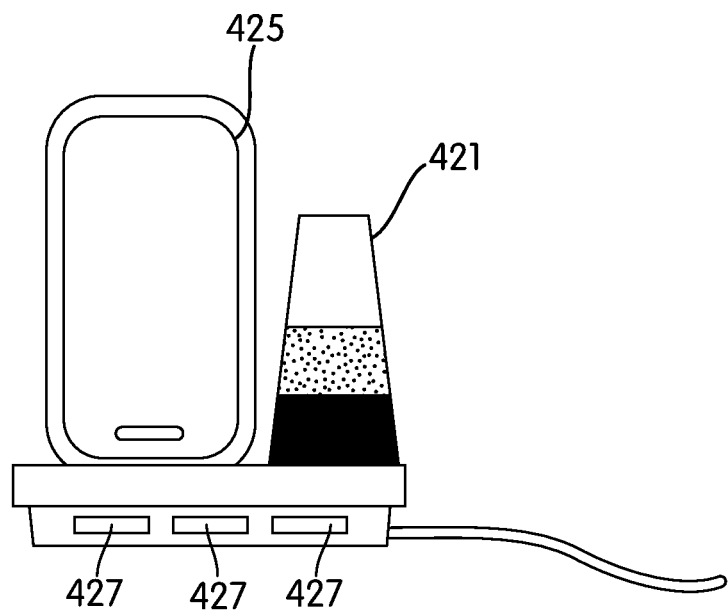
FIGS. 36 and 37 show indicator systems used with the ergonomic position sensing arrangement in accordance with an embodiment of the present patent application.
Figure 37:
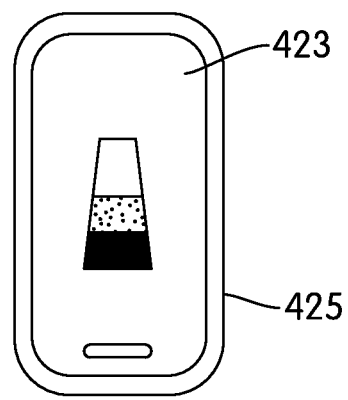

FIGS. 36 and 37 show indicator systems 421 and 423 that are used with the ergonomic position sensing system 402. Ergonomic heath indicator systems 421 and 423 may be configured to display (e.g., light up colors on a display) the user's current sitting postion's ergonomic health as detected by the sensor system(s) 406*a*. Ergonomic heath indicator systems 421 and 423 may also be configured to display information to the user such as when to take a break and when get up and walk around. Ergonomic heath indicator systems 421 and 423 may also be configured to display information to the user such as their sitting time as tracked by the control system associated with the sensor system(s) 406*a*. Ergonomic heath indicator systems 421 and 423 may also be configured to display to the user other ergonomic sitting heath indicator information.

The ergonomic heath indicator system 421 may be positioned on a user's desk as shown in FIG. 36. The ergonomic heath indicator system 421 may also include a charging port configured to recharge a user's cellular phone 425. The ergonomic heath indicator system 421 may also include additional USB charging slots 427. In one embodiment, the same ergonomic feedback information may be sent to the user's cellular phone application by way of wirless communication such as but not limited to, WiFi, Bluetooth, Near Filed Comunication (NFC) etc. so as to be displayed on a display 423 of the user's cellular phone 425. An application on the user's cellular or cell phone may analyze the received data or information and visually display the health indicator information.

The present patent application provides the multidirectional, dynamically moveable seat base member 12 so that the user sitting in the chair 10 not only moves forward and back together with the seat base member 12, but also moves in a side to side as well as a circular or pivoting type movement with the seat base member 12. The present patent application takes into consideration more active sitting positions where the user is encouraged and supported to naturally move while still seated creating a better holistic sitting experience. The present patent application uses the understandings of ergonomic sitting position theory to provide the chair 10 which enable the user to move more naturally and to stimulate a more active posture while seated. The chair 10 of the present patent application also allows the user to do their daily tasks without the undo harm one would usually incur from either lack of movement or improper support on a daily basis. The chair 10 of the present patent application thus bridges the ergonomic theory of safe controlled seating and the desire to free the person to an unencumbered albeit more liable type of office seating.

FIGS. 38-45 show a chair 1000 that is configured to allow a multidirectional movement of its seat pan member 1012 in accordance with another embodiment of the present patent application. The configuration and the operation of the chair 1000 are same as those of the chairs described with respect to FIGS. 1-37, except for some difference as noted below.

In one embodiment, the chair 1000 includes the seat base member or the seat pan member 1012, a movement support frame 1014 (i.e., seat base support member), and at least two movement support members 1016 that are operatively connected to the seat pan member 1012 and the movement support frame 1014. The at least two movement support members 1016 are configured to support the seat pan member 1012 in a floating manner for dynamic movement with respect to the movement support frame 1014 in at least one degree of freedom in a horizontal seating plane. The at least two movement support members 1016 are configured to support the seat pan member 1012 in a floating manner for dynamic movement with respect to the movement support frame 1014 in at least one degree of freedom in the horizontal seating plane. The horizontal seating plane generally includes a plane defined by the X and Y-axes.

As will be described in detail below, the at least two movement support members 1016 are configured to support the seat pan member 1012 in the floating or suspended manner from either above or below the seat pan member 1012. For example, the at least two movement support members 1016 may be configured to act as a suspension assembly to support the seat pan member 1012 (from above the seat pan member 1012) in a suspended manner for movement with respect to the movement support frame 1014 in at least two degrees of freedom. The at least two movement support members 1016 may also be configured as rigid, articulated bodies to support the seat pan member 1012 (from below the seat pan member 1012) in a floating manner for dynamic movement with respect to the movement support frame 1014 in at least two degrees of freedom.

The term "floating," as used herein, means that the seat pan member 1012 moves during normal use of the chair 1000 with the user's body positioned on the seat pan member 1012. Floating excludes temporary situations where the user is moving between fixed, static positions in the prior art adjustable chairs.

In one embodiment, the movement support frame 1014 may be made of an aluminum material. In one embodiment, the movement support frame 1014 may be made of A356-T6 aluminum material. In one embodiment, the movement support frame 1014 may be made of ADC12 aluminum alloy material. In one embodiment, the movement support frame 1014 may include ribbed structure to provide adequate strength to the movement support frame 1014 and create an interesting visual effect. The ribbed structure of the movement support frame 1014 may optionally be covered using an opaque insert or a transparent insert.

In one embodiment, at least a portion of the movement support frame 1014 may extend parallel to (and spaced apart from) the seat pan member 1012 above and below the seat pan member 1012. In one embodiment, at least a portion of the movement support frame 1014 may extend parallel to (and spaced apart from) the seat pan member 1012 below the seat pan member 1012.

In one embodiment, the movement support frame 1014 includes a pair of armrest members 1040 for supporting the arms of the user seated on the chair 1000. In one embodiment, the movement support frame 1014 includes a seat back member 1020 for supporting the back of the user seated on the chair 1000. In another embodiment, the seat back member 1020 is optional and the movement support frame 1014 only includes the pair of armrest members 1040. In one embodiment, the configuration and operation of the seat back member 1020 and the armrest members 1040 are similar to those of the seat back member 20 and the armrest members 40, respectively as described in detail with respect to FIGS. 1-37, and hence will not be described in detail here.

Figure 44:
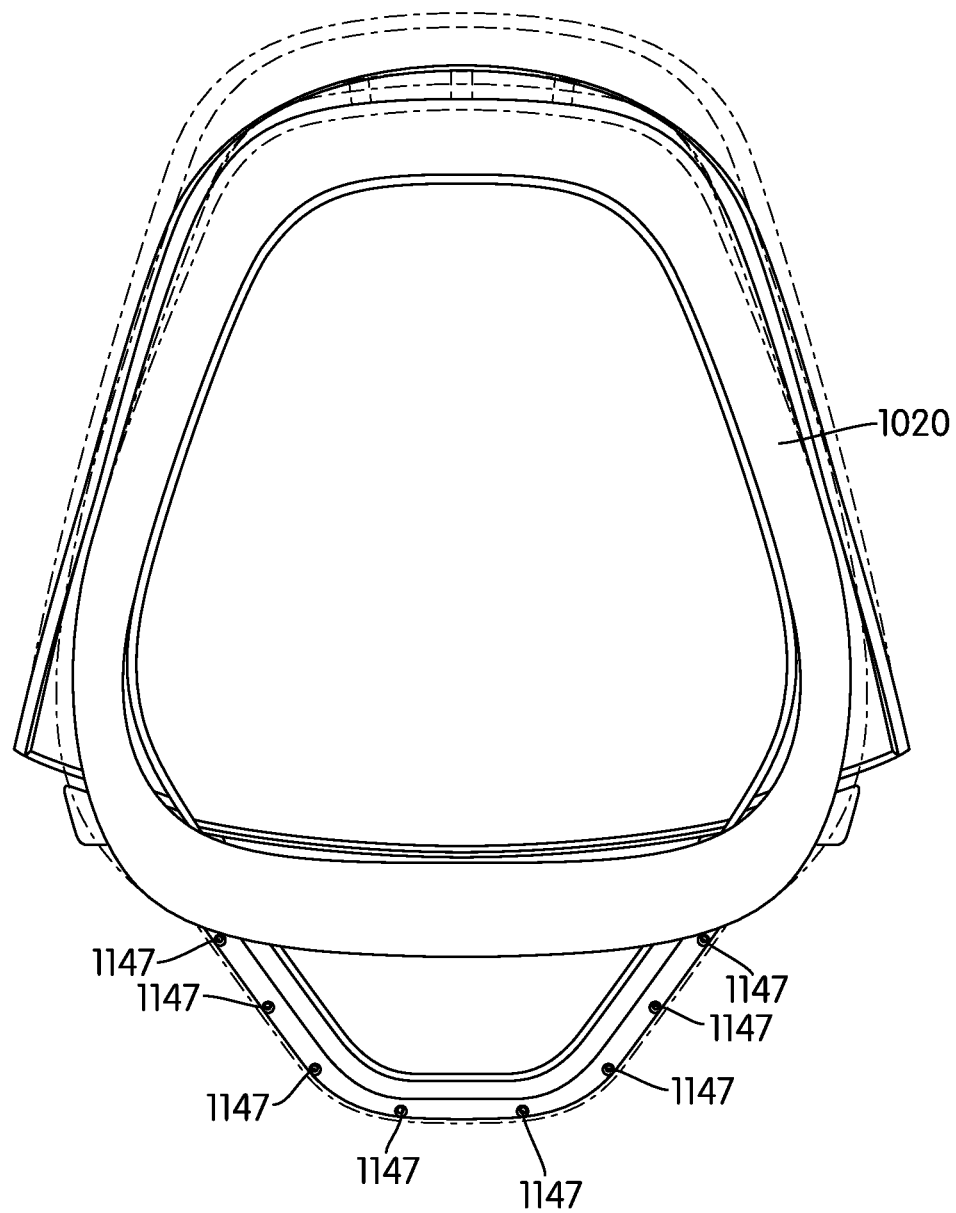
FIGS. 44 and 45 show front and rear elevational views of a seat back member of the chair of FIG. 38.
Figure 45:
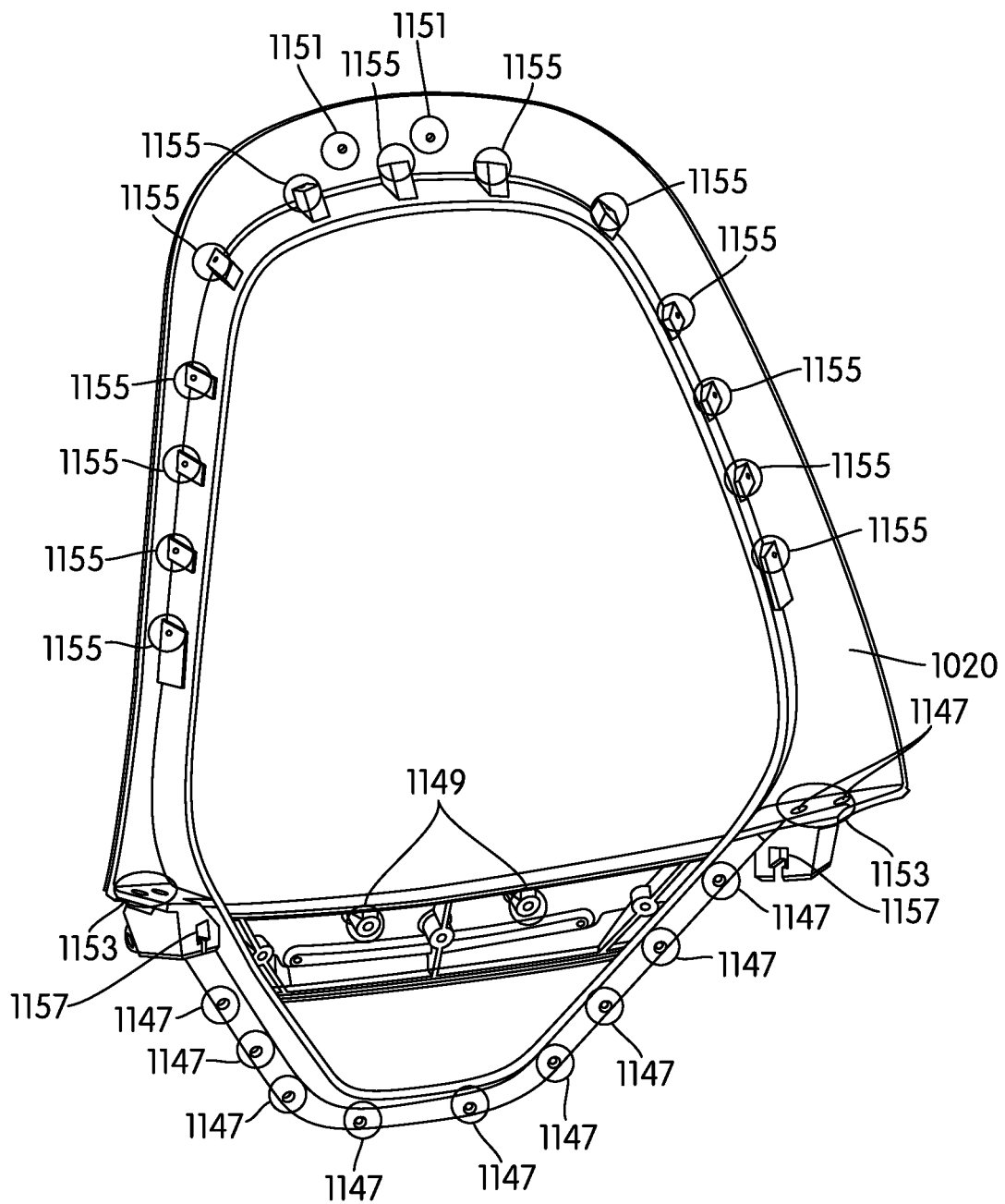

FIGS. 44 and 45 show front and rear elevational views of the seat back member 1020 of the chair 1000. The seat back member 1020 may be connected to the movement support frame 1014 at connection portions 1147 via any attachment mechanism as appreciated by one skilled in the art. A lumbar support member (e.g., similar to the lumbar support member 22 in FIGS. 1-37) of the chair 1000 may be connected to the seat back member 1020 at connection portions 1149 via any attachment mechanism as appreciated by one skilled in the art. In one embodiment, the chair 1000 may include additional or other connection portions to facilitate the connection of the lumbar support member to the seat back member 1020. A headrest (e.g., similar to the headrest 38 in FIGS. 1-37) may be connected to the seat back member 1020 at connection portions 1151 via any attachment mechanism as appreciated by one skilled in the art.

The seat back member 1020 may include a mesh that is attached to its mesh ring member. The mesh ring member may be then secured to the main frame member of the seat back member 1020. The mesh ring member may be tilted on the top of the chair 1000. The bottom of the mesh ring member may snap over the area 1153 (e.g., where movement support members 1016 may be inserted). The mesh ring member may be connected to the seat back member 1020 at connection portions 1155 via any attachment mechanism as appreciated by one skilled in the art. In one embodiment, the mesh ring member is optional. In other embodiments, the number of connection portions 1147, 1149, 1151, and 1155 on the seat back member 1020 may vary.

In one embodiment, the armrest members 1040 may be made of the same material as the movement support frame 1014. In one embodiment, the armrest members 1040 may be made from aluminum material and may include rubber bumper portions at the end portions (i.e., portions pointing away from the movement support frame 1014) of the armrest members 1040 to protect the aluminum armrest members 1040.

Figure 57:
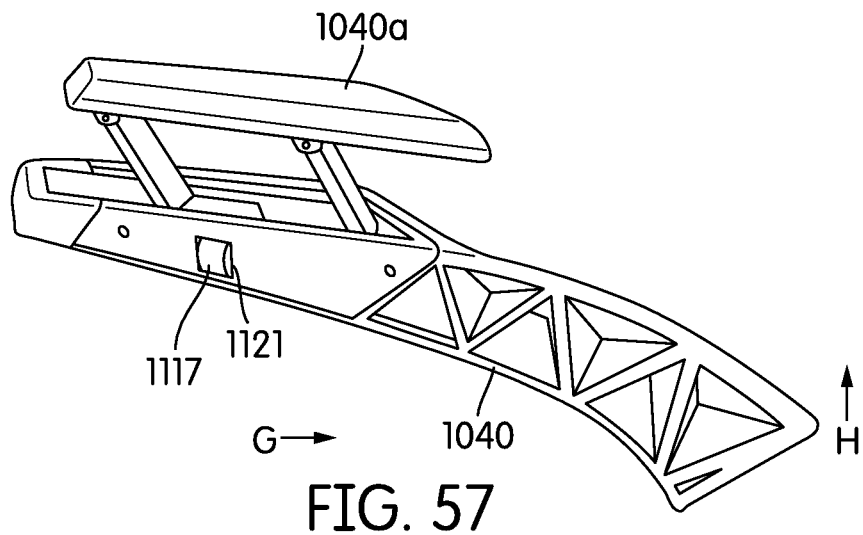
FIG. 57 shows a perspective view of an adjustable armrest assembly in accordance with an embodiment of the present patent application, where the armrest is in its raised configuration.
Figure 58:
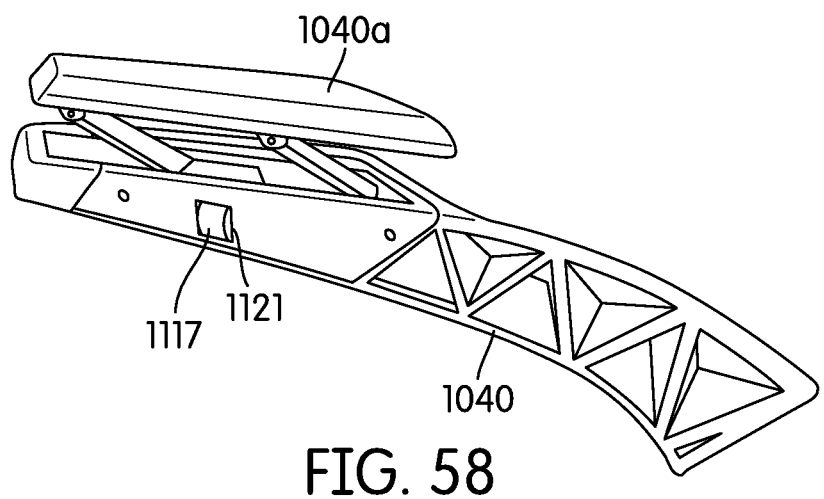
FIG. 58 shows another perspective view of the adjustable armrest assembly, where the armrest is in an intermediate configuration between its raised and lowered configurations.
Figure 59:
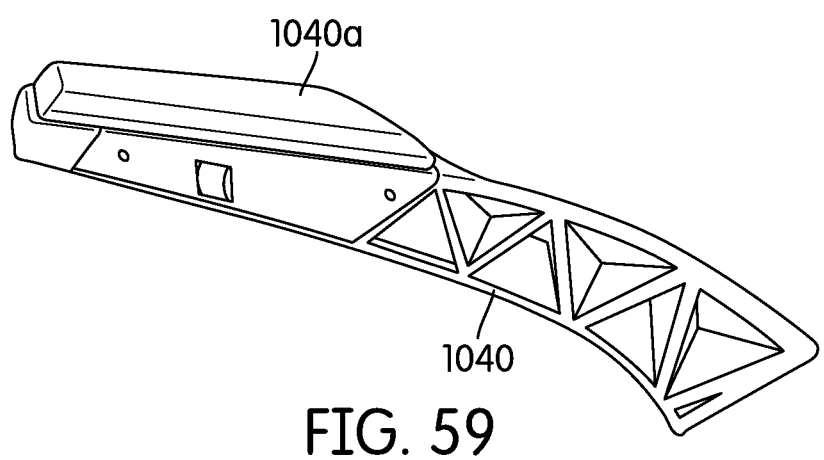
FIG. 59 shows another perspective view of the adjustable armrest assembly, where the armrest is in its lowered configuration.

In one embodiment, the chair 1000 may include adjustable armrest members 1040 as shown and described with respect to FIGS. 57-63. An armrest portion 1040*a* of the armrest member 1040 is configured to be adjustable or moveable between a raised/an elevated position as shown in FIG. 57 and a lowered position as shown in FIG. 59. In one embodiment, the armrest portion 1040*a* of the armrest member 1040 may also include one or more intermediate positions, as shown in FIG. 58, that are between the raised position and the lowered position of the armrest portion 1040*a*.

Figure 60:
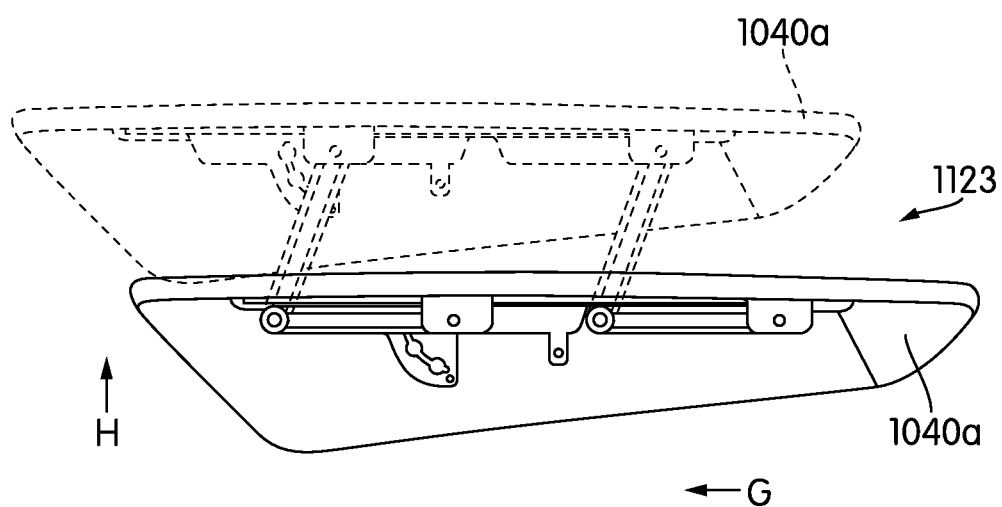
FIG. 60 shows an assembled view of the adjustable armrest assembly in accordance with an embodiment of the present patent application.

The armrest member 1040 may include an adjustment mechanism 1123 to move the armrest portion 1040*a* between the raised/elevated position and the lowered position. The adjustment mechanism 1123 may include a simple hinge mechanism. When the armrest portion 1040*a* of the armrest member 1040 hinges, the armrest portion 1040*a* is lifted up (e.g., in the direction of an arrow H as shown in FIGS. 60 and 57) and moved backwards (e.g., in the direction of an arrow G as shown in FIGS. 60 and 57). That is, the armrest portion 1040*a* is lifted upwardly and backwardly compared to its lowered position. This configuration helps prevent the armrest portion 1040*a* from interfering with, for example, a desk.

Figure 61:
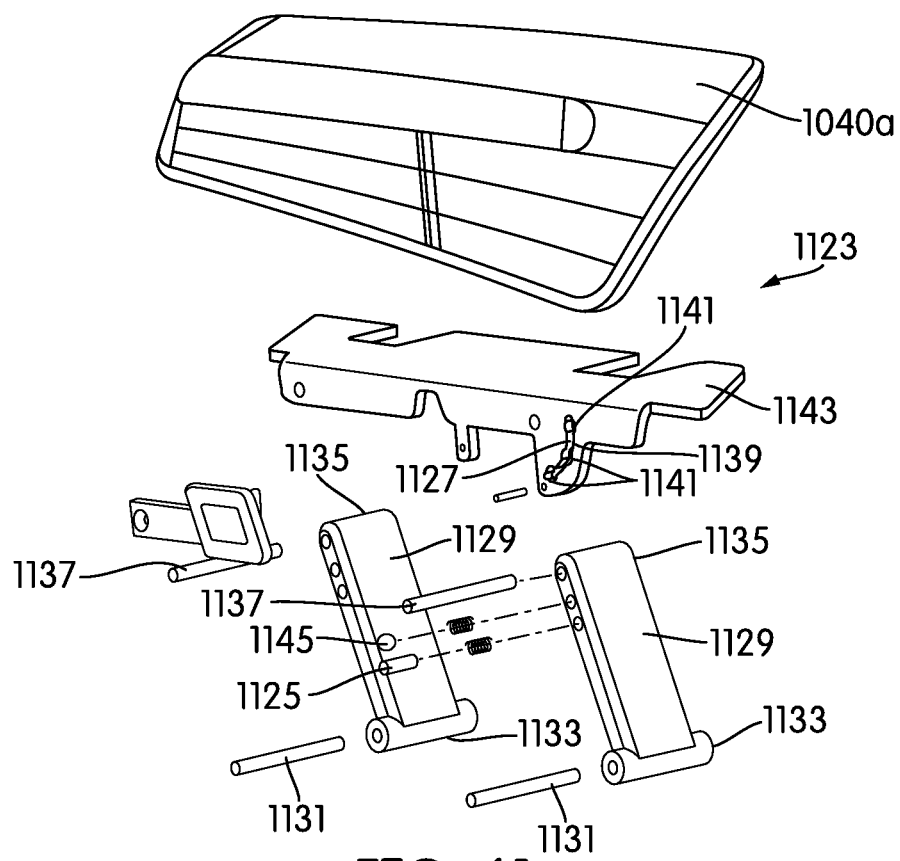
FIG. 61 shows an exploded view of the adjustable armrest assembly in accordance with an embodiment of the present patent application.

Referring to FIGS. 60 and 61, the adjustment mechanism 1123 includes a spring loaded lock member 1125 and a lock member engaging portion 1127. The adjustment mechanism 1123 also includes linkage members 1129 that are hingedly connected to the armrest member 1040 using connectors or pins 1131 at one end portion 1133 and are connected to the armrest portion 1040*a* using connectors or pins 1137 at the other end portion 1135.

The lock member 1125 may be a dowel or pin member and may be disposed on the armrest member 1040. The lock member engaging portion 1127 may include a slot 1139 having one or more openings/holes 1141. The lock member engaging portion 1127 may be disposed on a bracket member 1143 that is connected to the armrest portion 1040*a*. In the illustrated embodiment, the lock member engaging portion 1127 includes slot 1139 with three holes 1141. The spring loaded lock member 1125 is configured to be located inside one of the holes 1141 of the slot 1139. This engagement acts as a locking mechanism to selectively retain the armrest portion 1040*a* in its lowered, intermediate or raised positions. The locations of the three holes 1141 provide the armrest portion 1040*a* heights of 0 inches (e.g., lowered position), 1 inch (e.g., intermediate position) and 2 inches (e.g., raised position). In one embodiment, the number of holes/openings in the slot may vary to provide two or more intermediate positions for the armrest portion 1040*a*.

The adjustment mechanism 1123 may include a manually engageable actuator (e.g., push button) that is configured to push or move the spring loaded lock member 1125 out of the engaged hole 1141. Once the spring loaded lock member or dowel 1125 moved out of the engaged hole 1141, the armrest portion 1040*a* is free to move between the raised and the lowered positions. The manually engageable actuator (e.g., push button) may be disposed near the back portion of the armrest member 1040 so that there is no accidental adjustment of the armrest portion 1040*a* while the user is getting in or out of the chair 1000.

The adjustment mechanism 1123 may also include a spring loaded ball bearing 1145 that is disposed in a pocket near the spring loaded lock member 1125. This spring loaded ball bearing 1145 is configured to create friction in the armrest portion 1040*a*, which provides a premium feel and location identification. The small holes located in line with the spring loaded ball bearing 1145 allow a click feeling when passing over them. This configuration allows the user to know that they are in one of the three positions (i.e., lowered, intermediate, and raised positions) and to release the push button.

Figure 62:
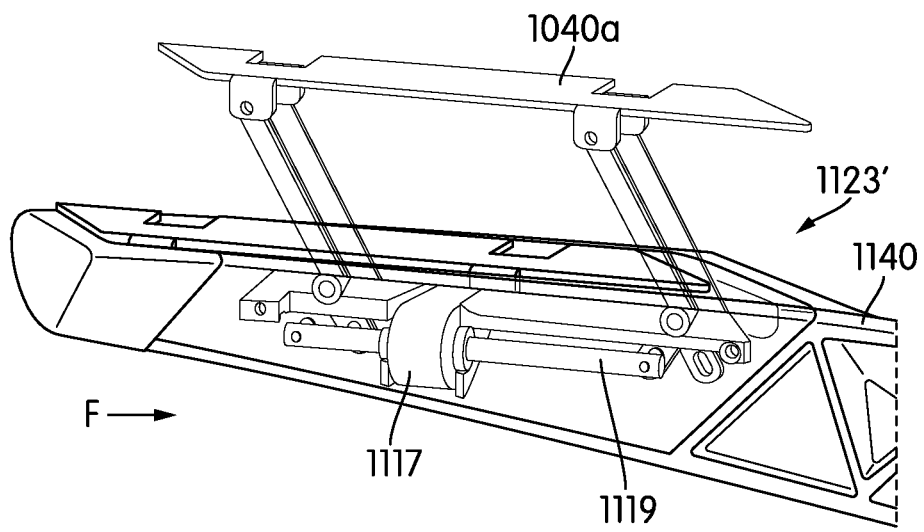
FIG. 62 shows a side view of an adjustable armrest assembly in accordance with another embodiment of the present patent application, where the armrest is shown in its raised configuration and where some portions of the chair are not shown for sake of clarity.
Figure 63:
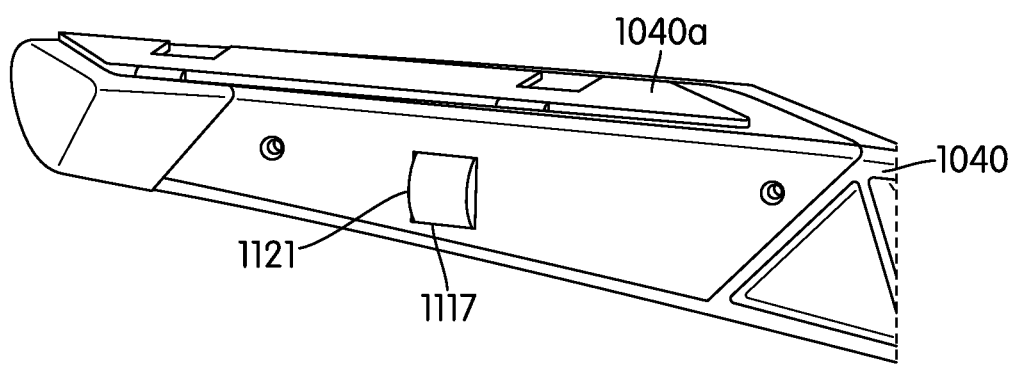
FIG. 63 shows a side view of the adjustable armrest assembly of FIG. 62, where the armrest is in its lowered configuration.

FIGS. 62 and 63 show an adjustment mechanism 1123' for the armrest member 1040 in accordance with another embodiment of the present patent application. For example, each armrest member 1040 may include a manually operated actuator 1117 and a threaded rod 1119. The manually operated actuator 1117 may be a rotating dial or nut 1117 that may be manually operated by the user seated in the chair 1000. In one embodiment, the armrest member 1040 may include a cutout region or an opening 1121 to provide access to the rotating dial or nut 1117. The rotating dial or nut 1117 may have a knurled surface configuration. The threaded rod 1119 is centrally disposed with respect to the rotating dial or nut 1117 such that the internal threads of the rotating dial or nut 1117 engage with the external threads of the threaded rod 1119.

The manually operated actuator 1117 is configured to advance the threaded rod 1119. That is, the rotation of the manually operated actuator 1117 in one direction advances the threaded rod 1119. The threaded rod 1119 may advance from left to right in the direction of an arrow F. The threaded rod 1119 is configured to be operatively connected to the armrest portion 1040a such that the advancement of the threaded rod 1119, in turn, raises the armrest portion 1040a of the armrest member 1040 both upwardly and rearwardly compared to its lowered position. FIG. 62 shows the armrest portion 1040a in its raised position. By rotating the manually operated actuator 1117 in the other direction, the user may cause the threaded rod 1119 to be translated in a direction opposite to that of the arrow F to move the armrest portion 1040a to its lowered position.

FIGS. 57-59 show the armrest portion 1040a being adjusted between its lowered position and its raised position using the adjustment mechanism 1123' of the FIGS. 62 and 63. In another embodiment, the armrest portion 1040a may be adjusted between its lowered and raised positions using the adjustment mechanism 1123 of the FIGS. 60 and 61.

In one embodiment, the chair 1000 includes the lumbar support member for supporting the lumbar region of the user seated on the chair 1000. In one embodiment, the configuration and operation of the lumbar support member are similar to those of the lumbar support member 22 as described in detail with respect to FIGS. 1-37 of the present patent application, and hence will not be described in detail here.

In one embodiment, the lumbar support member may be integrally formed with or connected to the movement support frame 1014. In another embodiment, the lumbar support member may be integrally formed with or connected to the seat back member 1020. In yet another embodiment, the lumbar support member is operatively connected to the seat pan member 1012 and is configured to move along with the seat pan member 1012 with respect to the movement support frame 1014 in the at least two degrees of freedom. The lumbar support member may be integrally formed with or connected to the seat pan member 1012 such that it is configured to move along with the seat pan member 1012 with respect to the movement support frame 1014 in the at least two degrees of freedom.

In yet another embodiment, the lumbar support member may be configured to be a multi-position advancing lumbar support member similar to that described in FIGS. 11-18. For example, the actuation of this moveable lumbar support member may be performed manually, semi-automatically or fully-automatically. The movement of the lumbar support member with respect to the seat pan member 1012 and the seat back member 1020, between the first position and the second position (as described in detail with respect to FIGS. 11-18), allows for at least two distinct divisions of the seat pan member 1012. These two divisions of the seat pan member 1012 allow the user to sit comfortably in multiple positions with multiple areas of ergonomic support as desired by the user for their particular purpose(s).

In the present patent application, the term "seat base member" is interchangeably used with the term "seat pan member," they both refer to a member of the chair that is configured to support the weight of the user seated in the chair and support thighs and bottom of the user while seated in the chair. In one embodiment, the seat pan member 1012 may be referred to as a multidirectional moveable seat pan member that is configured to move in at least four directions—a forward direction, a rearward direction, a left side direction, and a right side direction. The seat pan member 1012 includes a generally horizontal planar member having a generally horizontal rigid frame.

In one embodiment, the seat pan member 1012 is made of BASF Petra° 130 FR PET (Polyethylene Terephthalate) material. This material is a 30% glass fiber reinforced, flame retardant injection molding compound based on recycled PET (Polyethylene Terephthalate) feedstocks. In another embodiment, the seat pan member 1012 may be made of an appropriate plastic or other composite material having suitable strength. In one embodiment, the seat pan member 1012 is constructed and designed to support a 350 pounds user perched (or leaning) on the front portion of the chair 1000.

Figure 38:
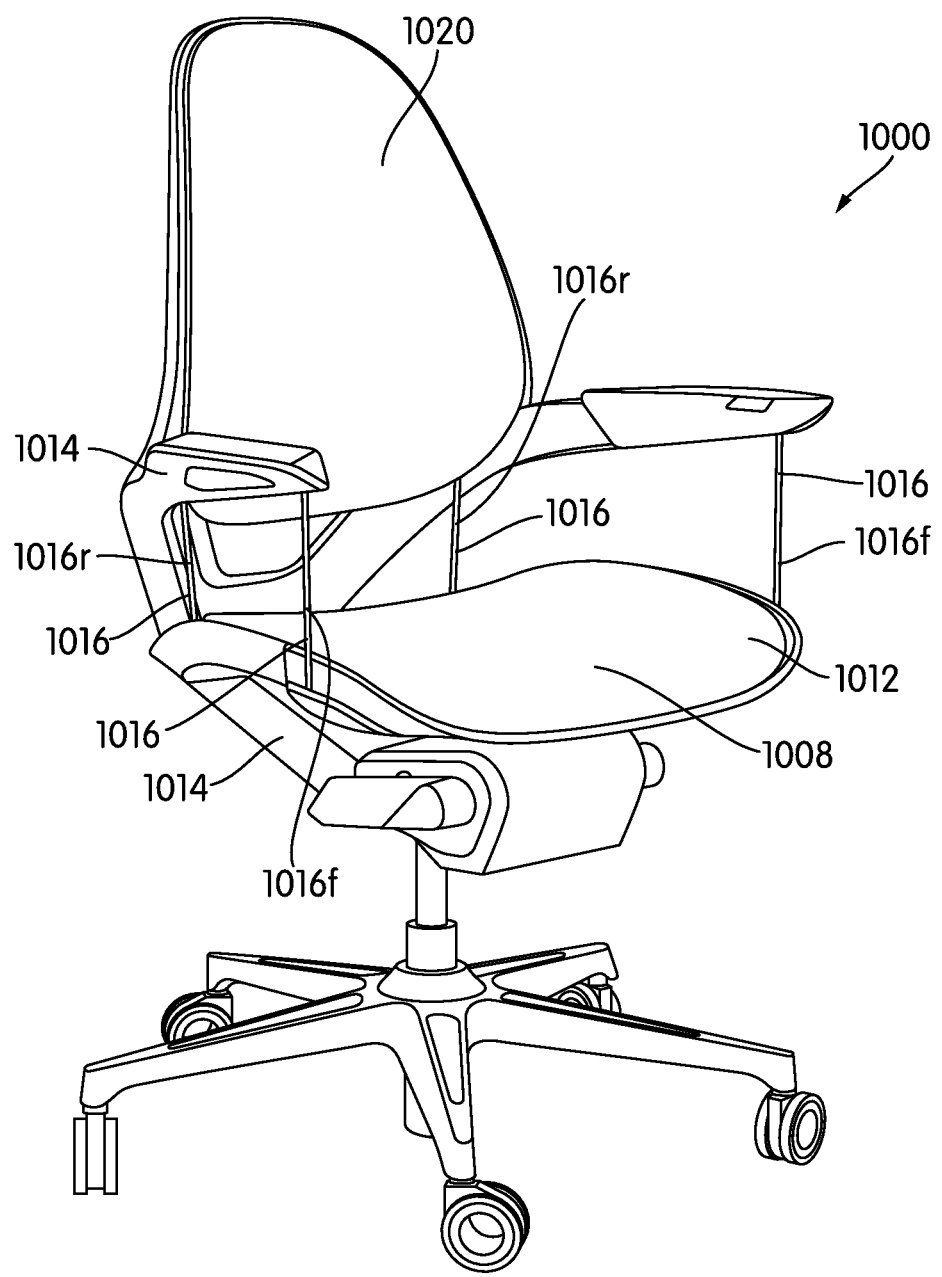
FIG. 38 shows a perspective view of a chair configured to allow for an omnidirectional movement of its seat pan member in accordance with another embodiment of the present patent application.
Figure 39:
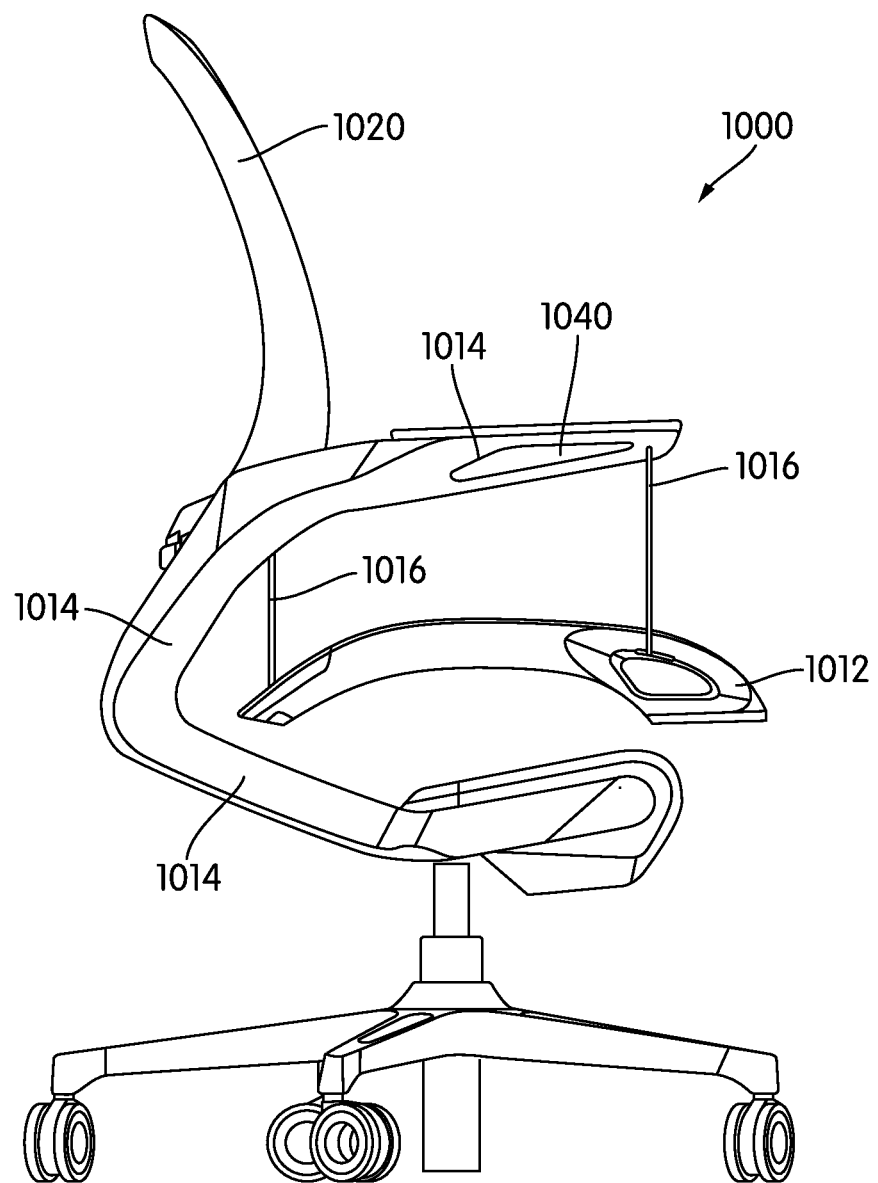
FIG. 39 shows a left side elevational view of the chair of FIG. 38.
Figure 40:
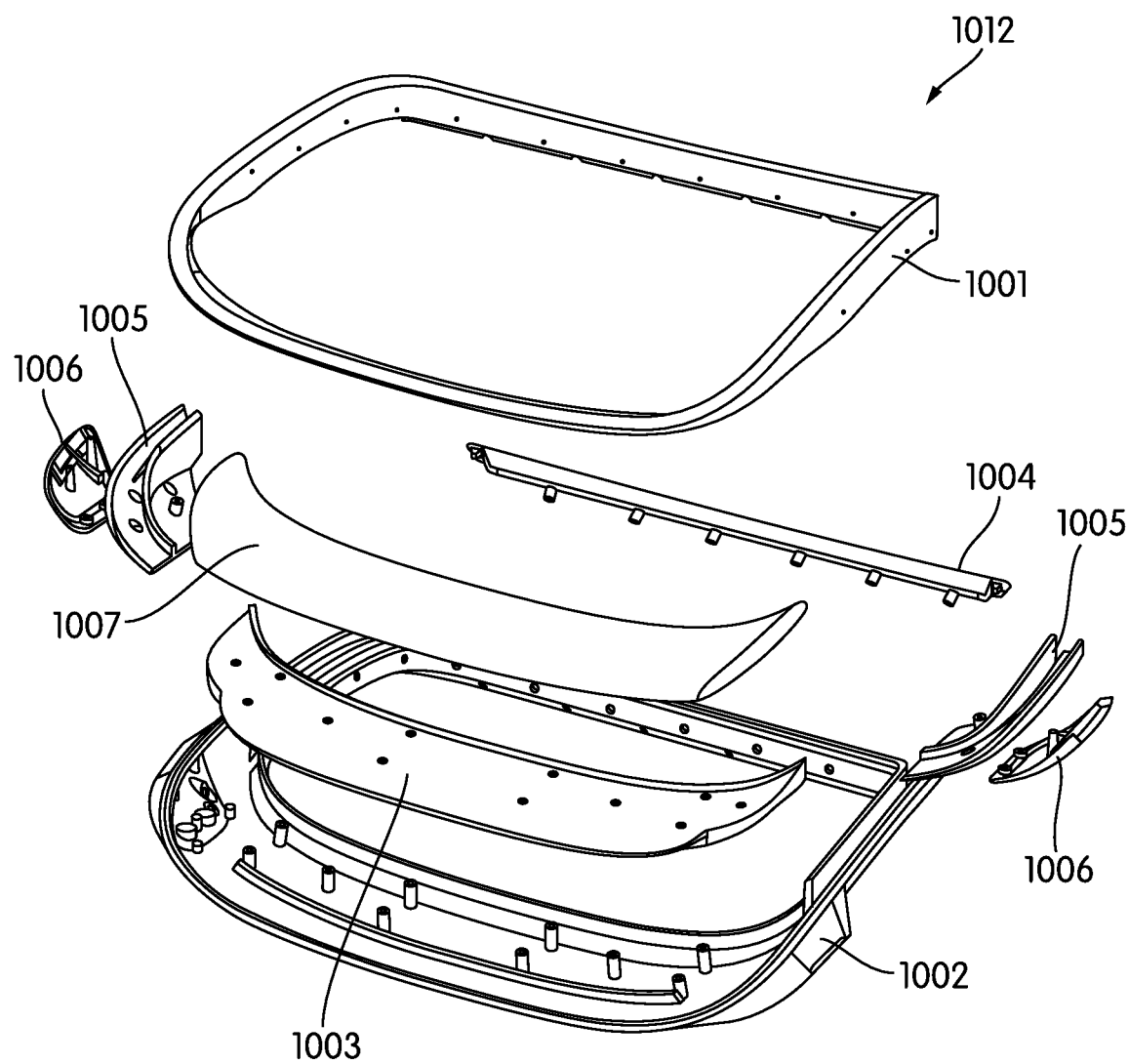
FIG. 40 shows an exploded view of the seat pan member of the chair of FIG. 38.
Figure 41:
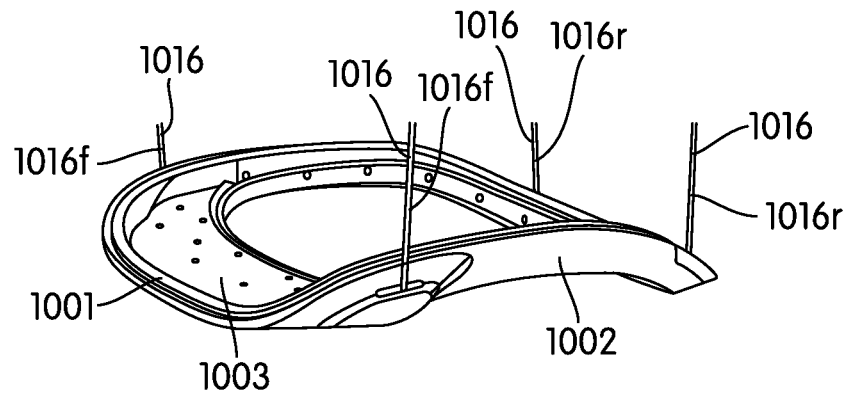
FIG. 41 shows an assembled view of the seat pan member of the chair of FIG. 38.

FIGS. 40 and 41 shows an exploded view and an assembled view, respectively of the seat pan member 1012 of the chair 1000. The seat pan member 1012 includes a main frame member 1002, a rear frame member 1004, a cushion support member 1003, frame insert members 1005, a cushion 1007, a mesh ring member 1001, mesh 1008 (as shown in FIG. 38), and side caps 1006.

In one embodiment, the cushion support member 1003 and both frame insert members 1005 are attached to the main frame member 1002. The cushion 1007 is placed onto the cushion support member 1003. The mesh 1008 is attached to the mesh ring member 1001. In one embodiment, the mesh ring member 1001 is attached using a toe-in fit arrangement under the front edge of the cushion support member 1003. The mesh ring member 1001 is then secured to the main frame member 1002 on the back and sides thereof using screws or other fasteners.

Figure 42:
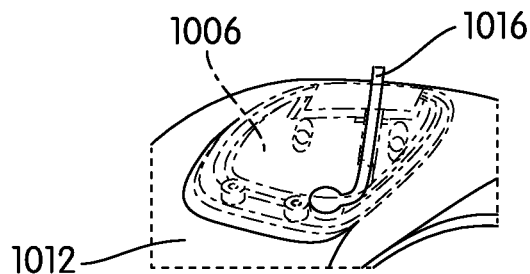
FIG. 42 shows a partial bottom plan view of a front portion of the seat pan member of the chair of FIG. 38.
Figure 43:
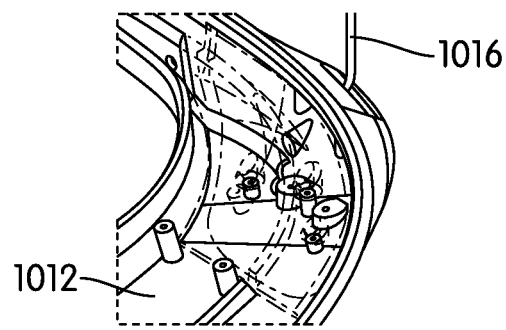
FIG. 43 shows a partial perspective view of a rear portion of the seat pan member of the chair of FIG. 38.

In one embodiment, the front curvature of the seat pan member 1012 is constructed and arranged to relieve pressure at the thighs of the user seated on the chair 1000. In one embodiment, the configuration of the seat pan member 1012 may be similar to that of the seat base member 12 as described in detail with respect to FIGS. 1-37 of the present patent application. Referring to FIGS. 41-43, end portions of the movement support members 1016 are connected to the portions of the seat pan member 1012 to facilitate the floating movement of the seat pan member 1012 with respect to the movement support frame in at least two degrees of freedom. This configuration is described in detail in discussions below.

In one embodiment, the seat pan member 1012 and the seat back member 1020 may have simple padded material, contoured padded material or engineered (contour forming) breathable mesh material to further provide comfort and support to the user.

In one embodiment, the mesh material may be attached to the seat pan member 1012 or the seat back member 1020 via staples or other fasteners. In another embodiment, the mesh material may be attached to the seat pan member 1012 or the seat back member 1020 by adhesive bonding or sewing. In yet another embodiment, the mesh material may be attached to the seat pan member 1012 or the seat back member 1020 via an over-molded frame design in which edge portions of the mesh material are molded into the material of the seat pan member frame or the seat back member frame.

In one embodiment, the mesh material may be an elastomeric material. In another embodiment, the mesh material may be a polyester elastomeric monofilament material, for example, manufactured by The Quantum Group, Inc. In yet another embodiment, the mesh material may be an elastomeric fabric material. In one embodiment, the mesh material may be configured to yield excellent load-bearing properties and resiliency.

In one embodiment, the at least two movement support members 1016 are constructed and positioned (i.e., located within the constraints) to deliver a controlled free floating movement to the seat pan member 1012. This controlled free floating movement to the seat pan member 1012 is provided in an almost horizontal plane, i.e., the horizontal seating plane.

In one embodiment, the at least two movement support members 1016 may also be referred to as a multidirectional movement assembly. This multidirectional movement assembly is operatively connected to the seat pan member 1012 in a manner to provide a floating movement of the seat pan member 1012 in at least two degrees movement in a generally horizontal plane to the movement assembly support frame 1014. In one embodiment, the movement of the seat pan member 1012 is independent from the movement created by a simple seat pan swivel (provided by a pivot mechanism of the chair) or the use of casters.

In one embodiment, the at least two movement support members 1016 are configured to provide a floating movement to the seat pan member 1012 of about 2 inches in every direction (i.e., a forward direction on the X-axis, a backward direction on the X-axis, a left side direction on the Y-axis, and a right side direction on the Y-axis of the seat pan member 1012). In another embodiment, the at least two movement support members 1016 are configured to provide a floating movement to the seat pan member 1012 of less than 2 inches in every direction (i.e., a forward direction, a backward direction, a left side direction, and a right side direction of the seat pan member 1012). In yet another embodiment, the at least two movement support members 1016 are configured to provide a floating movement to the seat pan member 1012 of more than 2 inches in every direction (i.e., a forward direction, a backward direction, a left side direction, and a right side direction of the seat pan member 1012). In yet another embodiment, the at least two movement support members 1016 are configured to provide a floating movement to the seat pan member 1012 in every direction of up to 5, 10, 15 or 20 percent greater than or up to 5, 10, 15 or 20 percent less than those values described above.

The movement on the X and Y axes may also realize pivoting movement about the vertical Z-axis as well. The permitted free or dynamic movement of the seat pan member 1012 desirably allows the user to naturally shift his/her body while remaining fully supported because the seat pan member 1012 moves with his/her body dynamically during the movements. This is an enhancement over a static design, which even if considered ergonomic simply encourages the user to remain static, or shift around the static seat pan member to a sub-optimal position.

In one embodiment, each of the at least two movement support members 1016 is connected to a portion of the movement support frame 1014 that is disposed below the head height of the user seated on the chair 1000. In one embodiment, the portion of the movement support frame 1014 is disposed above the seat pan member 1012. In one embodiment, each of the at least two movement support members 1016 is connected to one of the pair of armrest members 1040.

In one embodiment, each of the at least two movement support members 1016 includes a rigid movement support member having two opposite end portions. One end portion of the rigid movement support member is configured to be connected to the seat pan member 1012 using a multidirectional connector and the other end portion of the rigid movement support member is configured to be connected to the movement support frame 1014 using a multidirectional connector.

Figure 67A:
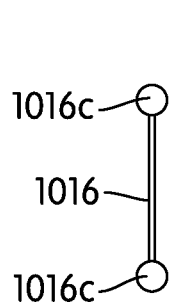
FIGS. 67(a)-67(e) show various configurations of the movement support members of the chair in accordance with an embodiment of the present patent application.
Figure 67B:
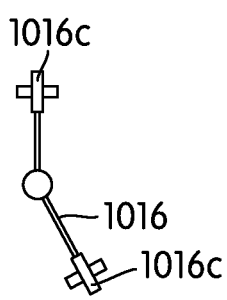
Figure 67C:

For example, as shown in FIG. 67(a), the rigid movement support member 1016 may be a rod member 1016 with ball joint connectors 1016c at each of its end portions. The rigid movement support member 1016 may be rod member 1016 with flexible joint connectors 1016c at each of its end portions. Referring to FIG. 67(b), the rigid movement support member 1016 may be rod member 1016 with bi-directional joint connectors 1016c at each of its end portions. Each of the movement support member 1016 is designed to have at least two omni-directional connectors (i.e., one at each of its end portions).

Figure 67D:
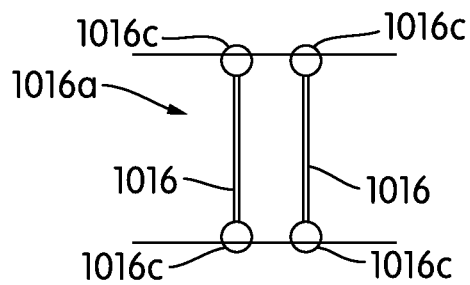
Figure 67E:
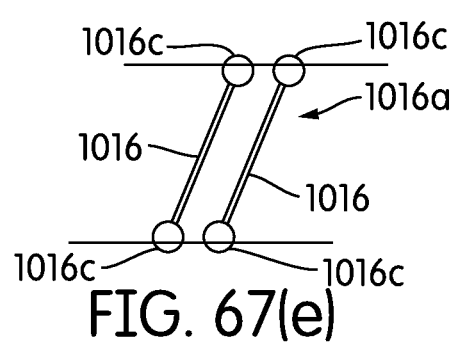

In one embodiment, the chair 1000 may have at least an assembly 1016a of two movement support members 1016 with four bi-directional connectors 1016c to create a single multidirectional movement support member. For example, as shown in FIGS. 67(d) and 67(e), the assembly 1016a of two movement support members 1016 with four bi-directional connectors 1016c allows the movement of the seat pan member be relatively level when the seat pan member is supported by the assembly 1016a from either above or below the seat pan member.

In the illustrated embodiment, four flexible movement support members 1016 are shown. It is contemplated that, in other embodiment, the chair 1000 may include two or three flexible movement support members 1016. In one embodiment, each of the at least two movement support members 1016 includes a flexible movement support member having two opposite end portions. One end portion of the flexible movement support member 1016 is configured to be connected to the seat pan member 1012 and the other end portion of the flexible movement support member 1016 is configured to be connected to the movement support frame 1014.

In one embodiment, the flexible movement support member 1016 includes a braided cable or wire. In one embodiment, the flexible movement support member 1016 includes a flexible cord or cable as shown in FIG. 67 (c). In one embodiment, the flexible movement support member 1016 may be a flexible, weather-resistant coated Stainless Steel wire rope manufactured by McMaster-Carr (e.g., model no: 8912T344). In one embodiment, the flexible movement support member 1016 may have a 3/32" diameter with 1/8" outer diameter. In one embodiment, the flexible movement support member 1016 may have a 7×7 construction to make it flexible. In one embodiment, the flexible movement support member 1016 may have a vinyl coating that protects the wire rope from abrasion and resists UV rays. In one embodiment, the flexible movement support member 1016 may be made of 18-8 stainless steel, which has good corrosion resistance. This prevents it from unraveling when cut. In one embodiment, the flexible movement support member 1016 may be lubricated to reduce wear. In another embodiment, the flexible movement support member 1016 may be an ultra-flexible lubricated cable manufactured by McMaster- Carr. This flexible movement support member may have a 7×19 construction that offers the most flexibility.

In one embodiment, the flexible movement support member 1016 includes a cable having a rigid cover or covering. The flexible movement support member cover may include a braided metal with a co-extruded plastic over it. This cover is slipped over the flexible movement support member 1016. In one embodiment, Thermoplastic Polyurethane (TPU) fittings are used at the ends of the flexible movement support member cover. In one embodiment, crimp stop sleeves may be used at the ends of the flexible movement support members 1016. In one embodiment, the crimp stop sleeves may be the crimp stop sleeves manufactured by McMaster-Carr (e.g., model no: 3914T3).

In one embodiment, as shown in FIGS. 38 and 41, the chair 1000 includes two rear flexible movement support members 1016r in the rear portion of the chair 1000 and two front flexible movement support members 1016f in the front portion of the chair 1000. In one embodiment, one end portions of the rear flexible movement support members 1016r are configured to run through the rear frame member 1004 of the seat pan member 1012 and through the slots into the receptacles on the main frame member 1002 of the seat pan member 1012 connecting the flexible movement support members to the seat pan member 1012. The rear frame member 1004 (i.e., along with the rear flexible movement support members 1016r through it) is then attached to the main frame member 1002 of the seat pan member 1012.

In one embodiment, the other end portions of the rear flexible movement support members 1016r are configured to be connected to the seat back member 1020. For example, the other end portions of the rear flexible movement support members 1016r are configured to be inserted into openings 1157 (as shown in FIG. 45) of the seat back member 1020 and the rear flexible movement support members 1016r (inserted in the openings 1157) may be encapsulated by the mesh ring member of the seat back member 1020. In another embodiment, the other end portions of the rear flexible movement support members 1016r are configured to be connected to the movement support frame 1014. In yet another embodiment, the other end portions of the rear flexible movement support members 1016r are configured to be connected to the armrest members 1040.

In one embodiment, one end portions of the front flexible movement support members 1016f are configured to be fed through the holes in the front bottom corners of the main frame member 1002 of the seat pan member 1012 connecting the flexible movement support members to the seat pan member 1012. The side caps 1006 are then installed onto the main frame member 1002 of the seat pan member 1012.

In one embodiment, the other end portions of the front flexible movement support members 1016f are configured to be connected to the movement support frame 1014. In another embodiment, the other end portions of the front flexible movement support members 1016f are configured to be connected to the armrest members 1040.

In one embodiment, the rear movement support members 1016r may have rigid configuration. This configuration prevents the back of the seat pan member 1012 from lifting when t user sits on the very front edge of the seat pan member 1012. In one embodiment, some clearance may be provided between the frames and the ends of the flexible movement support member cover/Thermoplastic polyurethane (TPU) inserts, so that the movement of the seat pan member 1012 is not restricted.

In one embodiment, referring to FIGS. 46-53a, the chair 1000 includes a movement limiter assembly 1075 that is operatively connected to the seat pan member 1012 and the movement support frame 1014. The movement limiter assembly 1075 is configured to limit the range of the movement of the seat pan member 1012 with respect to the movement support frame 1014 in at least one degree of freedom. In one embodiment, the movement limiter assembly 1075 may be in the form of a lock (e.g., a lock with a toggle engagement) or a dampener that is configured to limit the range of the movement of the seat pan member 1012 with respect to the movement support frame 1014 in at least one degree of freedom. In one embodiment, the movement limiter assembly 1075 may be configured to be adjusted to limit the movement of the seat pan member 1012 with respect to the movement support frame 1014 in any direction chosen by a user.

In the present patent application, the term "movement limiter assembly" is interchangeably used with the term "seat pan lock assembly," they both refer to a member of the chair that is configured to limit the range of the movement of the seat pan member with respect to the movement support frame in at least one degree of freedom, bias the seat base member to the center (or a center position), or restrict or dampen the movement of the seat base member.

Figure 46:
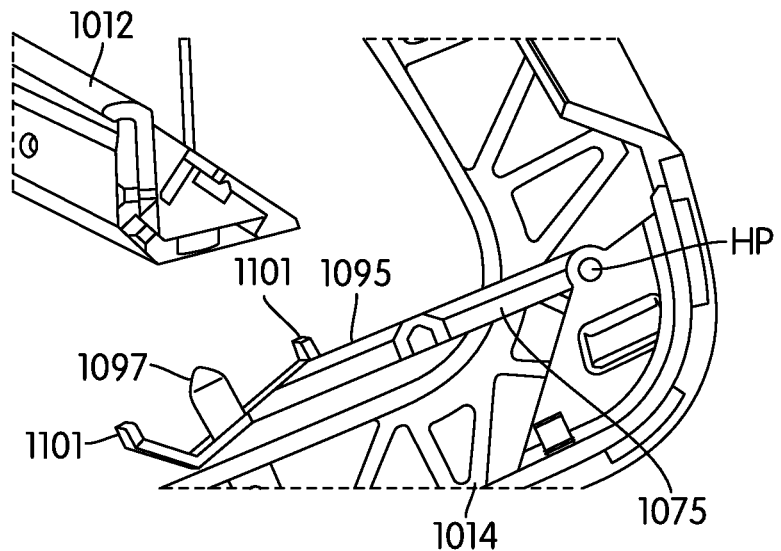
FIGS. 46 and 47 show partial cross-sectional side views of the chair of FIG. 38 and a seat pan lock assembly for the chair, where the seat pan lock assembly is in an unlocked configuration in FIG. 46 and is in a locked configuration in FIG. 47.
Figure 47:
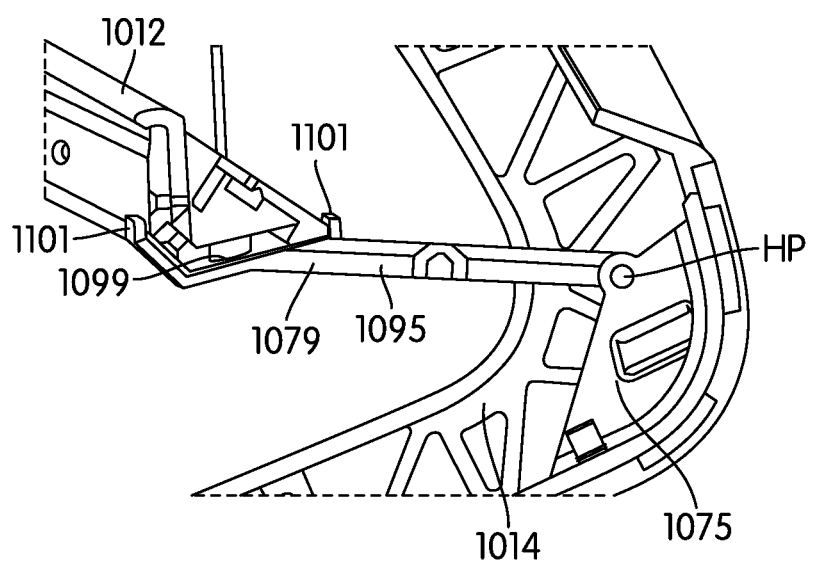
Figure 48:
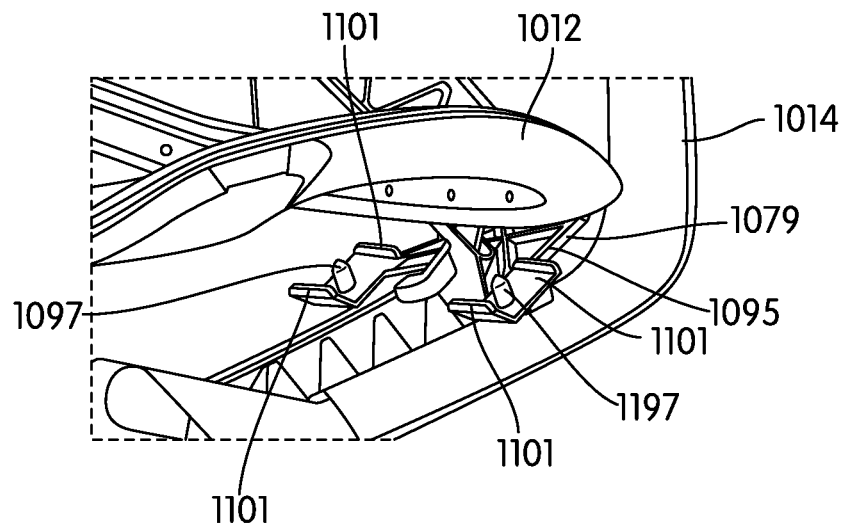
FIGS. 48 and 49 show partial side perspective views of the chair of FIG. 38, where the seat pan lock assembly is in the unlocked configuration in FIG. 48 and is in a locked configuration in FIG. 49.
Figure 49:
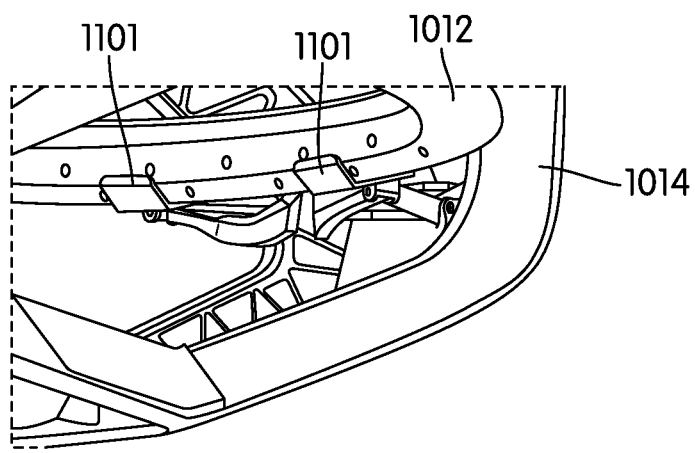
Figure 50:
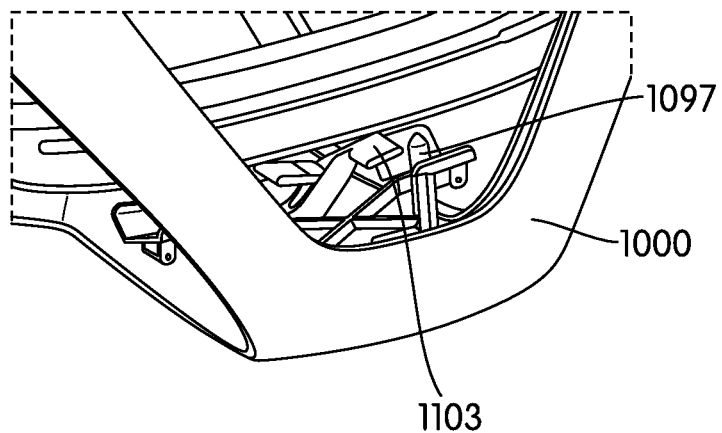
FIGS. 50 and 51 show partial rear perspective views of the chair of FIG. 38, where the seat pan lock assembly is in the unlocked configuration in FIG. 50 and is in a locked configuration in FIG. 51.
Figure 51:
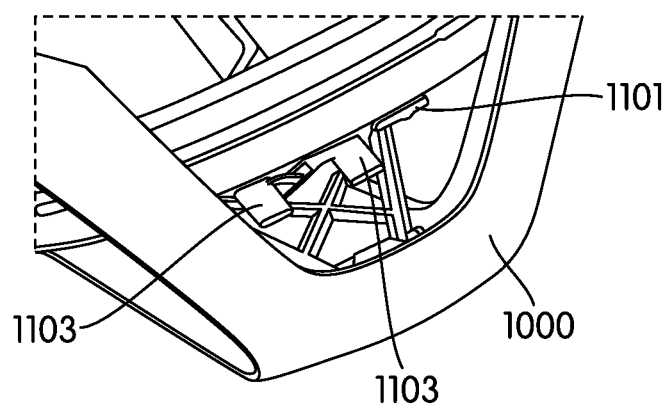

The movement limiter assembly 1075 is configured to be moveable between a locked or an engaged position as shown in FIGS. 47, 49, and 51 and an unlocked or a disengaged position as shown in FIGS. 46, 48, and 50. The seat pan member 1012 is permitted to be moved with respect to the movement support frame 1014 when the movement limiter assembly 1075 is in the unlocked or disengaged position. The seat pan member 1012 is prevented from moving with respect to the movement support frame 1014 when the movement limiter assembly 1075 is in the locked or engaged position.

In one embodiment, as will be explained below with respect to FIGS. 46-53a, the movement limiter assembly 1075 is moveably or pivotably connected to the movement support frame 1014 and is configured to engage with a portion of the seat pan member 1012 to limit the range of the movement of the seat pan member 1012 with respect to the movement support frame 1014 in at least one degree of freedom. It is also contemplated that, in another embodiment of the present patent application, the movement limiter assembly 1075 may be moveably or pivotably connected to the seat pan member 1012 and may be configured to engage with a portion of the movement support frame 1014 to limit the range of the movement of the seat pan member 1012 with respect to the movement support frame 1014 in at least one degree of freedom.

Figure 52:
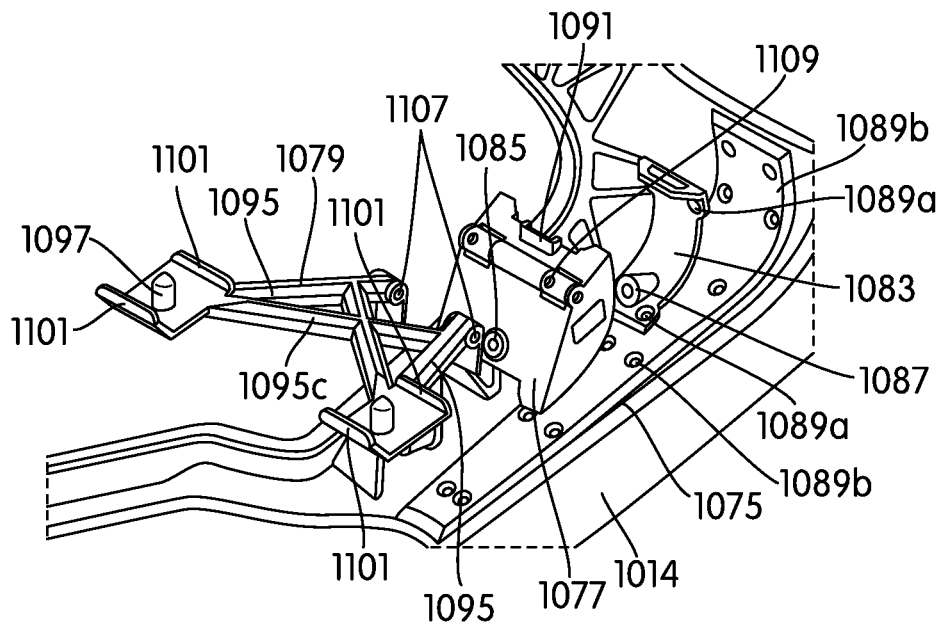
FIG. 52 shows an exploded view of the seat pan lock assembly in accordance with an embodiment of the present patent application.
Figure 53:
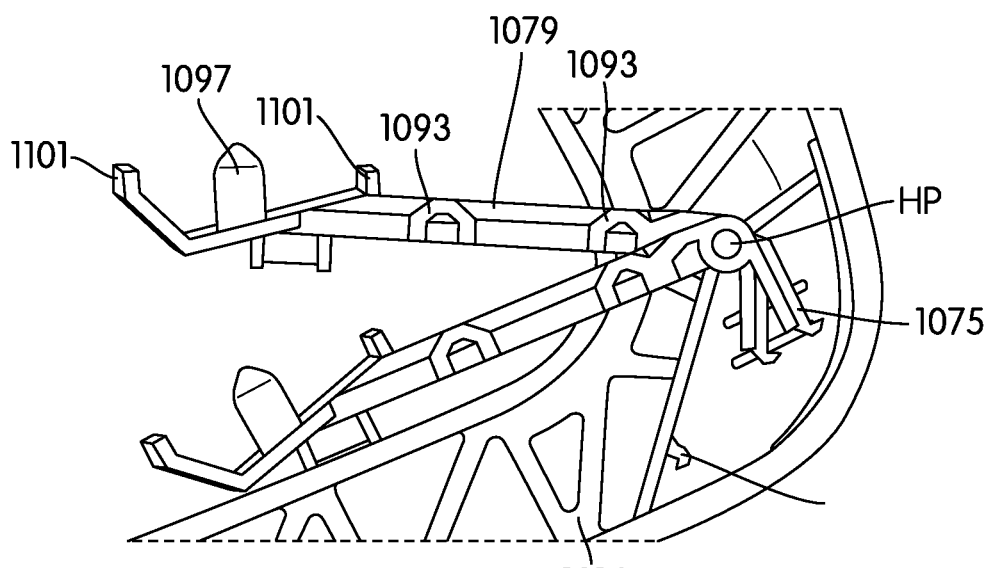
FIG. 53 shows a cross-sectional view of the seat pan lock assembly in accordance with an embodiment of the present patent application, where the seat pan lock assembly is shown in the locked and unlocked configuration and some portions of the chair are not shown for sake of clarity.
Figure 53A:
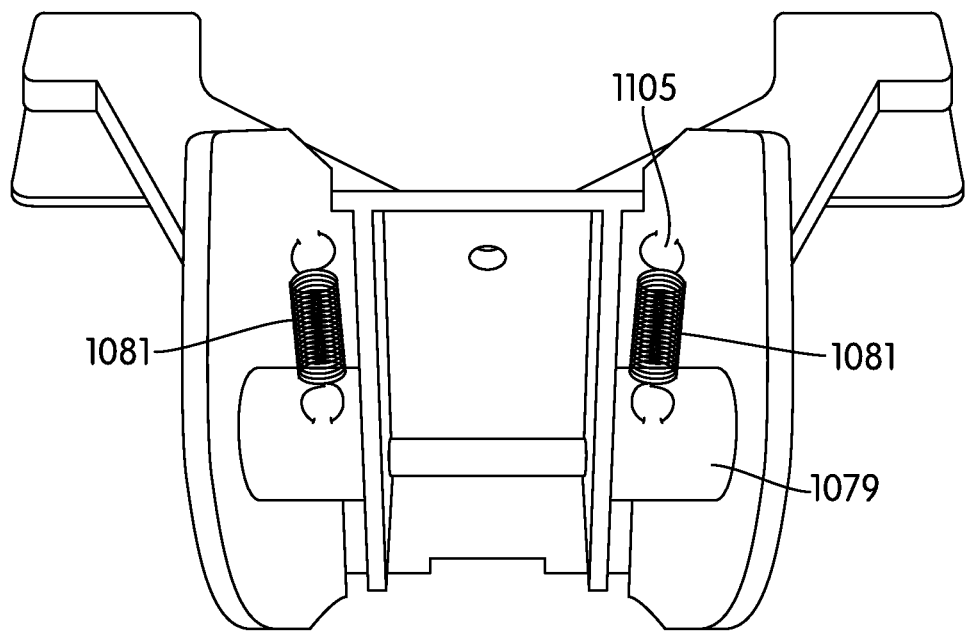
FIG. 53a shows a partial rear view of the seat pan lock assembly in accordance with an embodiment of the present patent application, where some portions of the chair are not shown for sake of clarity.

Referring to FIGS. 52 and 53, the movement limiter assembly 1075 may include a housing 1077, lock assembly 1079 connected to the housing 1077 and spring(s) 1081 (as shown in FIG. 53a) disposed in the housing 1077. In one embodiment, the housing 1077 is configured to be mounted with the aluminum frame of the movement support frame 1014 so as to be hidden from view.

In one embodiment, the lock member 1079 may include U-shaped channel(s) 1093 that are configured to provide strength to the lock member 1079. In one embodiment, the lock assembly 1079 may include two lock members 1095 that are spaced apart and connected to each other using cross bracing 1095c. The cross bracing 1095c is configured to provide rigidity to the lock assembly 1079.

In one embodiment, the lock assembly 1079 is pivotably connected to the housing 1077. For example, a pin or other similar member is configured to pass through openings 1107 of the lock assembly 1079 and opening 1109 of the housing 1077 to pivotably connect the lock assembly 1079 to the housing 1077. The lock assembly 1079 is also connected to portions 1105 of the housing 1077 via the springs 1081.

Each lock member 1095, at its free end, includes a lock element 1097 that is constructed and arranged to engage with a lock element engaging portion 1099 disposed on the seat pan member 2012. In one embodiment, the lock element 1097 is in the form of a pin 1097 that is constructed and arranged to engage with a pin receiving opening 1099 disposed on the seat pan member 2012. For example, the pins 1097 may have tapered configuration so as to easily engage with their corresponding pin receiving openings 1099 disposed in the seat pan member 2012. In another embodiment, the lock element may be in the form of an opening that is constructed and arranged to receive a pin disposed on the seat pan member 2012. In yet another embodiment, the lock element and the lock element engaging portion may include any other shapes and configurations as would be appreciated by one skilled in the art.

In one embodiment, the lock assembly 1079 may include guiding members (or ribs) 1101 that are configured to guide the lock element 1097 and prevent the lock element 1097 from getting stuck behind or in front of the seat pan member 2012 while engaging with the corresponding pin receiving opening 1099.

In one embodiment, the lock assembly 1079 is spring-loaded/spring-biased such that it is configured to auto-engage once the lock assembly 1079 is released. In one embodiment, this configuration of the lock assembly 1079 only requires the user to move until the lock elements 1097 find their corresponding lock element engaging portions 1099. The springs 1081 are configured to force or bias the arm members 1095 to pivot upwards. The springs may also have other configurations.

In one embodiment, the movement limiter assembly 1075 may include engagement portions that are configured to hold the lock assembly 1079 in its disengaged or unlocked position. In one embodiment, the lock assembly 1079 is configured to lock out of the way when it is not in use. This configuration of the lock assembly 1079 enables the lock assembly 1079 not to interfere with normal movement of the seat pan member 2012. In one embodiment, the hinge point HP is almost level with the movement of the seat pan member 2012, so that lock elements 1097 engage well with their corresponding lock element engaging portions 1099 even if level of the seat pan member 2012 varies.

Referring to FIGS. 50 and 51, the movement limiter assembly 1075 may include manually engageable portion(s) 1103 that are configured to be engageable by the user to move the movement limiter assembly 1075 between the locked or engaged position and the unlocked or disengaged position. The manually engageable portion(s) 1103 may be operatively connected to the movement limiter assembly 1075.

The manually engageable portion(s) 1103 are constructed and arranged so that they do not interfere with the floating movement of the seat pan member 1012. For example, as shown in FIG. 50, the manually engageable portion(s) 1103 release pop up when the movement limiter assembly 1075 is in the unlocked or disengaged position. As shown in FIG. 51, the manually engageable portion(s) 1103 move down (and out of the way) when the movement limiter assembly 1075 is in the locked or engaged position (i.e., the lock member 1097 of the lock member 1079 is engaged with the lock element engaging portions 1099).

In another embodiment, the manually engageable portion(s) 1103 are optional and the user may move the movement limiter assembly 1075 between the locked or engaged position and the unlocked or disengaged position by simply pulling the lock member 1079. In another embodiment, the movement limiter assembly 1075 may have configuration and operation similar to those of the seat base member locking mechanism 902 of FIGS. 10Q and 10R.

In one embodiment, the chair 1000 may include a built-in movement limiter assembly that is disposed on a portion of the movement support member frame 1014 or the seat pan member 1012. In another embodiment, the chair 1000 may include a retrofitted movement limiter assembly 1075 that is attached to the chair 1000 by the user later on. In one embodiment, the movement limiter assembly may include a bolt-on feature.

The movement limiter assembly 1075 may include a mounting plate 1083 that is configured to mount the movement limiter assembly 1075 to the movement support frame 1014. The housing 1077 may be connected to the mounting plate 1083 using a toe-in tab 1091 or any other connector arrangement. The housing 1077 may be locked to the mounting plate 1083 using thumb screws or any other lock arrangement. For example, the thumb screws are configured to pass through an opening 1085 of the housing 1077 and an opening 1087 of the mounting plate 1083 to lock the housing 1077 to the mounting plate 1083. In one embodiment, fasteners are configured to pass through openings 1089a of the mounting plate 1083 and openings 1089b of the movement support frame 1014 to lock the mounting plate 1083 to the movement support frame 1014. In one embodiment, the mounting plate 1083 is optional and the housing 1077 may be configured to be directly connected to the movement support frame 1014. In one embodiment, the movement limiter assembly 1075 pivots around the mounting point. In some instances, some pivoting motion of the movement limiter assembly 1075 may be desirable, even when the movement limiter assembly 1075 is in its locked position.

Figure 56:
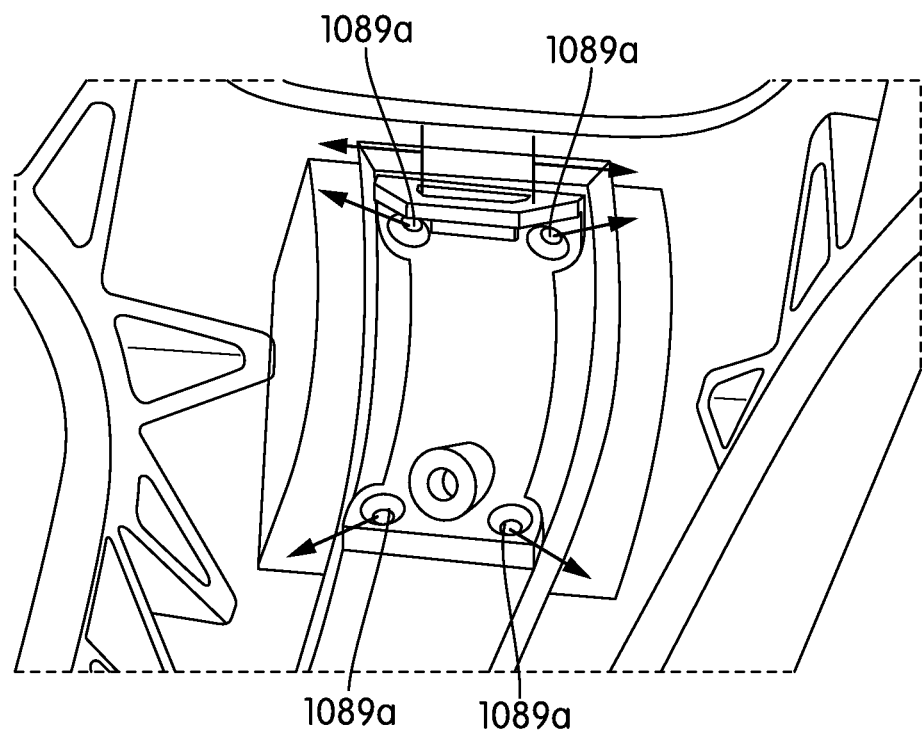

In one embodiment, as shown in FIG. 56, the toe-in tab 1091 may be widened so that the movement limiter assembly 1075 cannot flex or pull away from the mounting plate 1083. In another embodiment, use on tab at each corner of the movement limiter assembly 1075 may be used so that the movement limiter assembly 1075 cannot flex or pull away from the mounting plate 1083. These configurations provide more rigidity to the movement limiter assembly 1075.

In one embodiment, mounting locations (e.g., the openings 1089a of the mounting plate 1083) are moved to corners of the movement limiter assembly 1075. The wider mounting locations may be covered with removable Thermoplastic polyurethane (TPU) sections so that the mounting locations are hidden when the movement limiter assembly 1075 is not used.

Figure 55:
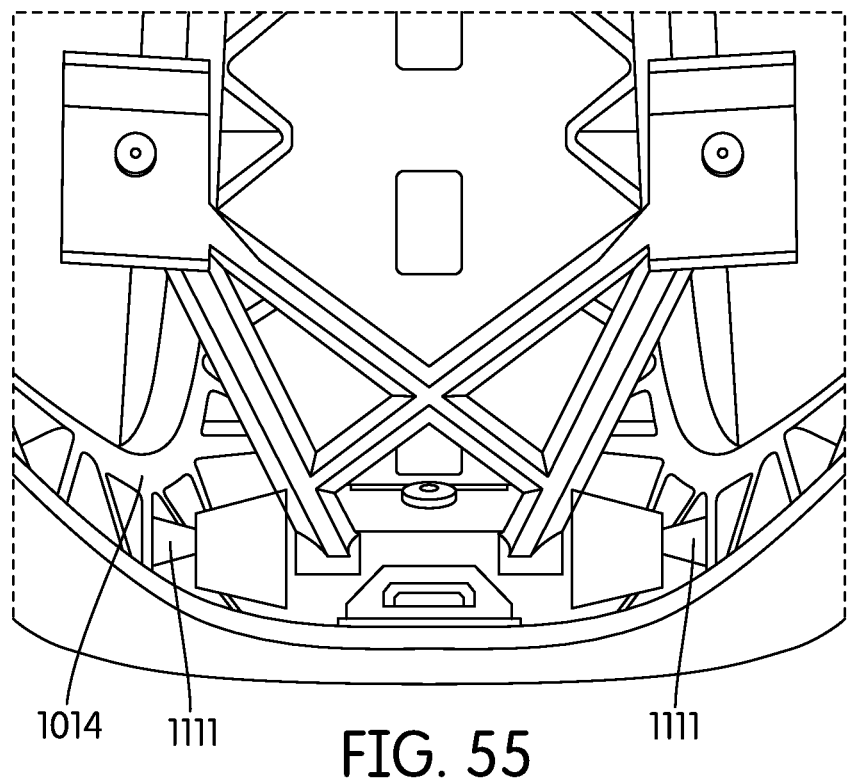

In one embodiment, as shown in FIG. 55, bosses 1111 may be added to the aluminum chair frame 1014. The bosses 1111 may be nested between the ribs of the aluminum chair frame 1014 and can be covered by the Thermoplastic polyurethane (TPU) insert when not in use. The housing 1077 of the movement limiter assembly 1075 may be extended to engage with the bosses 1111 disposed on the aluminum chair frame 1014. This configuration eliminates the mounting plate 1083 that is provided for attachment of the housing 1077 to the movement support frame 1014 and offers complete locking of the pivoting motion of the movement limiter assembly 1075.

Figure 54:
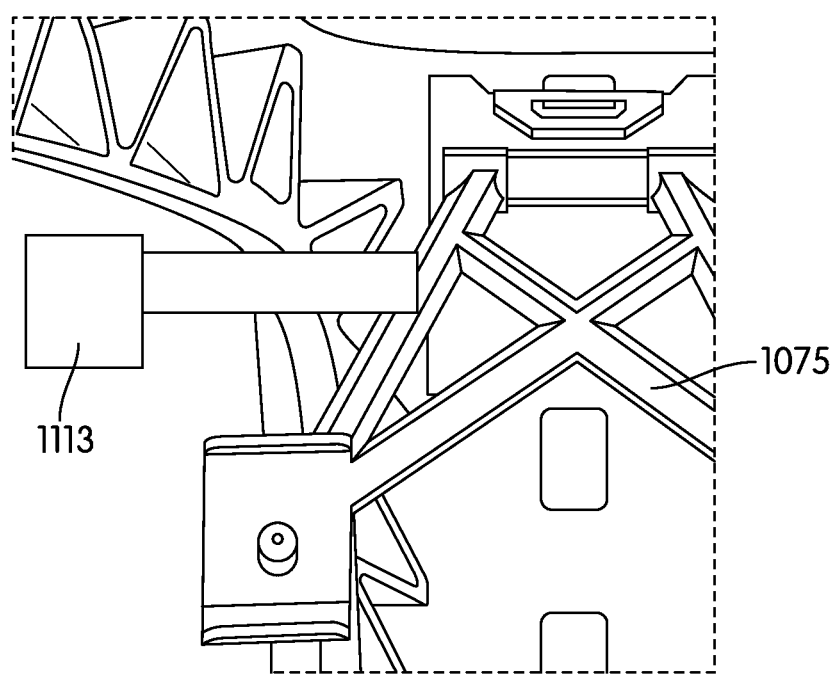
FIGS. 54-56 show partial perspective views of the seat pan lock assembly in accordance with various embodiments of the present patent application.

In one embodiment, the user may be manually push or pull the lock assembly 1079 to actuate or operate the movement limiter assembly 1075. In another embodiment, as shown in FIG. 54, an actuation handle 1113 may be added to a side of the movement limiter assembly 1075 to actuate or operate the movement limiter assembly 1075. The actuation handle 1113 may extend outwardly from the side of the movement limiter assembly 1075 for easier access and use of the movement limiter assembly 1075.

In one embodiment, glass-filled-nylon material or metal material sub-structure may be used to provide strength and rigidity, especially at the mounting points of the movement limiter assembly 1075.

In one embodiment, the seat pan lock or the movement limiter assembly is configured to only engage when manually activated. In another embodiment, the movement limiter assembly may be configured to be more dynamic in nature. The dynamic configuration of the movement limiter assembly may be due to the movement limiter assembly can be sprung or the movement limiter assembly can have an elastomeric property (i.e., slightly stretch with more force). Such a movement limiter assembly is configured to be engaged constantly to regulate the movement of the seat pan member.

The chair 1000 also includes an actuator that is configured to operate the least two movement support members 1016 for providing the movement of the seat pan member 1012 with respect to the movement support frame 1014 in the at least two degrees of freedom. In one embodiment, the configuration and operation of the actuator are similar to those of the actuator 18 as described in detail with respect to FIGS. 1-37 of the present patent application, and hence will not be described in detail here. Also, the interaction of the actuator and the at least two movement support members 1016 of the chair 1000 is similar to that of the actuator 18 and the suspension assembly 16 described with respect to FIGS. 1-37, and hence will not be described in detail here. For example, in one embodiment, the actuator may be configured to operate a drive system to adjust the length (e.g., lengthen or shorten) of the least two movement support members 1016.

Figure 64:
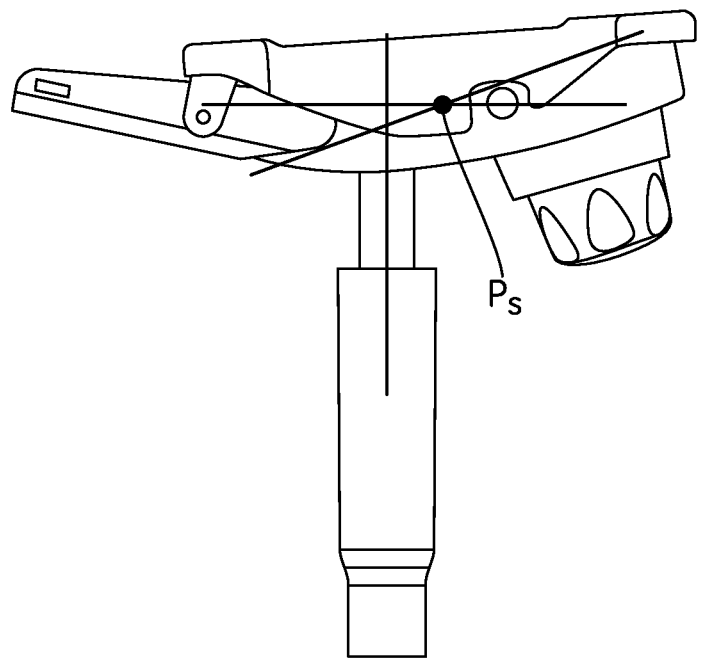
FIGS. 64 and 65 show prior art tilt mechanism and a tilt mechanism for the chair in accordance with an embodiment of the present patent application.
Figure 65:
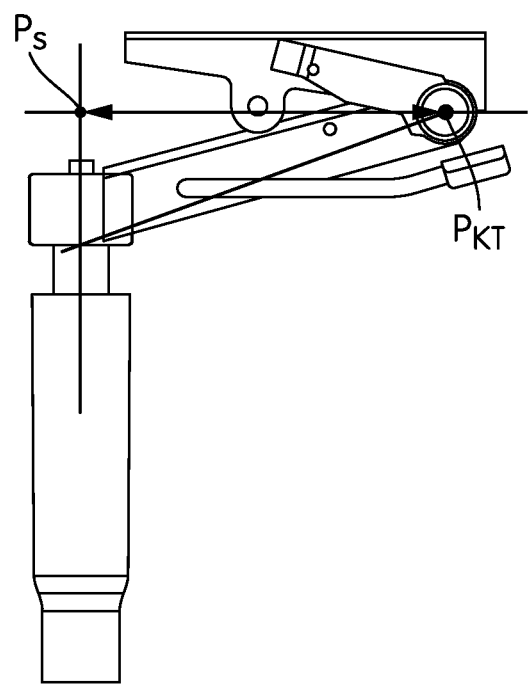

Based on the distance between the pivot point (i.e., the point at which the seat pan member of the chair pivots) and the axis of the chair's gas spring, there are two types of stock/pivot mechanisms—a standard pivot mechanism and a knee tilt pivot mechanism. The standard (prior art) pivot mechanism is shown in FIG. 64 and the knee tilt pivot mechanism used in the present patent application is shown in FIG. 65. In the present patent application, the main tilt mechanism in which the gas shock and the movement support member frame attach to, is called the knee tilt mechanism because the chair bends downward from where the user's knees bend when the user is sitting in the chair. By contrast, the front of the user's knee moves upwards as the seat back member of the standard pivot mechanism chair pivots backwards to the recline position.

As shown in FIGS. 64 and 65, the pivot point $P_{KT}$ of the knee tilt mechanism is much further forward than the pivot point of the standard mechanism $P_S$. The recliner effect also varies between the knee tilt pivot mechanism and the standard pivot mechanism. For example, when the user reclines on the chair with the standard pivot mechanism, the user's legs raise and their torso lowers. With the knee tilt pivot mechanism, the user's legs do not raise and the torso drops (i.e., essentially the user is pivoting from their knee). This also pulls the users seat pan member backwards against the lumbar in the mesh and is quite comfortable and supportive. The knee tilt configuration is advantageous (this movement is also captured, for example, in FIG. 6A) since the seat pan member moves the user against the seat back member of the chair with more of your weight naturally resting on the back lumbar region of the chair than other chairs where the seat pan member does not move backwards in a free motion state as the present patent application.

Figure 66:
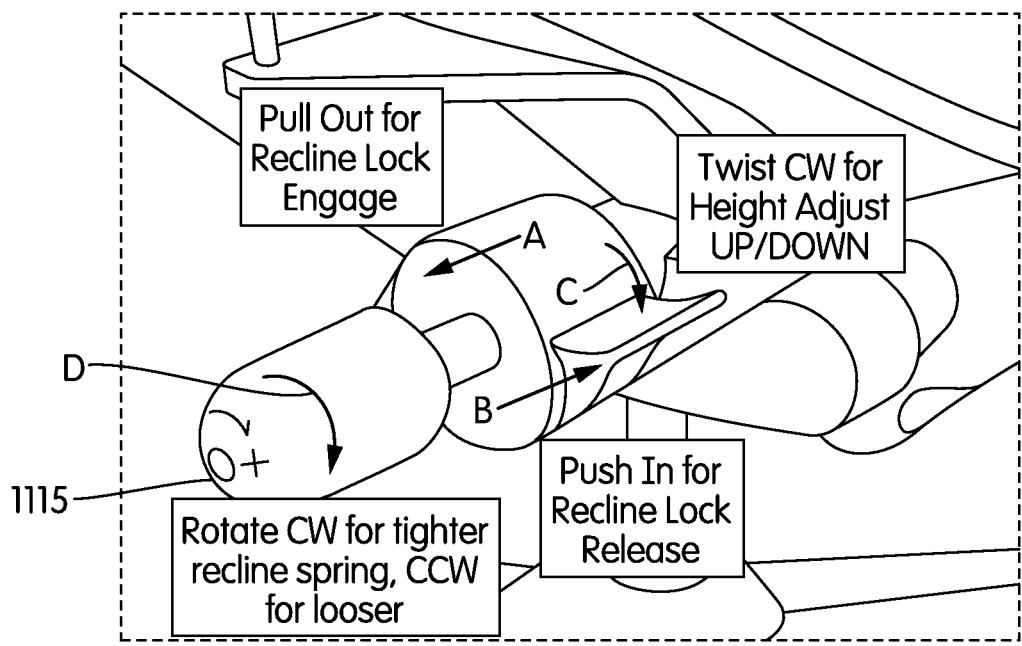
FIG. 66 shows a single adjustment mechanism for tilt mechanism of the chair in accordance with an embodiment of the present patent application.

FIG. 66 shows an adjustment control for the stock/pivot mechanism of the chair 1000. In one embodiment, the chair 1000 includes a single adjustment control member 1115 that is configured to control the recline spring, to operate the recline lock, to adjust the height of the movement support frame 1014 (and, therefore, the seat pan member 1012) and/or to control/operate other features or components of the stock/pivot mechanism of the chair 1000. The single adjustment control member 1115 is configured to be manually engageable by the user.

For example, the single adjustment control member 1115 is configured to be pulled outwardly, in the direction of an arrow A, to engage the recline lock and to be pushed in, in the direction of an arrow B, to release the recline lock. The same single adjustment control member 1115 is configured to be twisted in the direction of the arrow C (or the clockwise direction) to adjust the height of the movement support frame 1014 (and, therefore, the seat pan member 1012). Also, the single adjustment control member 1115 is configured to be rotated to adjust the tightness of the recline spring. For example, the single adjustment control member 1115 is configured to be rotated in the direction of the arrow D (or the clockwise direction) to increase the tightness of the recline spring and to be rotated in the direction opposite to that of the arrow D (or the counter clockwise direction) to decrease the tightness (i.e., loosen) of the recline spring. The structure and operation of the recline lock, the recline spring, and the height adjustment mechanism of the chair are generally known to one skilled in the art and hence will not described in detail here.

The foregoing illustrated embodiments have been provided to illustrate the structural and functional principles of the present patent disclosure and are not intended to be limiting. To the contrary, the present patent disclosure is intended to encompass all modifications, alterations and substitutions within the spirit and scope of the appended claims.

What is claimed is:

1. A chair comprising:
    a base assembly configured to stably support the chair on a surface;
    a seat pan member;
    a movement support frame, the movement support frame being supported on the base assembly;
    at least two movement support members configured to operatively connect the seat pan member to the movement support frame,
    wherein each of the movement support members has two opposite end portions, and wherein one end portion of each of the movement support members is connected to the seat pan member and the other end portion of each of the movement support members is connected to the movement support frame,
    an actuator configured to operate the at least two movement support members for providing a rotational adjustment of the seat pan member with respect to the movement support frame, wherein the rotational adjustment of the seat pan member is about one of two mutually perpendicular axes parallel to a horizontal seating plane; and
    a drive system operatively connected to the at least two movement support members and the actuator,
    wherein the actuator is configured to operate the drive system to adjust the length of the least two movement support members for providing the rotational adjustment of the seat pan member with respect to the movement support frame; and wherein the drive system includes a rotatably driven adjustment system.

2. A chair comprising:
a base assembly configured to stably support the chair on a surface;
a seat pan member;
a movement support frame, the movement support frame being supported on the base assembly;
at least two movement support members configured to operatively connect the seat pan member to the movement support frame,
an actuator configured to operate the at least two movement support members for providing a rotational adjustment of the seat pan member with respect to the movement support frame, wherein the rotational adjustment of the seat pan member is about one of two mutually perpendicular axes parallel to a horizontal seating plane; and
a drive system operatively connected to the at least two movement support members and the actuator,
wherein the actuator is configured to operate the drive system to adjust the length of the least two movement support members for providing the rotational adjustment of the seat pan member with respect to the movement support frame;
wherein the drive system includes a rotatably driven adjustment system, and
wherein the rotatably driven adjustment system includes a pulley, a spring and a ratchet assembly.

3. The chair according to claim 2, wherein the spring is a torsion spring that is configured to dampen the movement of the pulley.

4. The chair according to claim 2, wherein the ratchet assembly is configured to lock the length of the at least two movement support members at a desired position until released.

5. The chair according to claim 1, wherein the movement support frame includes a pair of armrest members, and wherein each of the movement support members is connected to one of the pair of armrest members.

6. The chair according to claim 1, wherein a portion of the movement support frame is disposed above the seat pan member.

7. A chair comprising:
a base assembly configured to stably support the chair on a surface;
a seat pan member;
a movement support frame, the movement support frame being supported on the base assembly;
at least two movement support members configured to operatively connect the seat pan member to the movement support frame,
wherein the at least two movement support members are flexible members,
an actuator configured to operate the at least two movement support members for providing a rotational adjustment of the seat pan member with respect to the movement support frame, wherein the rotational adjustment of the seat pan member is about one of two mutually perpendicular axes parallel to a horizontal seating plane; and
a drive system operatively connected to the at least two movement support members and the actuator,
wherein the actuator is configured to operate the drive system to adjust the length of the least two movement support members for providing the rotational adjustment of the seat pan member with respect to the movement support frame; and
wherein the drive system includes a rotatably driven adjustment system.

8. The chair according to claim 7, wherein each of the flexible members has two opposite end portions, and wherein one end portion of each of the flexible members is connected to the seat pan member and the other end portion of each of the flexible members is connected to the movement support frame.

9. The chair according to claim 8, wherein a portion of the movement support frame is disposed above the seat pan member.

* * * * *